United States Patent
Neiser

(10) Patent No.: US 12,270,301 B2
(45) Date of Patent: Apr. 8, 2025

(54) SYSTEM AND METHOD FOR FLUID MANIPULATION

(71) Applicant: Paul Neiser, Mountain View, CA (US)

(72) Inventor: Paul Neiser, Mountain View, CA (US)

(*) Notice: Subject to any disclaimer, the term of this patent is extended or adjusted under 35 U.S.C. 154(b) by 413 days.

(21) Appl. No.: 16/660,139

(22) Filed: Oct. 22, 2019

(65) Prior Publication Data
US 2020/0049011 A1    Feb. 13, 2020

Related U.S. Application Data

(63) Continuation-in-part of application No. 16/101,391, filed on Aug. 10, 2018, now Pat. No. 11,519,434.

(60) Provisional application No. 62/751,623, filed on Oct. 28, 2018, provisional application No. 62/749,109, filed on Oct. 22, 2018, provisional application No.
(Continued)

(51) Int. Cl.
| | |
|---|---|
| *F01D 1/00* | (2006.01) |
| *B64C 11/00* | (2006.01) |
| *B64C 23/04* | (2006.01) |
| *B64C 27/10* | (2023.01) |
| *F03D 1/04* | (2006.01) |
| *F04D 3/00* | (2006.01) |
| *F04D 19/00* | (2006.01) |
| *F04D 25/02* | (2006.01) |
| *F04D 27/02* | (2006.01) |
| *F15D 1/00* | (2006.01) |

(Continued)

(52) U.S. Cl.
CPC ............... *F01D 1/00* (2013.01); *B64C 11/00* (2013.01); *B64C 23/04* (2013.01); *B64C 27/10* (2013.01); *F03D 1/04* (2013.01); *F04D 3/00* (2013.01); *F04D 19/007* (2013.01); *F04D 25/024* (2013.01); *F04D 27/0261* (2013.01); *F15D 1/0005* (2013.01); *F15D 1/02* (2013.01); *F15D 1/04* (2013.01)

(58) Field of Classification Search
CPC . F01D 1/00; B64C 11/00; B64C 23/04; B64C 27/10; F03D 1/04; F04D 3/00; F04D 19/007; F04D 25/024; F04D 27/0261; F15D 1/0005; F15D 1/02; F15D 1/04
See application file for complete search history.

(56) References Cited

U.S. PATENT DOCUMENTS

| | | |
|---|---|---|
| 1,459,495 A | 6/1923 | Bennie |
| 1,727,720 A | 9/1929 | Franz |

(Continued)

FOREIGN PATENT DOCUMENTS

| | | |
|---|---|---|
| CH | 709012 B1 | 6/2017 |
| CN | 87209963 | 4/1988 |

(Continued)

OTHER PUBLICATIONS

Cone, Jr., The Theory of Induced Lift and Minimum Induced Drag of Nonplanar Lifting Systems, NASA Technical Report R-139, 1962.
(Continued)

*Primary Examiner* — Sang K Kim
(74) *Attorney, Agent, or Firm* — MT HUNT LAW; Marcus T. Hunt

(57) ABSTRACT

By manipulating the fluid flow in the proximity of an object such as a fuselage, a wing, or the hull of ship, the wave drag associated with this object can be substantially reduced. This can be accomplished by locally changing both the fluid flow velocity and the pressure of the fluid flow.

45 Claims, 29 Drawing Sheets

Related U.S. Application Data

62/714,778, filed on Aug. 6, 2018, provisional application No. 62/703,898, filed on Jul. 27, 2018, provisional application No. 62/685,295, filed on Jun. 15, 2018, provisional application No. 62/543,371, filed on Aug. 10, 2017.

(51) Int. Cl.
*F15D 1/02* (2006.01)
*F15D 1/04* (2006.01)

(56) References Cited

U.S. PATENT DOCUMENTS

| | | | |
|---|---|---|---|
| 2,379,355 A | 6/1945 | Hodgdon | |
| 2,403,353 A | 7/1946 | Ernest | |
| 2,672,115 A | 3/1954 | Conover | |
| 3,409,249 A | 6/1966 | Bergquist et al. | |
| 4,483,658 A | 11/1984 | Levine | |
| 4,936,748 A | 6/1990 | Adamson et al. | |
| 5,054,998 A | 10/1991 | Davenport | |
| 5,092,524 A | 3/1992 | Garrett et al. | |
| 5,096,382 A | 3/1992 | Gratzer | |
| 5,231,825 A * | 8/1993 | Baughman | F04D 27/023 60/204 |
| 5,294,055 A | 3/1994 | Garrett et al. | |
| 5,782,427 A | 7/1998 | Hermach | |
| 5,803,410 A | 9/1998 | Hwang | |
| 5,836,542 A | 11/1998 | Burns | |
| 6,170,778 B1 | 1/2001 | Cycon et al. | |
| 6,203,269 B1 | 3/2001 | Lorber et al. | |
| 6,492,743 B1 | 12/2002 | Appa | |
| 6,725,797 B2 | 4/2004 | Hilleman | |
| 6,892,980 B2 | 5/2005 | Kawai | |
| 7,018,166 B2 | 3/2006 | Gaskell | |
| 7,874,513 B1 | 1/2011 | Smith | |
| 8,186,629 B2 | 5/2012 | Queiras et al. | |
| 8,286,909 B2 | 10/2012 | Lee | |
| 8,640,985 B2 | 2/2014 | Brunken, Jr. | |
| 9,694,911 B2 | 7/2017 | Bevirt et al. | |
| 9,994,305 B1 | 6/2018 | Moldovan | |
| 10,377,483 B2 | 8/2019 | Champagne, Jr. et al. | |
| 10,696,394 B2 | 6/2020 | Chang et al. | |
| 10,787,252 B2 | 9/2020 | Vialle et al. | |
| 11,585,354 B2 * | 2/2023 | Miller | F04D 29/325 |
| 11,655,767 B2 * | 5/2023 | Hrubec | F16H 57/08 415/122.1 |
| 11,673,648 B2 * | 6/2023 | Carpenter, Jr. | B64C 11/001 244/54 |
| 2002/0047071 A1 | 4/2002 | Illingworth | |
| 2004/0129833 A1 | 7/2004 | Perlo et al. | |
| 2004/0026563 A1 | 10/2004 | Moller | |
| 2006/0186261 A1 * | 8/2006 | Unzicker | B64C 11/001 244/12.1 |
| 2006/0202082 A1 | 9/2006 | Alvi | |
| 2007/0130913 A1 * | 6/2007 | Harrison | F02K 3/065 60/226.3 |
| 2010/0025526 A1 | 2/2010 | Lawrence | |
| 2010/0051740 A1 | 3/2010 | Yoeli | |
| 2011/0056183 A1 | 3/2011 | Sankrithi et al. | |
| 2011/0305572 A1 | 12/2011 | Bellis | |
| 2013/0112804 A1 | 5/2013 | Zhu | |
| 2014/0044535 A1 | 2/2014 | David | |
| 2014/0224940 A1 | 8/2014 | Rybalko et al. | |
| 2014/0353419 A1 | 12/2014 | Prud'homme-Lacroix | |
| 2015/0000252 A1 | 1/2015 | Moore | |
| 2015/0284070 A1 | 10/2015 | Breeze-Stringfellow et al. | |
| 2016/0010589 A1 | 1/2016 | Rolt | |
| 2016/0272314 A1 | 9/2016 | Radu et al. | |
| 2016/0311530 A1 | 10/2016 | Smith | |
| 2017/0166306 A1 | 6/2017 | Engbersen et al. | |
| 2017/0225773 A1 | 8/2017 | Wood et al. | |
| 2018/0162525 A1 | 6/2018 | St. Clair et al. | |
| 2018/0222580 A1 | 8/2018 | Delorean | |
| 2018/0362155 A1 | 12/2018 | Tweedt et al. | |
| 2019/0329882 A1 | 10/2019 | Baity et al. | |
| 2020/0079503 A1 | 3/2020 | Bailey | |
| 2020/0283129 A1 * | 9/2020 | Schlaerth, Jr. | B64C 23/04 |

FOREIGN PATENT DOCUMENTS

| | | |
|---|---|---|
| CN | 101417592 B | 5/2012 |
| CN | 104395601 A | 3/2015 |
| CN | 204623836 | 9/2015 |
| CN | 102756625 B | 2/2018 |
| DE | 29916203 | 11/2000 |
| DE | 102006026230 A1 | 12/2007 |
| DE | 102013015364 A1 | 3/2015 |
| EP | 2829471 B1 | 2/2017 |
| FR | 534801 | 4/1922 |
| FR | 2993859 A1 | 1/2017 |
| GB | 1197850 A | 7/1970 |
| GB | 2179405 A | 3/1987 |
| GB | 2468917 A | 9/2010 |
| GB | 2542184 A | 3/2017 |
| JP | 2013194636 A | 9/2013 |
| KR | 101446106 B1 | 10/2014 |
| WO | 2010020199 A1 | 2/2010 |
| WO | 2015/198296 A2 | 12/2015 |
| WO | 2019033080 A1 | 2/2019 |

OTHER PUBLICATIONS

Eppler, Induced Drag and Winglets, Technical Soaring, vol. 20, No. 3, p. 89-96, 1996.
Kroo et al., Highly Nonplanar Lifting Systems, Transportation Beyond 2000: Technologies Needed for Engineering Design; p. 331-370; NASA-CP-10184-Pt-1, Feb. 1, 1996.
Borer et al., Design and Performance of the Nasa Sceptor Distributed Electric Propulsion Flight Demonstrator, 16th AIAA Aviation Technology, Integration, and Operations Conference; Jun. 13-17, 2016; Washington, DC; United States, Pub. Jun. 13, 2016.
Prandtl, Induced Drag of Multiplanes, NACA TN 182, 1924.
Ameyugo et al., Distributed Propulsion Feasibility Studies, International Congress of the Aeronautical Sciences, 2006.
Kroo, Drag due to Lift: Concepts for Prediction and Reduction, Annual Reviews Fluid Mechanics vol. 33, pp. 587-617, 2001.
Demasi, Aerodynamic Analysis of Non-conventional Wing Configurations for Aeroelastic Applications, Ph.D. Dissertation, Dipartimento di Ingegneria Aeronautica e Spaziale, Turin, Italy, Mar. 2004.
Helios Prototype, NASA Armstrong Fact Sheet, https://www.nasa.gov/centers/armstrong/news/FactSheets/FS-068-DFRC.html, Feb. 28, 2014.
Bauhaus Luftfahrt, Concept study "Propulsive Fuselage": Adding an extra engine to reduce emissions, https://www.bauhaus-luftfahrt.net/en/topthema/propulsive-fuselage/, May 19, 2014.
Sanders et al., "V/STOL Propulsion", Aircraft Propulsion, NASA SP-259, 1971, pp. 135-168.
Leoty, David, PCT/US2019/057421, Int'l. Search Rpt., Search Strategy, and Written Opinion, mailed Mar. 30, 2020.
Leishman, Principles of Helicopter Aerodynamics—Second edition. Cambridge university press, 2006, p. 60-64, p. 81-83.
Johnson, Helicopter Theory. Dover Publications, Inc., 1994, p. 28-34.
McGrath, Univ. of Arizona, AME 230 Course Materials, Chapter 4—Lecture 1 Notes, 2008, http://www.u.arizona.edu/~jmcgrath/ln.ch4.notes1.pdf.
Connor, "What is Control Volume—Control Volume Analysis—Definition", (May 22, 2019), https://www.thermal-engineering.org/what-is-control-volume-control-volume-analysis-definition/.
Wikipedia, "Bell X-22", https://en.wikipedia.org/wiki/Bell_X-22, downloaded Jun. 6, 2022.
Anderson, Fundamentals of Aerodynamics—Fifth edition. McGraw-Hill., 2012, p. 20.
International Search Report and Written Opinion of the ISA, PCT/US2018/046380, mailed Dec. 6, 2018.
International Search Report and Written Opinion of the ISA, PCT/US2020/060304, mailed Sep. 27, 2021.

(56) References Cited

OTHER PUBLICATIONS

International Search Report and Written Opinion of the ISA, PCT/US2021/016116, mailed Jun. 7, 2021.
Wikipedia, "Freestream", https://en.wikipedia.org/wiki/Freestream, accessed May 26, 2022.
Wikipedia, "Moller M400 Skycar", https://en.wikipedia.org/wiki/Moller_M400_Skycar, downloaded Jun. 6, 2022.

\* cited by examiner

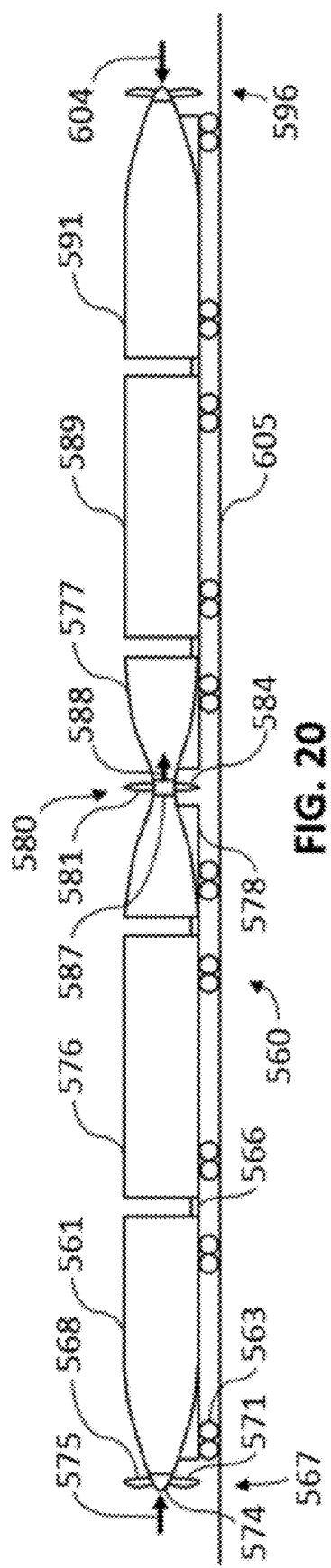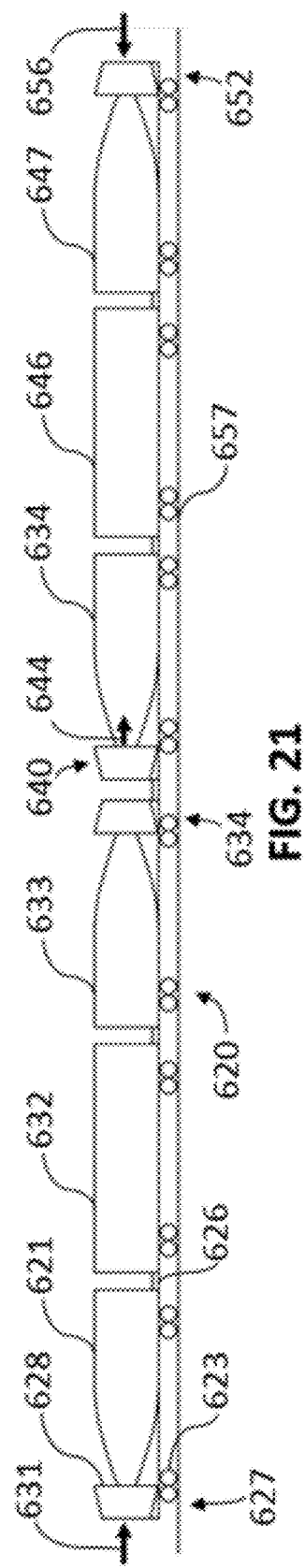

SYSTEM AND METHOD FOR FLUID MANIPULATION

This application claims the benefit of U.S. Provisional Applications No. 62/749,109, filed Oct. 22, 2018, and No. 62/751,623, filed Oct. 28, 2018, and is a continuation in part of U.S. application Ser. No. 16/101,391, filed, Aug. 10, 2018, which claims the benefit of U.S. Provisional Applications No. 62/543,371, filed Aug. 10, 2017, No. 62/685,295, filed Jun. 15, 2018, No. 62/703,898, filed Jul. 27, 2018, and No. 62/714,778, filed Aug. 6, 2018. Each of the applications listed above is incorporated by reference herein.

BACKGROUND

Many fluid interaction apparatuses suffer from large power consumption at low free stream flow velocities. For example, with helicopters, the power required during hover can be on the order of twice as large as the power consumed during a nominal level cruise. A propeller of a conventional fixed wing aircraft, or a turbofan of a commercial jet airliner, consumes a larger amount of power for a given thrust magnitude at small free stream flow velocities, such as those found during takeoff, compared to larger free stream flow velocities, such as those found during nominal level cruise. Similarly, the amount of power a conventional, open rotor wind turbine is able to extract from a fluid is unnecessarily small.

Attempts to mitigate these inefficiencies in thrust production or power extraction associated with comparatively low free stream flow velocity magnitudes are limited in effectiveness. For example, a duct can be employed to increase the local free stream flow velocity of a propeller, helicopter rotor, or wind turbine. The magnitude of this increase is determined by the geometry of the duct, which in turn is severely limited by constraints, such as constraints pertaining to flow separation. These constraints are particularly severe for small free steam flow velocities, i.e., the very regime in which the duct would be needed the most. Due to these constraints, a large effect on the local free stream flow may only be achievable with a duct with a large diffuser, which can be associated with a prohibitively large wetted area and added weight, for instance.

An object, such as a fuselage, moving relative to a fluid typically encounters a friction force, or a drag force. In the prior art, attempts to minimize this drag force are typically limited to ensuring the wetted surface of the object is as smooth as possible. In some cases, such smoothness can favor laminar flow over at least a portion of the wetted surface, which can help to reduce the viscous drag force. This drag force can be substantial even in the presence of laminar flow, however.

Aircraft, or components thereof, traveling through the air at supersonic or transonic speeds typically induce shock waves, which can contribute a substantial amount of drag to the vehicle. Ships, or components thereof, traveling through the water typically induce surface waves, or gravity waves, which can also contribute a substantial amount of drag to the vehicle. It is desirable for the wave drag contribution to the total drag of a vehicle or a component of a vehicle to be reduced.

BRIEF SUMMARY OF THE INVENTION

Some embodiments disclosed herein relate to fluid interaction apparatuses, such as aircraft, ships, or land vehicles, which are subject to drag, and wave drag in particular.

Some embodiments relate to system for reducing wave drag.

Some embodiments relate to a method for reducing wave drag.

In some embodiments an outer surface can be configured for receiving exterior fluid flow of a fluid.

In some embodiments, a channel can be coupled to the outer surface and configured for receiving an interior fluid flow of the fluid.

In some embodiments, the channel can include a fluid inlet and a fluid outlet.

In some embodiments, the channel can be configured to manipulate the interior fluid flow to reduce wave drag.

In some embodiments, the channel can include a first fluid manipulation apparatus ("FMA") that can be configured to receive the interior fluid flow downstream of the fluid inlet and can be further configured to change speed and pressure of the fluid flow within the channel.

In some embodiments, the channel can include a pressure containment apparatus ("PCA") that can be configured to receive the interior fluid flow downstream of the first FMA.

In some embodiments, the channel can include a second FMA that can be configured to receive the interior fluid flow downstream of the PCA and upstream of the fluid outlet.

In some embodiments, the second FMA can be configured to further change the speed and pressure of the interior fluid flow.

In some embodiments, the free stream can have a free stream velocity that is greater than a wave velocity of a wave within the free stream.

In some embodiments, the first FMA and/or second FMA can include one or more of: a converging duct; a converging diverging duct; a diverging duct; a propeller; a thrust generating apparatus; and/or a body force generating apparatus.

In some embodiments, the fluid can be compressible.

In some embodiments, fluid can be a gas that can be air, nitrogen, or carbon dioxide.

In some embodiments, first FMA can be configured to decelerate the interior fluid flow and increase the pressure relative to the free stream.

In some embodiments, the first FMA can be configured to decelerate the interior fluid flow to a subsonic fluid velocity.

In some embodiments, the first FMA can be configured to decelerate the interior fluid flow to a transonic velocity.

In some embodiments, the first FMA can be configured to decelerate the interior fluid flow to a lower supersonic velocity.

In some embodiments, the second FMA can be configured to accelerate the interior fluid flow and decrease the pressure relative to the free stream.

In some embodiments, the second FMA can be configured to accelerate the interior fluid flow a velocity to be substantially equal to the free stream velocity.

In some embodiments, the second FMA can be configured to accelerate the interior fluid flow a velocity to be greater than the free stream velocity.

In some embodiments, the second FMA can be configured to accelerate the interior fluid flow to be less than the free stream velocity.

In some embodiments, the fluid can be substantially incompressible.

In some embodiments, the fluid can be water.

In some embodiments, the first FMA can be configured to accelerate the interior fluid flow and decrease pressure of the interior fluid flow relative to the free stream, and thereby reduce the cross-sectional area of the interior fluid flow exiting the first FMA and entering the PCA compared to an equivalent free stream cross-sectional area.

In some embodiments, the first FMA can be configured to accelerate the interior fluid flow such that a total drag, which can include the wave drag, on a vehicle containing the system is reduced.

In some embodiments, the second FMA can be configured to decelerate the interior fluid flow and increase the pressure of the interior fluid flow relative to a free stream, and thereby increase the cross-sectional area of the interior fluid flow exiting the second FMA.

In some embodiments, the second FMA can be configured to decelerate the interior fluid flow to a velocity substantially equal to a speed of the free stream velocity.

In some embodiments, the second FMA can be configured to decelerate the interior fluid flow to a velocity greater than the free stream velocity.

In some embodiments, the second FMA can be configured to decelerate the interior fluid flow to a velocity less than the free stream velocity.

In some embodiments, the PCA can be configured to maintain a pressure difference between the interior fluid flow within the PCA and the free stream exterior to the outer surface.

In some embodiments, the PCA can include a channel with circular, rectangular, elliptical, or polygonal cross-section, and/or a straight section, a bend, an elbow joints, or a turn.

In some embodiments, the PCA can include a wing configured to generate lift and transfer a net momentum into the fluid within the PCA.

In some embodiments, the PCA can include a fuselage.

In some embodiments, the PCA can include one or more of: an intentional momentum carrying apparatus, intentional momentum shedding apparatus, a turboshaft engine, a turbofan engine, a turboprop engine, a turbojet engine, a ramjet, a thrust apparatus, a drag apparatus, a pump jet, a propeller, and/or an afterburner.

In some embodiments, the PCA can include a first thrust apparatus, where the first thrust apparatus can be configured to impart a first induced velocity to the local free stream during a nominal operating requirement. The first thrust apparatus can create a streamtube.

In some embodiments, the PCA can include a second thrust apparatus. The second thrust apparatus can be located in a downstream portion of the streamtube. The second thrust apparatus can be configured to impart a second induced velocity to the local free stream. The second induced velocity at the location of the second thrust apparatus can have a component in a direction opposite to the direction of the first induced velocity at the location of the second thrust apparatus.

In some embodiments, the first and/or second thrust apparatus can include a propeller.

In some embodiments, at least a portion of the power extracted by one of the first or second thrust apparatus can be directed to power the other.

In some embodiments, the volume between the outer surface and the inner surface can be at least part of a vehicle.

In some embodiments, the outer and inner surfaces can be configured to reduce the effect of wave drag in a free stream flow.

In some embodiments, the outer surface can be substantially parallel to free stream flow lines.

In some embodiments, the outer surface can be an annular cylinder, where the first FMA can be located at an upstream end of the cylinder, and the second FMA can be located at a downstream end of the cylinder.

In some embodiments, the outer surface of the vehicle can be in the shape of a tapered cylinder, where the radius of the cylinder can decrease in the downstream direction.

In some embodiments, the cross-sectional area of the outer surface can be circular, elliptical, rectangular, or polygonal when viewed in a free stream direction.

In some embodiments, the vehicle can be configured to take-off vertically and operate nominally without inducing a substantial amount of wave drag.

In some embodiments, the vehicle can be configured to fly subsonically and/or supersonically in level cruise without inducing a substantial amount of wave drag.

In some embodiments, the outer surface and interior surface can form an intentional momentum carrying apparatus and the system also can include a boundary apparatus. A local free stream velocity of the boundary apparatus can be reduced by the IMCA relative to the free stream velocity.

In some embodiments, the reduction in the local free stream flow velocity of the boundary apparatus can be a reduction to flow speeds above the wave speed within the local free stream fluid In some embodiments, the local free stream velocity of the boundary apparatus can be reduced to a velocity that can be substantially equal to the wave speed within the local free stream.

In some embodiments, the local free stream velocity of the boundary apparatus can be reduced to a velocity that is less than the wave velocity within the local free stream.

In some embodiments, the local free stream velocity of the boundary apparatus can be reduced to a velocity that is supersonic within the local free stream of the boundary apparatus.

In some embodiments, the local free stream velocity of the boundary apparatus can be reduced to a velocity that is transonic within the local free stream of the boundary apparatus.

In some embodiments, the local free stream velocity of the boundary apparatus can be reduced to a velocity that is subsonic within the local free stream of the boundary apparatus.

In some embodiments, the boundary apparatus can include a fuselage or the hull of a ship In some embodiments, the boundary apparatus can include a wing In some embodiments, the boundary apparatus can include a third FMA that can be configured to deliver a net induced velocity into a far wake of the third FIA.

In some embodiments, the at least a portion of the far wake of the third FMA can be located within the channel, and can be at a local free stream velocity that is less than the free stream velocity due to a velocity reduction of the local free stream by the channel upstream, downstream, and in the vicinity of the third FIA.

In some embodiments, the induced velocity delivered by the third FIA into the far wake of the third FMA can have a non-zero net component perpendicular to the local free stream flow within the PCA downstream of the third FMA.

In some embodiments, the third FIA can be a wing that can be configured to generate lift during nominal level cruise operation.

In some embodiments, at least a portion of the far wake of the wing can be located within the region of reduced local free stream flow within the channel.

In some embodiments, the far wake of the wing can extend into the free stream outside and downstream of the outlet of the channel; wingspan can be less than half the effective diameter of the channel at the location of the wing; and/or the wingspan can be less than one quarter the effective diameter of the channel at the location of the wing.

In some embodiments, the wingspan can be less than one tenth the effective diameter of the channel at the location of the wing.

In some embodiments, the induced velocity that can be delivered by the third FIA into the far wake of the third FMA can have a non-zero net component parallel to the local free stream flow.

In some embodiments, the third FIA can include a fuselage or a propeller and can be configured to generate thrust or drag during nominal level cruise operation.

In some embodiments, the boundary apparatus can be located within the streamtube formed by the leading and trailing edges of the IMCA.

In some embodiments, a first FMA can be provided.

In some embodiments, a second FMA can be provided that can be at least partially within the downstream streamtube of the first FMA.

In some embodiments, a pressure containment apparatus ("PCA") can be provided and can be configured to at least partially enclose a streamtube passing through both the first and the second FMA.

In some embodiments, the fluid can be compressible, and the first FMA can decelerate and increase the pressure of the fluid, and the second FMA can accelerate and decrease the pressure of the fluid, and a wing can be provided within the PCA such that lift is generated in a lower speed, higher pressure flow regime compared to the free stream flow.

In some embodiments, the fluid can be incompressible, and the first FMA can accelerate and decrease the pressure of the fluid, and the second FMA can decelerate and increase the pressure of the fluid, and the lower pressure and lower cross-sectional area flow can be transported via the PCA through a vehicle from the first FMA to the second FMA such that less wave drag is generated by the vehicle.

BRIEF DESCRIPTION OF THE DRAWINGS

FIGS. 19-21 are side views of various IFMA configurations, according to some embodiments.

DETAILED DESCRIPTION

Figure 1:
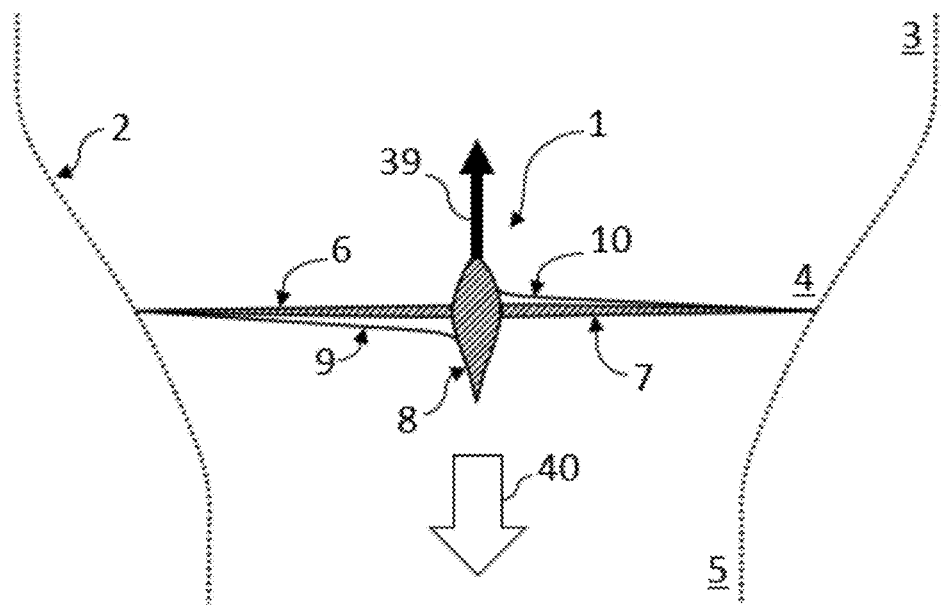
FIGS. 1 and 2 are cross-sectional views of a prior art thrust apparatuses.

The term "effective diameter" of a channel is defined as twice the square root of the division of the cross-sectional area of a channel by the number pi, where the cross-sectional area is measured at a specified location in the channel.

The term "fluid" used herein encompasses all types of materials that exhibit the properties of a fluid. One such property is the ability of constituent particles to move relative to each other. It can refer to a liquid such as water, or a gas such as air, nitrogen, or carbon dioxide, for example. Note that a fluid can comprise several different types and species of fluid simultaneously, such as air, which consists of several types of gas. Unless specified, the assembly of different fluids will still be referred to as "the fluid" for simplicity.

The term "free stream flow" is defined as the theoretical flow relative to a specified point that would occur if a body, such as an assembly of apparatuses, did not interact with the fluid. It can thus also be referred to as a global free stream flow. An assembly of apparatuses can be a vehicle, such as an aircraft or a ship, or a different type of fluid manipulation apparatus, such as a wind turbine, for example, or any portion of such an assembly. The free stream flow can comprise contributions from the motion of a specified point in inertial space, such as the motion of a vehicle in inertial space. It can also comprise contributions from the motion of the fluid in inertial space, such as wind or currents. Different specified points can experience different free stream flows. For example, an apparatus could rotate, such that different points on the apparatus move at different velocities in inertial space and experience different free stream flow velocities in a fluid that is theoretically stationary in inertial space.

The term "local free stream flow" is defined as the theoretical flow relative to a specified apparatus that would occur if only the specified apparatus did not interact with the fluid. The local free stream flow comprises a contribution of the free stream flow as well as a contribution due to other apparatuses, such as those of the remainder of an assembly, interacting with the fluid. For example, the downwash created by a horizontal fixed wing could affect the local free stream flow velocity magnitude and direction relative to a horizontal stabilizer mounted downstream of the wing.

A "fluid manipulation apparatus", or FMA, is defined as an apparatus that manipulates the properties of a fluid. For example, an FMA could change the magnitude of the flow velocity of a fluid element relative to the magnitude of a free stream flow velocity for a specified scenario or boundary condition. In another example, an FMA could change the direction of the fluid flow velocity of a fluid element relative to a free stream flow velocity direction for a specified scenario. This effect on the fluid flow can be intentional or unintentional. When at least some of the effect on the fluid is intentional, the FMA can be further classified as an "intentional fluid manipulation apparatus", or IFMA. The intentional effect on the fluid flow can only be localized for some IFMAs, as in the case of an "intentional momentum carrying apparatus", or IMCA, defined below. For other IFMAs, the intentional effect on the fluid flow can also occur in the far wake, as can be the case for an "intentional momentum shedding apparatus", or IMSA. These definitions will be clarified in the following paragraphs.

Due to the intentional nature of the momentum shedding, and IMSA can also be referred to as a "thrust apparatus", or TA, which is defined as any apparatus configured to impart an intentional rate of change of momentum to a fluid during nominal operation. An example of a TA is a conventional propeller or a helicopter main rotor. The wing of a fixed wing aircraft that provides lift during nominal constant speed cruise can also be regarded a thrust apparatus. There are many other possible types of TAs available. For example, the rate of change of momentum could be applied to the fluid by a TA via electromagnetic forces. For example, the TA can be a Hall-effect thruster, or a magnetohydrodynamic (MHD) drive. A Voith Schneider thruster, a cyclogyro, or a similar device are also examples of a TA.

In the aforementioned definition of a thrust apparatus, the requirement of imparting an intentional rate of change of momentum to a fluid can be described in several ways. For example, consider a thrust apparatus in isolation from other fluid manipulation apparatuses in an assembly of apparatuses. For instance, consider a wing in isolation from the remainder of a fixed wing aircraft. Or consider a helicopter main rotor in isolation from the remainder of a conventional helicopter. In a theoretical scenario, denoted the "isolated scenario", a thrust apparatus is considered in isolation and defined or characterized by the fact that there is an intentional, non-zero induced flow in the far wake relative to the thrust apparatus during a nominal operating condition.

The nominal operating condition can, in some instances, involve a free stream flow velocity magnitude and direction which is uniform in space and time. In some examples, the operating conditions during constant velocity cruise can be described as a nominal operating condition. The far wake is located an infinite distance from the thrust apparatus in this nominal operating condition. In other words, the thrust apparatus has an intentional, non-negligible effect on the flow field an infinite distance from the thrust apparatus compared to the free stream flow field.

The term "intentional" as defined and used herein, refers to the requirement that the rate of change of momentum be useful or deliberate. For example, a useful rate of change of momentum can contribute to an average induced velocity of a fluid element in the far wake in the aforementioned isolated scenario, where the velocity has a non-zero component in a direction opposite to the direction of the intended thrust or lift. For some thrust apparatuses, the average induced velocity of a fluid element in the far wake has a substantial component in a direction opposite to the direction of the intended thrust or lift. The far wake induced flow of a fixed wing or a helicopter main rotor which is associated with the production of lift or thrust is considered intentional. The associated rate of change of momentum of the fluid in the proximity of the thrust apparatus is also considered intentional. An intentional effect of a thrust apparatus on the far wake is distinguished from unintentional, not useful, or counter-productive effects on the fluid flow field in the far wake, which can be associated with profile drag, pressure drag acting on some elements of the thrust apparatus, for instance. These unintentional effects increase the power consumption unnecessarily, i.e. compared to a theoretical situation in which these effects are mathematically removed, ceteris paribus.

The requirement of imparting an intentional rate of change of momentum to a fluid can also be described in another way. For example, a thrust apparatus can also be defined as any apparatus which can be considered to intentionally shed vortices in the simplified framework of Prandtl lifting-line theory. A thrust apparatus, or TA, or IMSA, can therefore also be described as an "intentional vortex shedding apparatus", or IMSA. Note that the framework of lifting-line theory should only be considered as a reference or a guide, since it relies on simplified assumptions, such as inviscid and incompressible flow. The vortices which are intentionally or deliberately shed by a thrust apparatus contribute to the lift or thrust force acting on the thrust apparatus by imparting a rate of change of momentum to a fluid. When a thrust apparatus is considered in the aforementioned isolated scenario during nominal operating conditions, the intentionally shed vortices are also present an infinite distance from the thrust apparatus, where they generate an intentional induced flow. In other words, there is a non-zero, intentional, far wake induced flow velocity on account of, or produced by, the thrust apparatus. Note that a thrust apparatus can also be considered to shed vortices unintentionally in some models, such as mathematical models taking into account viscous drag or boundary layer effects in the form of theoretical shed vortices. Unintentional vortex shedding refers to any vortices which are not shed deliberately, i.e. any vortices which do not perform, or contribute to, a useful function such as the generation of lift or thrust.

An intentional momentum carrying apparatus, or IMCA, is a fluid manipulation apparatus which, when considered in an isolated scenario, does not intentionally shed momentum into the far wake. An example of an IMCA is a duct or a conventional tubular, or cigar shaped, axially symmetric fuselage. A fuselage modifies the free stream flow by intentionally deflecting the flow around the fuselage, which also increases the magnitude of the velocity of the flow in the proximity of the fuselage for the isolated scenario in which the fuselage is considered in isolation of any other fluid manipulation apparatuses, such as wings, for a nominal operating condition, such as constant velocity cruise. The aforementioned intentional deflection of the flow is localized to the vicinity of the fuselage. Thus, a fluid element in the proximity of a fuselage experiences an intentional, localized rate of change of momentum. In the ideal case, there is no effect on the fluid flow at an infinite distance from the fuselage. In other words, there is no intentional far wake effect on the fluid flow due to the fuselage. There can be an unintentional rate of change of momentum of the fluid in the proximity of the fuselage, which can also be associated with an unintentional change of momentum of a fluid element an infinite distance from the fuselage in the isolated scenario compared to the free stream flow. Such an unintentional change in the fluid flow in the far wake can arise from profile drag effects, for example.

Similarly, a duct modifies the free stream flow by intentionally modifying the magnitude of the flow velocity in the proximity of the duct. For example, a duct can be configured to reduce the magnitude of the flow velocity of a fluid element at the center of the circular duct relative to the free stream flow for an isolated scenario during nominal operating conditions. In this case the nominal operating conditions can refer to a constant and uniform free stream flow velocity parallel to the central axis of symmetry of the duct.

This intentional modification is only localized in the proximity of the duct, and converges to a negligible value an infinite distance from the center of the duct. Thus, there is no intentional far wake effect on the fluid flow due to the duct, i.e. there is no far wake intentional induced flow velocity of a fluid element due to the interaction of the duct with the fluid. As before, there can be an unintentional modification of the fluid flow in the far wake, and associated unintentional rate of change of momentum of the fluid in the proximity of the duct, due to drag forces or transient effects.

An IMCA can also be described in the simplified framework of lifting-line theory. An IMCA can be considered to carry an enclosed or bound vorticity. As such, an IMCA can also be considered to be an "intentional vortex carrying apparatus", or IMCA. For example, the intentional effect of a circular, axially symmetric duct on the fluid can be modelled as a circular vortex ring, or a two- or three-dimensional continuous distribution of vorticity, or incrementally small, discrete vortex rings. Note that no intentional vorticity is shed into the fluid during a nominal operating condition, in which the magnitude of the vorticity is constant in time and uniform along the circumference of the vortex ring. Similarly, the intentional effect of a fuselage on the fluid flow can also be modelled as a three-dimensional continuous distribution of vorticity contained within the fuselage or located on the surface of the fuselage, i.e. the interface between the fuselage and the fluid.

The "induced power" of an IMSA is the rate of change of energy of the fluid that is associated with the intentional rate of change of momentum of the fluid. Any other power consumption is accounted for in "zero-lift power", or "profile power". Note that the term "lift" also encompasses thrust in this context. Note that an IMCA does not consume any induced power. Any power losses associated with a pure IMCA are considered profile power losses. An IMSA is able to consume induced power, in which case intentional work is done by the fluid manipulation apparatus on the fluid. For example, a propeller of an aircraft or a ship, or the fixed wing of a conventional fixed wing aircraft, results in, or is associated with, an induced power consumption. An IMSA is also able to recover induced power, in which case work is done by the fluid on the fluid manipulation apparatus intentionally. For example, the power generated by a wind turbine can be considered to be induced power.

In the process of applying a rate of change of momentum to a fluid, a fluid manipulation apparatus can change the flow velocity relative to the local free stream velocity. This change in velocity is the "downwash", or "induced velocity". Note that the induced velocity can be directed downstream or upstream, or perpendicularly to the stream, for example. An induced velocity can be generated by an IMSA or an IMCA. In the latter case, the induced velocity is localized, i.e. confined to the vicinity of the IMCA. In these terms, an IMSA can also be characterized as an apparatus, which contributes an intentional induced velocity to the far wake in an isolated scenario. Note that an induced velocity contribution by one IMSA can be cancelled by another IMSA when both are IMSAs are considered together.

In the following paragraphs, and in the context of FIGS. 1-2, several apparatuses and methods used in the prior art will be discussed.

FIG. 1 is a cross-sectional view of a prior art TA. It shows a propeller 1, where the thrust of propeller 1 is directed towards the top of the figure, as indicated by thrust vector 39. In the depicted operating condition, there is a non-zero free stream flow flowing from the top of the figure to the bottom, as indicated by arrow 40.

The dotted line schematically indicates the approximate boundary 2 between the free stream flow and the flow flowing through the rotor disc. A line that lies on the boundary can be described a streamline, and the volume enclosed by the boundary can be described as a streamtube. Note that the boundaries shown in the figures are only examples for a certain operating condition. The shape of the boundaries can be very different for other operating conditions or modes of operation of the depicted TAs, such as hover or energy extraction from free stream flow such as wind or water currents. In the free stream far ahead of the propeller the flow is approximately equivalent to the free stream flow.

This state of the fluid is indicated by station 3 in FIG. 1. The properties of the fluid at the propeller are encapsulated by station 4. The flow in the far wake, or the free stream far downstream of the propeller, is referred to by station 5. Since the propeller accelerates the flow, the area of the streamtube decreases from station 3 to station 4 and from station 4 to station 5.

At station 5 the flow has a larger velocity magnitude than the free stream flow, such as the flow found at station 3, while the pressure of the flow inside the streamtube can be assumed to have returned to the free stream pressure in the framework of conventional simple momentum theory. The larger velocity at station 5 is indicative of an increase in momentum of the fluid as a result of the propeller accelerating the flow and experiencing an equal and opposite force or thrust. The higher velocity also results in a larger kinetic energy in the fluid, which, in the aforementioned framework, is indicative of the power required to provide the thrust.

Note that simple momentum theory is only used as a framework to describe the basic principles of lift using a TA, and the assumptions conventionally contained within this theory are not intended to apply to embodiments or limit scope. For example, the distribution of downwash need in general not be constant across the cross-section of the streamtube. Note that the plotted radii of the streamtube at each station are approximate, and only intended to indicate the general shape of the streamtube.

The cross-sectional view of the propeller shows a first propeller blade 6 and a second propeller blade 7. The trailing edge 9 of the first propeller blade 6 and the leading edge 10 of the second propeller blade 7 are also visible. In all figures containing propellers a similar configuration is shown.

Figure 2:
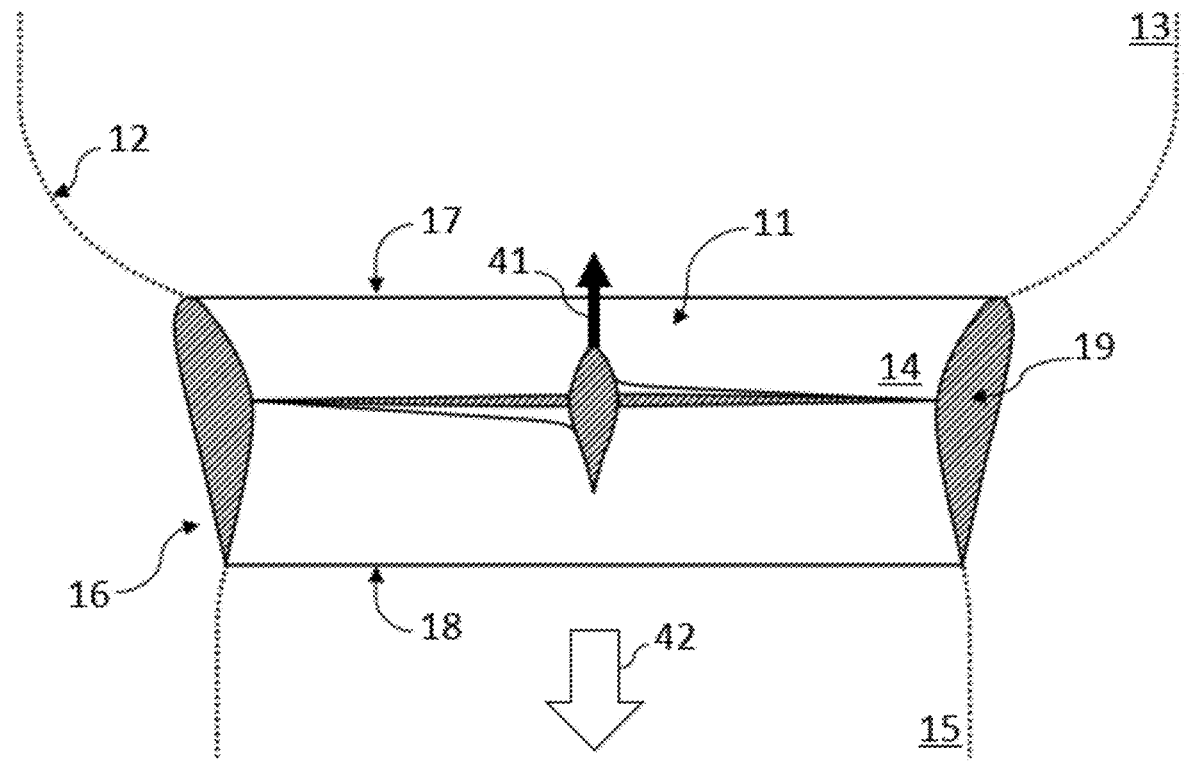

FIG. 2 is a cross-sectional view of another prior art TA. It shows a ducted propeller, where the thrust of propeller 11 is directed towards the top of the figure, as indicated by thrust vector 41. In the depicted operating condition, there is a non-zero free stream flow flowing from the top of the figure to the bottom, as indicated arrow 42. There is an additional thrust produced by duct 16, with leading edge 17 and a trailing edge 18, and a cross-section 19. Similarly to FIG. 1, there is a streamtube boundary 12, with a far upstream station 13, a station 14 at the rotor, and a far wake station 15. The duct 16 encloses the propeller 11 circumferentially.

In accordance with some embodiments, an apparatus and method is provided which can modify the flow more effectively than methods employed in the prior art. The modification can refer to, but is not limited to, the flow velocity at a specified location(s) in the flow, and can apply to, but is not limited to, the generation of thrust.

The method comprises providing a thrust apparatus assembly with an upstream thrust apparatus configured to produce an intended force, or thrust, in a first direction relative to the free stream flow during nominal operation, and further providing the thrust apparatus assembly with at least a downstream thrust apparatus, where the downstream thrust apparatus is placed at least partially in at least a portion of the downstream streamtube of the upstream thrust apparatus, and where the downstream thrust apparatus is configured to produce a thrust with at least a vector component parallel to the direction of the induced velocity vector of the upstream thrust apparatus at the location of the downstream thrust apparatus in the streamtube of the upstream thrust apparatus, where the thrust of the downstream thrust apparatus meets this direction criterion over at least a portion of the area of overlap between the streamtube of the upstream thrust apparatus and the streamtube of the downstream thrust apparatus. A thrust apparatus assembly can include at least 2 thrust apparatuses.

Note that the streamtube can be curved by external lifting apparatuses or thrust apparatuses. In some instances, the induced velocity vector of the upstream thrust apparatus at the location of the downstream thrust apparatus need no longer be aligned with the thrust experienced by the upstream thrust apparatus. In some instances, it can also be no longer aligned with the induced velocity vector of the upstream thrust apparatus at the location of the upstream thrust apparatus. The induced velocity vector of the downstream thrust apparatus at the location of the downstream thrust apparatus is configured to have at least a component in a direction opposite the induced velocity vector of the upstream thrust apparatus at that location. The thrust experienced by the downstream thrust apparatus therefore does not have to have a component in the opposite direction of the thrust of the upstream thrust apparatus.

Alternatively, the method comprises providing a thrust apparatus assembly with an upstream thrust apparatus configured to impart a first rate of change of momentum in at least an intended direction relative to the free stream flow velocity vector, and further providing the thrust apparatus assembly with at least a downstream thrust apparatus, where the downstream thrust apparatus is placed at least partially in at least a portion of the downstream streamtube of the upstream thrust apparatus, and where the downstream thrust apparatus is configured to impart a second rate of change of momentum on the fluid in the streamtube of the upstream thrust apparatus, where the direction of this second rate of change of momentum has at least a component in the opposite direction of the effect of the first rate of change of momentum on the fluid in the streamtube of the upstream thrust apparatus for at least a portion of the area of overlap between the streamtube of the upstream thrust apparatus and the streamtube of the downstream thrust apparatus.

Alternatively, the method comprises providing a thrust apparatus assembly with an upstream thrust apparatus configured to deliver an intended amount of induced power to a fluid, and further providing the thrust apparatus assembly with at least a downstream thrust apparatus, where the downstream thrust apparatus is placed at least partially in at least a portion of the downstream streamtube of the upstream thrust apparatus, and where the downstream thrust apparatus is configured to extract an intended amount of induced power from the fluid over at least a portion of the area of overlap between the streamtube of the upstream thrust apparatus and the streamtube of the downstream thrust apparatus.

Alternatively, the method comprises providing a thrust apparatus assembly with an upstream thrust apparatus configured to extract an intended amount of induced power from a fluid, and further providing the thrust apparatus assembly with at least a downstream thrust apparatus, where the downstream thrust apparatus is placed at least partially in at least a portion of the downstream streamtube of the upstream thrust apparatus, and where the downstream thrust apparatus is configured to deliver an intended amount of induced power to the fluid over at least a portion of the area of overlap between the streamtube of the upstream thrust apparatus and the streamtube of the downstream thrust apparatus.

One of the benefits of such a thrust apparatus assembly is the modification of the flow speed at specified points within the streamtube. For example, at a station between the upstream and downstream thrust apparatuses, the flow speed can be artificially increased. In the ideal case, any work done by the upstream thrust apparatus can be recovered by the downstream thrust apparatus, resulting in minimal energy losses in the process. Furthermore, any undesired change of momentum imparted to the fluid by an upstream thrust apparatus can be removed by a downstream thrust apparatus. In other words, any undesired thrust experienced by the upstream thrust apparatus can be cancelled by the downstream thrust apparatus. Some embodiments thus provide a method for flow modification, where the method can be more effective than methods employed in the prior art.

Figure 3:
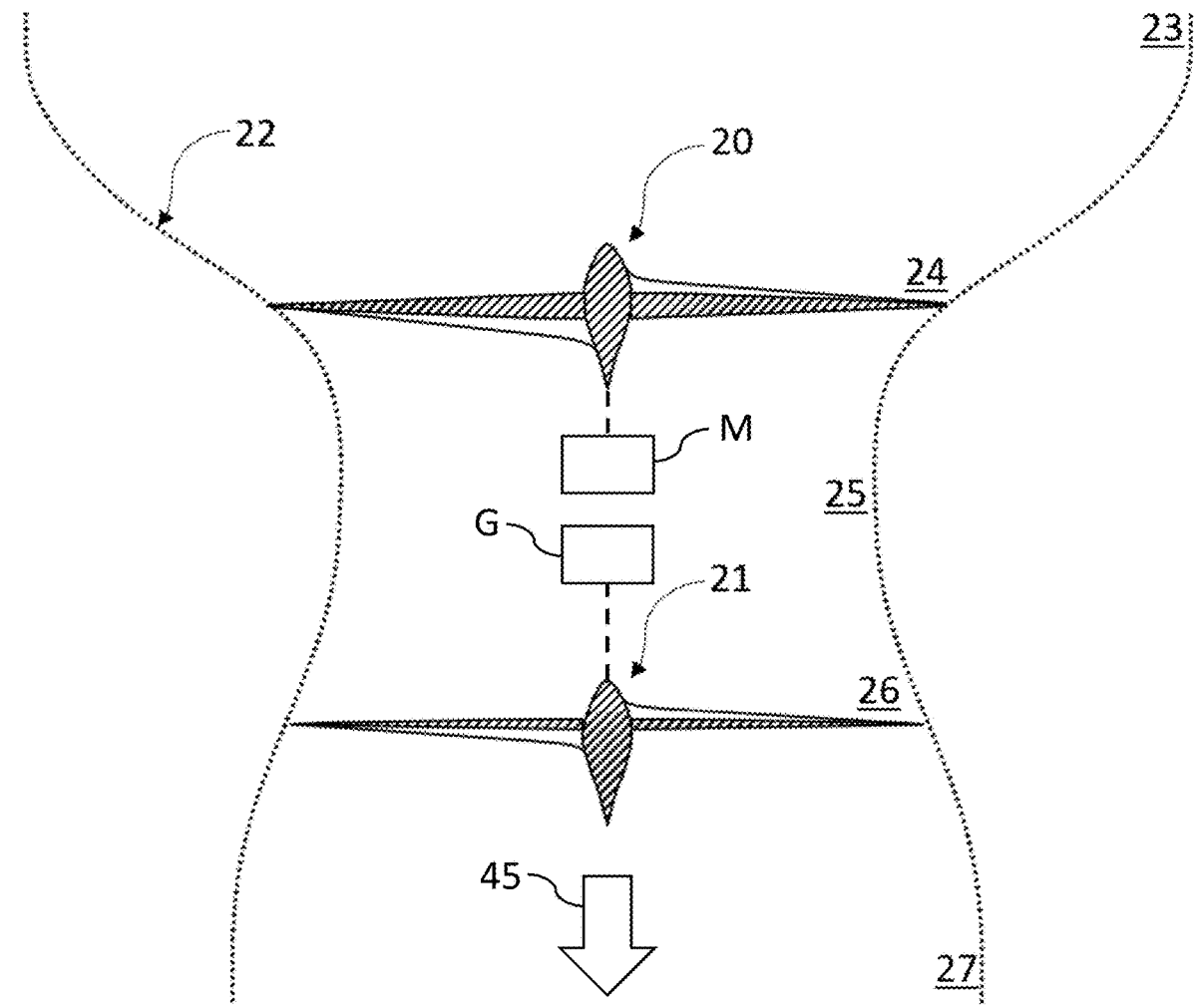
FIG. 3 is a cross-sectional view of an intentional fluid manipulation apparatus ("IFMA") configuration, according to some embodiments.

There are a multitude of possible embodiments of apparatuses employing the method outlined above. One embodiment is shown in FIG. 3. The figure shows a thrust apparatus assembly comprising an upstream thrust apparatus 20, which can be classified as a propeller, and a downstream thrust apparatus 21, which can also be described as a propeller in this case. In other embodiments, the thrust apparatus 20 or 21 can be of a type other than an open rotor type depicted. For example, a thrust apparatus can comprise several open rotors, or it can comprise at least one ducted fan, or a pair of coaxial counter-rotating propellers. Similarly to FIG. 1, there is a streamtube boundary 22, with a far upstream station 23, a station 24 at the upstream thrust apparatus 20, a station 25 between the upstream 20 and downstream thrust apparatus 21, a station 26 at the downstream thrust apparatus 21, and a far wake station 27. The downstream thrust apparatus 21 is placed in the streamtube 22 of the upstream thrust apparatus 20 in this case.

In this example, the thrust apparatus assembly is required to provide a net thrust, which is directed vertically upwards, towards the top of the figure, as indicated by thrust vector 43. There is a free stream flow from the top of the figure towards the bottom, as indicated by arrow 45. The purpose of the embodiment in this example is to reduce the induced power of the thrust apparatus assembly for a given amount of thrust compared to a baseline configuration. The baseline configuration in this case is a single open rotor such as the open rotor example illustrated in FIG. 1, where the net thrust and actuator disc area at station 4 and 24 are identical.

In accordance with some embodiments, this is accomplished by the IFMA configuration shown in FIG. 3 as follows. The upstream thrust apparatus 20 is configured to provide a thrust which is parallel to and larger than the net thrust required of the thrust apparatus assembly, where the net thrust is the thrust of the upstream thrust apparatus 20 added to the thrust of the downstream thrust apparatus 21. The net thrust on the thrust apparatus assembly needs to equal the required thrust. Accordingly, the thrust on the downstream thrust apparatus 21 is equal to the difference in the net thrust and the thrust of the upstream thrust apparatus 20. In this case, this results in a thrust on the downstream thrust apparatus 21, which is directed vertically downwards, towards the bottom of the figure, as indicated by thrust vector 44, pointing in the opposite direction of the thrust on the upstream thrust apparatus 20. In other words, the downstream thrust apparatus 21 is configured to extract any momentum imparted to the fluid by the upstream thrust apparatus which would violate, and in this case exceed, the net required thrust constraint on the thrust apparatus assembly. The downstream thrust apparatus 21 is furthermore configured to extract power from the fluid. In order to improve the induced power consumption compared to the baseline, a sufficient portion or all of the extracted induced energy needs to be recovered reversibly or directly transmitted to the upstream thrust apparatus 20.

Energy can be recovered reversibly by storing it reversibly within the thrust apparatus assembly, or transferring it reversibly to another apparatus interfacing with the thrust apparatus assembly. For example, the downstream thrust apparatus can drive a generator G, which can comprise an electric motor configured to convert a portion of the mechanical energy into electrical energy. A portion the electrical energy can be stored reversibly in a battery, capacitor or other energy storage device. The battery can be located within the thrust apparatus assembly, or on an external apparatus attached to the thrust apparatus assembly, such as the remainder of a vehicle. The energy can also be extracted and stored mechanically in the form of a flywheel.

Energy can be directly transmitted to the upstream thrust apparatus 20 in several ways. For example, if the energy is extracted from the downstream thrust apparatus 21 by an electric generator G, the electrical energy can be transmitted to an electric motor M driving the upstream thrust apparatus 20 via electrical conductors, or wires. Alternatively, the power extracted by the downstream thrust apparatus can be transmitted mechanically in the form of a drive shaft rigidly connecting the upstream 20 and downstream thrust apparatus 21. In some embodiments, the mechanical energy transmission apparatus need not form a rigid connection, but comprise adjustable linkages, gears and other mechanisms, such as clutches.

There are a multitude of other methods known in the art for recovering mechanical energy from the downstream thrust apparatus 21, and storing it, or transmitting it to the upstream thrust apparatus 20.

The above embodiment results in an induced power which is less than the baseline induced power. For a given maximum actuator disc area at station 4 and 24, and a given net thrust, the induced power decreases as the thrust of the upstream thrust apparatus 20 increases. Note that the thrust of the upstream thrust apparatus 20 needs to be larger than the net required thrust in order to achieve a reduction in induced power compared to be baseline in this example.

Some embodiments provide an improvement on a ducted thrust apparatus as exemplified by FIG. 2. The duct has several advantages, such as a reduction in the tip losses of the propeller, which allow it to operate at a lower induced power for the same amount of thrust compared to an open rotor. A duct also has several disadvantages. It can increase the weight of the TA as well as the wetted area and the associated drag. The effectiveness of a duct is furthermore limited by the risk of flow separation in the diffusor. In addition, changing the shape of a duct to achieve efficiency gains at different flow speeds often impractical due to complexity and weight.

Some embodiments are less affected by some of these disadvantages. For some ductless embodiments, a thrust apparatus can experience benefits of a duct without an equivalent penalty in weight and wetted area. In order to avoid flow separation, ducts would require a large diffusor, which can be impractical due to weight and size constraints. Ductless embodiments are less sensitive to stall constraints, which would allow some embodiments to achieve greater performance than ducted rotors. The thrust apparatuses can also be reconfigured with less complexity than ducts. For example, a thrust apparatus of the open rotor type can be reconfigured by varying the collective pitch of the propeller blades, and the rotational speed can be readily controlled. This could allow a thrust apparatus to operate more efficiently with less complexity at different operating conditions, such as hover or level cruise.

Note that in FIG. 3 the upstream thrust apparatus 20 provided the required thrust of the particular thrust apparatus assembly as well as additional thrust that is cancelled by the downstream thrust apparatus 21. In some embodiments, it can be desirable to physically separate the thrust apparatuses that cancel each other in their contribution to the net thrust of a thrust apparatus assembly from the remainder of the thrust apparatus assembly.

Figure 4:
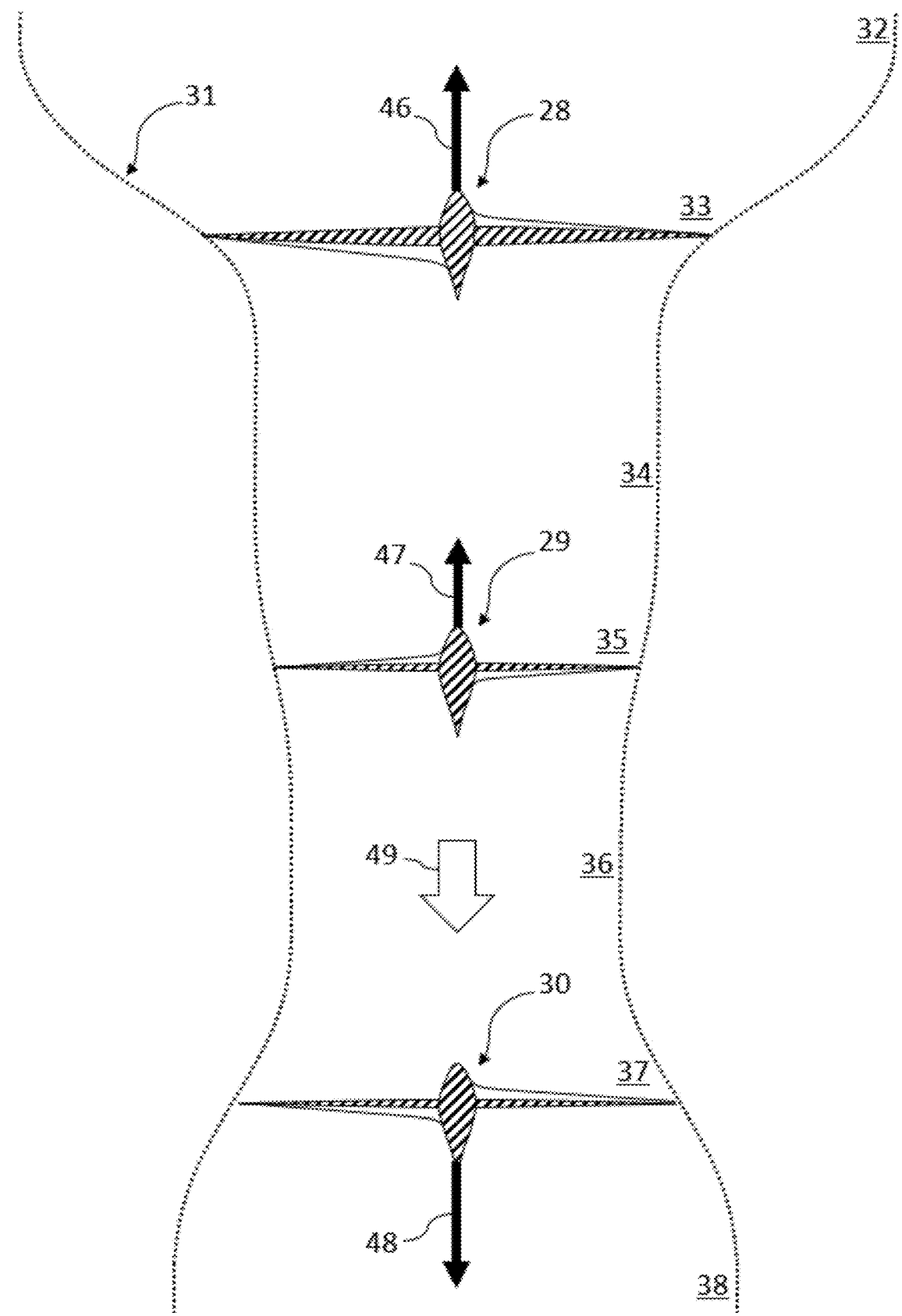
FIG. 4 is a cross-sectional view of an IFMA configuration, according to some embodiments.

FIG. 4 illustrates such a scenario. The figure shows an auxiliary thrust apparatus assembly comprising an upstream thrust apparatus 28, which can be classified as a propeller, and a downstream thrust apparatus 30, which can also be described as a propeller in this case. The figure also shows a middle thrust apparatus 29, which is also of the open rotor type. There is a free stream flow directed vertically downwards from the top of the figure towards the bottom, as indicated by arrow 49. Similarly to FIG. 1, there is a streamtube boundary 31, with a far upstream station 32, a station 33 at the upstream thrust apparatus 28, a station 34 between the upstream 28 and middle thrust apparatus 29, a station 35 at the middle thrust apparatus 29, a station 36 between the middle 29 and downstream thrust apparatus 30, a station 37 at the downstream thrust apparatus 30, and a far wake station 38. The middle thrust apparatus 29 and downstream thrust apparatus 30 are placed in the streamtube 31 of the upstream thrust apparatus 28 in this case.

In this example, middle thrust apparatus 29 provides a thrust equal to the required net thrust of the total thrust apparatus assembly, as indicated by thrust vector 47, where the thrust apparatus assembly comprises the upstream 28, middle 29 and downstream 30 thrust apparatuses. Therefore, the auxiliary thrust apparatus assembly is required to provide no net thrust. As in FIG. 3, the purpose of the embodiment in this example is to reduce the induced power of the total thrust apparatus assembly for a given amount of thrust compared to a baseline configuration. The baseline configuration in this case is also a single open rotor such as the open rotor example illustrated in FIG. 1, where the net thrust and actuator disc area at station 4 and station 33 are identical.

In accordance with some embodiments, this is accomplished by the embodiment shown in FIG. 4 as follows. The upstream thrust apparatus 28 is configured to provide a thrust which is parallel to and larger than the net thrust required of the total thrust apparatus assembly, where the net thrust is the thrust of the upstream thrust apparatus 28, added to the thrust of the middle thrust apparatus 29, added to the downstream thrust apparatus 30. The thrust of the upstream thrust apparatus 28 is thus directed in towards the top of the page, as indicated by thrust vector 46. The thrust on the downstream thrust apparatus 30 is in this case equal and opposite to the thrust of the upstream apparatus 28, as indicated by thrust vector 48. In other words, the downstream thrust apparatus 30 is configured to extract any momentum imparted to the fluid by the upstream thrust apparatus which would violate, and in this case exceed, the net required thrust constraint on the total thrust apparatus assembly. The downstream thrust apparatus 30 is furthermore configured to extract power from the fluid, in a manner described previously in regards to the downstream thrust apparatus 21 in FIG. 3.

Note that the upstream and downstream thrust apparatus do not have to individually operate at minimum induced power as long as the overall induced power is minimized, should that be the objective. For example, if the objective is to maintain a constant downwash across the cross-section of the far stream streamtube at station 38, the downwash of the upstream thrust apparatus 28 or the middle thrust apparatus 29 does not have to be uniform, as long as any non-uniformity is removed by the downstream thrust apparatus.

Note that principles that apply to coaxial propellers also apply to some embodiments. For example, the actuator disc area at station 35 of the middle thrust apparatus 29 can be as large as the actuator disc area of the upstream thrust apparatus 28 at station 33. A portion of the middle thrust apparatus is thus interfacing with the free stream flow. The middle thrust apparatus can use this area to further impart a rate of change of momentum to the fluid in the direction of the required thrust of the total thrust apparatus assembly. This could allow the thrust apparatus assembly to further reduce the induced power compared to the baseline. Similarly, one can also increase the actuator disc area of the downstream thrust apparatus, such as 30 in FIG. 4 or 21 in FIG. 3. The concept of interacting with bypass fluid flow is well known in the art. Furthermore, as is known in the prior art, the direction of rotation of the propellers in the streamtube can be chosen such that the swirl in the far wake is minimized.

In the following paragraphs, other embodiments will be described.

For generality it is instructive to consider the embodiments in isolation. In one embodiment, the purpose of an apparatus is to increase the local flow velocity relative to the free stream flow at a specified point in the flow. This can be achieved by a thrust apparatus assembly with an upstream thrust apparatus configured to impart a rate of change of momentum downstream, resulting in a downstream induced flow velocity vector. The upstream thrust apparatus is located upstream of the specified point in the flow, and experiences a thrust in the upstream direction, and doing work on the fluid, resulting in an induced power consumption. The thrust apparatus assembly can further comprise a downstream thrust apparatus, which is configured to impart a rate of change of momentum upstream, resulting in an upstream induced flow velocity vector. The downstream apparatus is located in the streamtube of the upstream thrust apparatus. The downstream thrust apparatus is located downstream of the specified point in the flow, and experiences a thrust in the downstream direction, and is recovering power from the fluid. In the ideal case, all the induced power imparted by the upstream apparatus to the fluid is recovered by the downstream apparatus, such that no net induced power is lost to the fluid. The thrust on the upstream and downstream thrust apparatuses furthermore cancel, in this idealized case with a requirement of zero net thrust of the thrust apparatus assembly. As long as the upstream and downstream thrust apparatus assemblies are located far enough apart to allow for flow acceleration, the specified point located between the upstream and downstream thrust apparatuses can experience the desired increase in local flow velocity. This is due to the induced flow, or the downwash of the upstream thrust apparatus as well as the downwash, of the downstream thrust apparatus. This downwash can subsequently be recovered further downstream of the specified point by the downstream thrust apparatus, such that in the ideal case no downwash is present in the far wake of the streamtube.

In another embodiment, the purpose of an apparatus is to decrease the local flow velocity at a specified point in the flow. In accordance with some embodiments, this can be achieved by reversing the roles of the upstream and downstream thrust apparatuses compared to the above example. Thus the upstream thrust apparatus can be configured to impart a rate of change of momentum upstream, resulting in an upstream induced flow velocity vector. Similarly, the downstream thrust apparatus can be configured to impart a rate of change of momentum downstream, resulting in a downstream induced flow velocity vector. In the ideal case, all the induced power recovered by the upstream apparatus is expended by the downstream apparatus, such that no net induced power is extracted from the fluid by the thrust apparatus.

Note that the upstream thrust apparatus needs to meet the local flow velocity requirement only at the specified point. Different points in the streamtube containing the actuator disc area of the upstream thrust apparatus can require different increases or decreases in local flow velocities compared to the free stream flow. The local flow velocity requirements can be treated as requirements on the downwash of the thrust apparatus assembly at the specified points or collections of points in a streamtube, or in proximity of a streamtube. These requirements can be met by varying the thrust distribution across the actuator disc area of the upstream and downstream thrust apparatuses. Given these flow constraints at the specified points, there might be an additional objective, such as the minimization of induced power, which can be translated to an additional requirement of either zero or uniform downwash in the far wake. The objective can also be the minimization of total power consumed at this operating condition.

Consider an operating condition for a thrust apparatus assembly, for which the purpose is to maximize the power extracted from a fluid for a given maximum actuator disc area and free stream flow speed, assuming structural constraints are always satisfied. One can consider a baseline configuration consisting of an open rotor, such as a wind turbine. In accordance with some embodiments, a thrust apparatus assembly could comprise an upstream and a downstream thrust apparatus. The downstream thrust apparatus is placed in the slipstream of the upstream thrust apparatus, in this example. There is a non-zero free stream flow. The upstream thrust apparatus is configured to do work on the free stream flow by imparting a rate of change of momentum on the flow in a downstream direction. Through interaction with the fluid the upstream thrust apparatus is thus experiencing a force which is directed upstream. The downstream thrust apparatus is configured to extract power from the flow in the streamtube of the upstream thrust apparatus. In other words, the fluid is doing work on the downstream thrust apparatus, and experiencing a rate of change of momentum directed upstream, such that the downstream thrust apparatus is experiencing a force in the downstream direction. Thus a performance improvement can be achieved compared to the baseline open rotor configuration. For example, a wind turbine can comprise two open rotors, where one is located upstream of the mast, and the other is located downstream. The rotors can be operated as described above. The power consumed by the upstream rotor can be provided by an external power source, or by the downstream rotor. As mentioned in the description of FIG. 3, the power can be transmitted between the upstream and downstream thrust apparatus mechanically via a direct connection with a shaft, or via an adjustable transmission comprising a gear train and clutch, for example. The power can also be transmitted electrically, where the downstream rotor is driving an electric generator, the electric energy of which is transferred to an electric motor driving the upstream rotor. Note that other configurations are also possible, and that the principles also apply to a water turbine or other thrust apparatus or operating condition In some embodiments or operating conditions, it can be desirable to reduce the local flow speed at the actuator disc of the downstream rotor rather than increase it. For example, in the case of the wind turbine, for some operating conditions, the free stream flow velocity may exceed the allowed peak free stream flow velocity of the downstream rotor. Note that the peak free stream flow velocity for the upstream rotor, as determined by structural limits, for instance, can be larger than the peak free stream flow velocity of the downstream rotor due to their different sizes and nominal operating loads. They can also be different by design. In this case, the thrust on the upstream rotor could be reversed, such that it extracts power from the flow and reduces the flow speed at the downstream rotor to nominal levels. In this way the thrust on the downstream rotor can be prevented from exceeding design limits. Thus the upstream thrust apparatus can be used to modify the flow field such that the performance of the entire thrust apparatus assembly is optimized. Note that there are other methods known in the art which are applicable to such a scenario. In the case of a single open rotor, the operating conditions such as rate of rotation and propeller pitch can be adjusted. The effectiveness of these methods is limited to a range of free stream velocities, however, and some embodiments can expand these limits. The principles described in this context are also applicable to other operating conditions and scenarios.

In the following paragraphs, and in the context of FIG. 5, some apparatuses and methods used in the prior art will be discussed.

A "boundary apparatus" comprises any incremental surfaces or volumes of a fluid manipulation apparatus which directly apply forces or moments to fluid elements, or vice versa. Examples of a boundary apparatus are the wetted surface of a fuselage of an aircraft, or the wetted surface of the hull of a ship, the skin of a wing, the surface of a flat plate, or the outside surface of a car.

Figure 5:
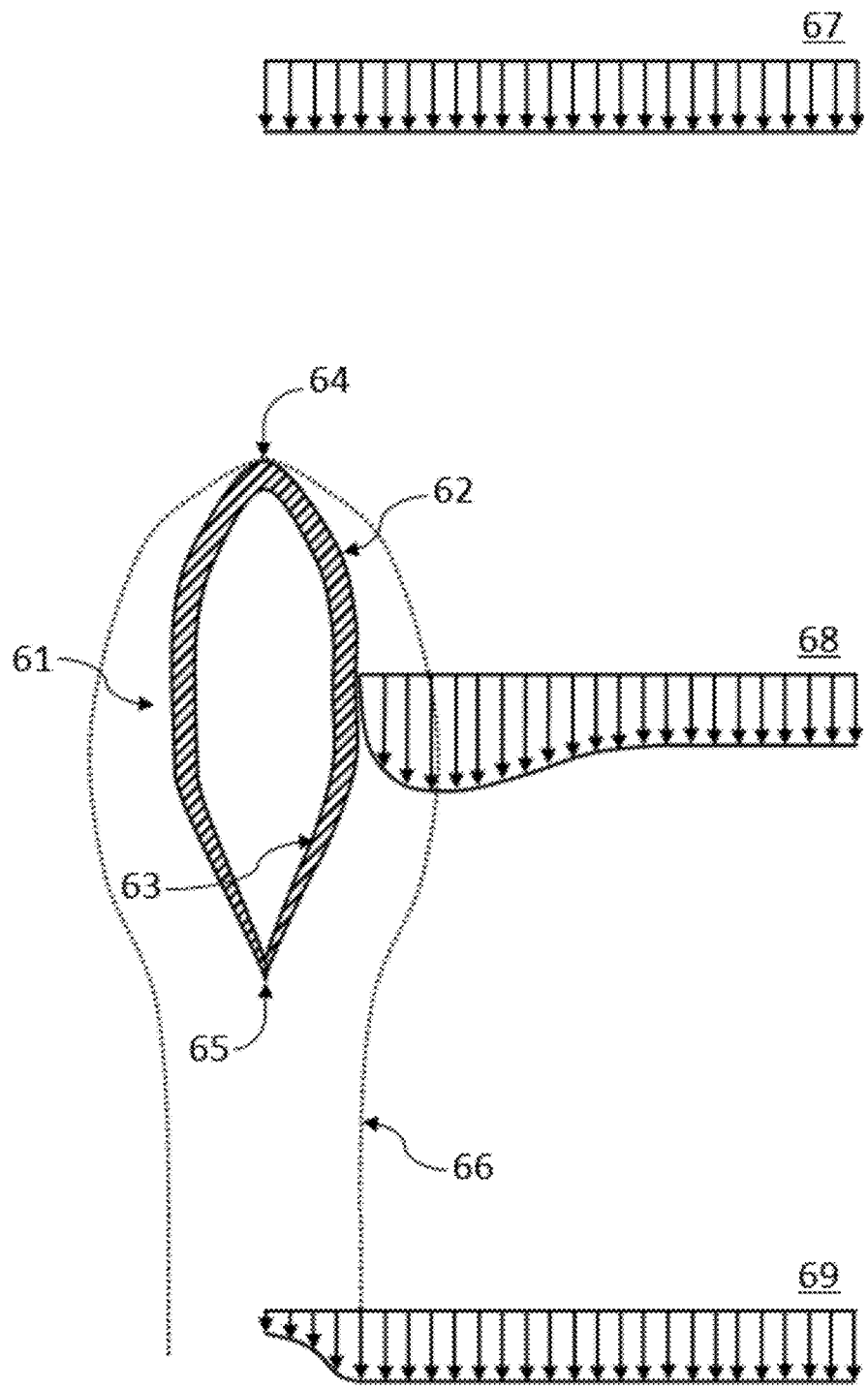
FIG. 5 is a cross-sectional view of a prior art fluid manipulation apparatus.

FIG. 5 shows a cross-sectional view of a boundary apparatus 61 moving relative to a surrounding fluid. Boundary apparatus 61 has a leading point 64, and a trailing point 65. The leading and trailing point can also be an edge, such as the leading edge or trailing edge of a wing. In this particular embodiment, for simplicity, the boundary apparatus is a rigid body which can be described as a thin shell, with a closed outside surface 62 and inside surface 63. In this embodiment, the shape of boundary apparatus 61 is a revolute shape, i.e. it is axially symmetric about an axis passing through the leading point 64 and trailing point 65.

One can define a "boundary apparatus frame", or "BAF", as follows. The origin is located at the geometric centroid of the volume enclosed by outside surface 62 of boundary apparatus 61. The x-axis is coincident with the straight line connecting the leading point 64 with the trailing point 65, and directed towards the leading point 64. Unless specified, the z-axis is pointing perpendicularly into the page of the figure.

Three velocity profiles 67-69 are shown. Each arrow in a velocity profile indicates the velocity vector of an incremental fluid element relative to the boundary apparatus, where the incremental fluid element is located at the base of the arrow. The line connecting the tips of the arrows in velocity profile 67 describes the continuous velocity distribution.

Boundary apparatus 61 is moving relative to the surrounding fluid. The free stream flow velocity is uniform in space and constant in time. In FIG. 5 the free stream fluid flow relative to boundary apparatus 61 is directed parallel to and in the opposite direction of the x-axis of the BAF, i.e. from the top of the figure towards the bottom. Far upstream of boundary apparatus 61 the velocity of incremental fluid elements is approximately equal to the free stream flow velocity. Thus the velocity profile 67 is uniform, with magnitude and direction equal to the free stream flow velocity.

Velocity profile 68 describes the velocity distribution in the proximity of boundary apparatus 61. In this embodiment, there is a no-slip condition on the surface of boundary apparatus 61. In other embodiments, there can be a non-zero slip velocity along the outside surface 62. Due to viscous effects, the resulting velocity gradient in the direction of the y-axis of the BAF gives rise to a shear stress acting on boundary apparatus 61, which in turn gives rise to viscous drag force. The viscous drag force is parallel to the x-axis of the BAF, and directed in the negative x-direction.

Streamline 66 describes the approximate thickness of the boundary layer associated with boundary apparatus 61. Since boundary apparatus 61 is cylindrically symmetric, streamline 66 can also be referred to as a streamtube 66.

Velocity profile 69 describes the velocity distribution in the far wake of boundary apparatus 61. The reduced velocity magnitude inside streamtube 66 in velocity profile 69 illustrates the momentum deficit in the far wake which is caused by the viscous drag force acting on boundary apparatus 61.

In accordance with some embodiments, the flow field surrounding a boundary apparatus is modified by a fluid flow manipulation apparatus in a manner in which the viscous drag on the combined apparatus is lower than a baseline boundary apparatus for at least one operating condition.

The baseline boundary apparatus need not have the same shape as the boundary apparatus in the combined apparatus. The baseline boundary apparatus is a conventional apparatus used in the prior art, such as boundary apparatus 61 depicted in FIG. 5. For example, the baseline boundary apparatus can have the shape of a conventional tubular aircraft fuselage.

The slip velocity is the velocity of the fluid at, and relative to, the surface of the boundary apparatus. In a viscid fluid, the slip velocity is typically smaller in magnitude compared to the slip velocity calculated for a theoretical scenario in which the fluid is inviscid. The difference between these two velocities is referred to as the "velocity deficit". Due to viscous effects the velocity deficit at the surface of the boundary apparatus propagates through the fluid in a direction perpendicular to the local free stream flow velocity. As a result, a non-negligible volume of the fluid is affected by the velocity deficit. The region of fluid flow which is affected by this velocity deficit is referred to as the boundary layer. The thickness of this region is called the boundary layer thickness. The boundary layer thickness can be defined as the region within which the velocity deficit is larger than 1% of the magnitude of the velocity calculated for a theoretical scenario in which the fluid is inviscid, ceteris paribus. The velocity deficit translates into a momentum deficit, which gives rise to a viscous shear stress and viscous drag acting on the boundary apparatus.

In accordance with some embodiments, the local free stream flow velocity is reduced for at least a portion of the wetted area of the combined apparatus compared to the case in which the effect of the fluid flow manipulation apparatus on the fluid flow is mathematically eliminated. The fluid flow manipulation apparatus is configured in such a way, that the increase in power consumption of the combined apparatus due to the additional wetted area of the fluid flow manipulation apparatus compared to the baseline boundary apparatus is smaller in magnitude than the reduction in the power consumed by the boundary apparatus due to the drag force acting on the boundary apparatus compared to the baseline boundary apparatus. A portion of the reduction in power consumed by the boundary apparatus can arise from a reduction in the local free stream flow velocity of the boundary apparatus. Alternatively or concurrently, the fluid manipulation apparatus can be configured to favor laminar flow as opposed to turbulent flow in at least a portion of the boundary layer of the boundary apparatus. Another portion of the reduction in power consumed can arise from a change in shape of the boundary apparatus compared to the baseline boundary apparatus. The fluid flow manipulation apparatus can manipulate the flow in such a way that the wetted area of the boundary apparatus can be reduced without leading to increased pressure drag due to separation of a portion of the flow. For a given volume that is to be enclosed by a boundary apparatus, the shape of the boundary apparatus with the smallest wetted area is a sphere. A sphere, however, would induce a large pressure drag due to stalled flow downstream of the sphere. Even without stall, a sphere would also induce a larger viscous drag due to a larger mean square local free stream flow velocity over the wetted area, as well as boundary layer effects. For these reasons, amongst other reasons such as ease of manufacture most fuselages have an elongated shape similar to that of a tube or tear drop. A fluid manipulation apparatus could modify the flow such that the wetted area of the boundary apparatus can be reduced while also reducing the mean square local free stream flow velocity compared to the baseline boundary apparatus.

The flow field modification can take several forms, and each form of modification can be carried out by several different embodiments of fluid manipulation apparatuses.

Figure 7:
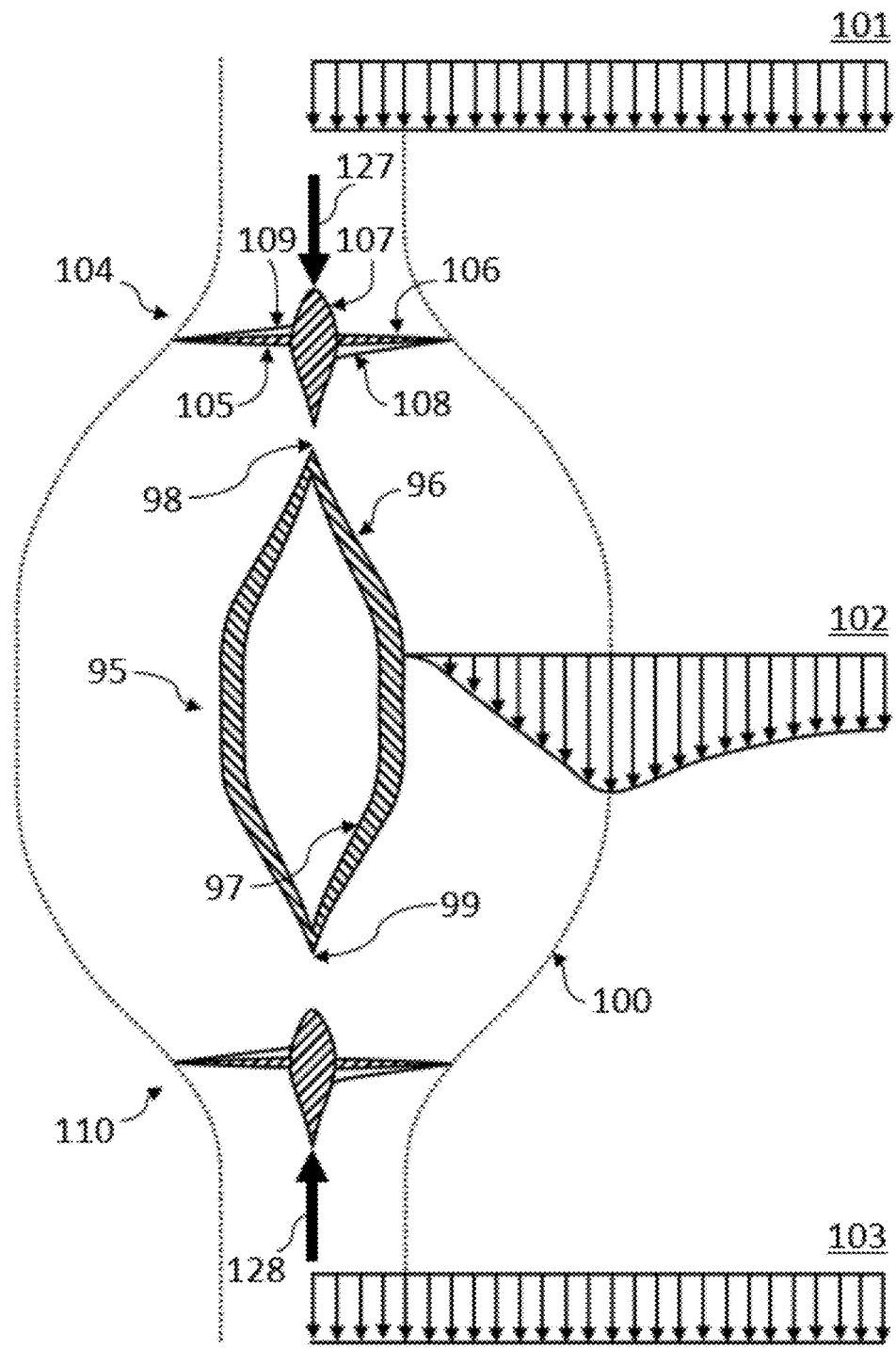
FIG. 7 is a cross-sectional view of an IFMA configuration, according to some embodiments.

FIG. 7 depicts an IFMA configuration including a boundary apparatus 95 moving relative to a surrounding fluid. Boundary apparatus 95 has a leading point 98, and a trailing point 99. The leading and trailing point can also be an edge, such as the leading edge or trailing edge of a wing or an airfoil. In the case of a wing, the leading edge and the trailing edge can be considered to be the leading and trailing stagnation lines for a specified flow condition. In this embodiment, the boundary apparatus is a rigid body which can be described as a thin shell, with a closed outside surface 96 and inside surface 97. In this embodiment, the shape of boundary apparatus 95 is a revolute shape, i.e. it is axially symmetric about an axis passing through the leading point 98 and trailing point 99.

Boundary apparatus 95 can be the hull of a ship, or the fuselage of an aircraft. In other embodiments, boundary apparatus 95 can have a different geometric shape. For instance, the shape of boundary apparatus can be similar to the shape of boundary apparatus 61 shown in FIG. 5. A suitable geometry can be found for any given application. A boundary apparatus can be manufactured using a variety of existing methods and materials.

One can define a "boundary apparatus frame", or "BAF", as follows. The origin is located at the geometric centroid of the volume enclosed by outside surface 96 of boundary apparatus 95. The x-axis is coincident with the straight line connecting the leading point 98 with the trailing point 99, and is directed towards the leading point 98. Unless specified, the z-axis is pointing perpendicularly into the page of the figure.

Three velocity profiles 101-103 are shown. Each arrow in a velocity profile indicates the velocity vector of an incremental fluid element relative to the boundary apparatus, where the incremental fluid element is located at the base of the arrow at the point in time in which the velocity it measured relative to the boundary apparatus. The line connecting the tips of the arrows in a velocity profile describes the continuous velocity distribution.

Boundary apparatus 95 is moving relative to the surrounding fluid. The free stream flow velocity is uniform in space and constant in time in the simplified scenario shown. In FIG. 7 the free stream fluid flow relative to boundary apparatus 95 is directed parallel to, and in the opposite direction of, the x-axis of the BAF, i.e. from the top of the figure towards the bottom. Far upstream of boundary apparatus 95 the velocity of incremental fluid elements is approximately equal to the free stream flow velocity. Thus, the velocity in velocity profile 101 is uniform in space and constant in time, with magnitude and direction equal to the free stream flow velocity relative to the boundary apparatus.

Velocity profile 102 describes the velocity distribution in the proximity of boundary apparatus 95. In this embodiment, there is a no-slip condition on outside surface 96 of boundary apparatus 95. In other embodiments, there can be a non-zero slip velocity along outside surface 96.

Streamline 100 describes the boundary of a streamtube, which has a circular cross-section when viewed along the x-direction. The dotted line in FIG. 7 schematically indicates the approximate boundary 100 between the free stream flow and the flow flowing through the rotor disc of upstream IMSA 104. A line that lies on the boundary can be described a streamline, and the volume enclosed by the boundary can be described as a streamtube. Note that the boundaries shown in FIG. 7 are only examples for a certain operating condition. The shape of the boundaries can be very different for other operating conditions or modes of operation of the depicted IMSAs.

Velocity profile 103 describes the velocity distribution in the far wake of boundary apparatus 95. In the simplified, ideal scenario the velocity profile 103 is substantially equal to the velocity profile 101, as shown in FIG. 7. In other embodiments, this need not be the case.

In accordance with some embodiments, a boundary apparatus, such as boundary apparatus 95 is provided with an intentional fluid manipulation apparatus. In the IFMA configuration shown in FIG. 7, this intentional fluid manipulation apparatus can be described as an IMSA assembly comprising an upstream IMSA 104, which can be classified as a propeller, and a downstream IMSA 110, which can also be described as a propeller in this case. The downstream IMSA 110 is placed in the streamtube 100 of the upstream IMSA 104 in this case. In other embodiments, this need not be the case. For example, downstream IMSA 110 can extend outside of streamtube 100 of the upstream IMSA 104 in other embodiments. Such a configuration can be useful in a scenario in which the downstream IMSA 110 is also being used to contribute positively to the net thrust of the IMSA assembly.

The cross-sectional view of the propeller, such as propeller 104, or upstream IMSA 104, shows a first propeller blade 105 and a second propeller blade 106. The leading edge 109 of the first propeller blade 105 and the trailing edge 108 of the second propeller blade 106 are also visible. In all figures containing propellers a similar configuration is shown. The propeller blades are structurally supported by rotor hub 107.

Downstream IMSA 110 is configured in a similar fashion as upstream IMSA 104, and will therefore not be described in the same detail. Upstream IMSA 104 and downstream IMSA 110 are rigidly connected to boundary apparatus 95 via a connection apparatus. This apparatus is not shown in FIG. 7 for clarity.

In other embodiments, IMSA 104 or 110 can be of a type other than the open rotor type depicted. For example, an IMSA can include several open rotors, or it can comprise at least one ducted fan, or a pair of coaxial counter-rotating propellers. An IMSA can also be a cyclogyro or a different type of IMSA.

In accordance with some embodiments, the flow field in the proximity of a boundary apparatus is intentionally modified, by a fluid manipulation apparatus in a manner in which the average spatial gradient of the flow velocity, in a direction normal to the surface of the boundary apparatus, is artificially and intentionally reduced. The shear stress is proportional to the gradient of the flow velocity for a Newtonian fluid. Thus, the viscous shear stress acting on the boundary apparatus is lower compared to embodiments of the prior art. In some embodiments, the reduction in the viscous power consumed by the boundary apparatus compared to a representative boundary apparatus of the prior art is larger than the added viscous power consumption of the intentional fluid manipulation apparatus. Thus, a net reduction in viscous power consumption can be achieved by some embodiments for a range of operating conditions. The optimal configuration of the intentional fluid manipulation apparatuses as well as the boundary apparatus depends on the application and constraints, and can be found using a wide variety of methods. For example, a number of such methods are known in computational fluid dynamics.

In the embodiment shown in FIG. 7, the aforementioned fluid manipulation apparatus consists of upstream IMSA 104 and downstream IMSA 110. This fluid manipulation apparatus is denoted the "IMSA assembly". The IMSA assembly reduces the average spatial gradient of the flow velocity at, and in a direction normal to, the surface of the boundary apparatus 95 by artificially and intentionally modifying the spatial distribution of the velocity of the flow in the proximity of the surface of the boundary apparatus 95.

In some embodiments, this modification comprises a reduction in the magnitude of the velocity of the flow at the outside surface 96 of boundary apparatus 95 in a full-slip scenario. A "full-slip scenario" is a theoretical scenario in which boundary layer effects, or the no-slip condition, are absent for a specified surface. In this theoretical scenario, the boundary layer effects or viscous drag effects of outside surface 96 on the fluid flow have been mathematically removed for a specified surface. The aforementioned reduction in velocity occurs relative to the local free stream fluid flow, i.e. the flow around boundary apparatus 95 in the absence of the IMSA assembly, which, in this case, is also calculated for a full-slip scenario. The scenario in which the IMSA assembly is assumed to have no effect on the fluid flow is denoted the "reference scenario". Note that the properties of a reference scenario are dictated by the scenario it is being compared to. For example, whether a particular reference scenario should be considered with a full-slip or no-slip condition should be clear from context. The reduction in velocity is a result of the combined induced velocity of the upstream IMSA 104 and the downstream IMSA 110 at the surface of the boundary apparatus 95 being directed in the positive x-direction of the BAF. This reduction in the magnitude of the velocity of the flow at the outside surface 96 of boundary apparatus 95 in a full-slip scenario can reduce the Reynolds number at outside surface 96 compared to the reference scenario. This reduction in the Reynolds number can, in a no-slip scenario, increase the thickness of the boundary layer and reduce the average spatial gradient of the flow velocity in a direction normal to outside surface 96 at outside surface 96. Thus, the average viscous shear stress and viscous drag losses of outside surface 96 can be reduced.

In some embodiments, the velocity at outside surface 96, although being reduced in magnitude, can still have a non-zero component in the negative x-direction in the full-slip scenario at outside surface 96. In other words, the general direction of the velocity of fluid elements at the outside surface 96 in a full-slip scenario can be largely unchanged compared to the aforementioned reference scenario with a full-slip condition.

In the depicted example, the magnitude of the fluid flow at the outside surface 96 of boundary apparatus 95 is has been artificially reduced to such an extent, that it is substantially zero in a full-slip scenario. When the magnitude of the fluid flow velocity at a given surface is zero in the full-slip scenario, a no-slip scenario would be equal to the full-slip scenario, ceteris paribus. In this scenario, the viscous drag on the outside surface 96 would be zero. Streamtube 100 can be considered to be an artificial boundary layer of boundary apparatus 95 in such an idealized, simplified scenario. Note that such a configuration may not be optimal, i.e. minimize the total viscous drag, when the viscous drag effects on the IMSA assembly are also considered.

As shown in velocity profile 102, the gradient of the magnitude of the fluid flow velocity in the direction normal to outside surface 96 is also substantially zero at the location shown. For some embodiments, this gradient can be greater than zero on average, where the average is calculated over the entire outside surface 96. This average gradient can nevertheless be smaller compared to the reference scenario with a no-slip condition.

In other embodiments, there can be different spatial variation or spatial distribution of the fluid flow within streamtube 100 in the proximity of the boundary apparatus 95. For example, there can be recirculation of flow. In other words, the fluid flow velocity adjacent to the outside surface 96 of boundary apparatus 95 can have a non-zero component in the positive x-direction in the full-slip scenario for all of, or portions of, outside surface 96. In this case, a trapped vortex ring, i.e. a ring of circulating flow, would surround all, or a portion, of boundary apparatus 95. Due to symmetry, this vortex ring would have a central axis aligned with, and coincident with, the x-direction of the BAF, and would lie in a plane parallel to the yz-plane of the BAF. Such a vortex ring would be held in place by the IMSA assembly, and re-energized by the surrounding flow.

In some embodiments, the spatial distribution of the flow velocity within streamtube 100 in the proximity of boundary apparatus 95 is also deliberately modified. In the embodiment shown in FIG. 7, the spatial distribution of the induced velocity is configured to generate a substantially linear variation of the magnitude of the fluid flow velocity within streamtube 100. As shown, the magnitude of the fluid flow velocity within streamtube 100 increases substantially linearly in the positive y-direction. In other embodiments, the magnitude of the flow velocity within streamtube 100 increases at an increasing rate in the positive y-direction. Such a configuration can help keep the Reynolds number of the boundary layer of outside surface 96 artificially low, even while the boundary layer thickness grows in the streamwise direction, i.e. the negative x-direction of the BAF. A gradual gradient in the velocity magnitude can also minimize frictional heating and turbulence effects within streamtube 100, and thus reduce drag losses or reduce the net power consumption associated with boundary apparatus 95. In the analogy in which streamtube 100 is considered to be the artificial boundary layer of boundary apparatus 95, a gradual gradient in the velocity magnitude can be desirable to ensure the artificial boundary layer is, and remains, substantially laminar. Furthermore, a gradual increase in the velocity magnitude within streamtube 100 would ensure that there is minimal transfer of momentum from the surrounding flow into streamtube 100, which would result in a momentum deficit in the flow surrounding streamtube 100 in the far wake, i.e. in velocity profile 103, and contribute to the viscous power consumption associated with boundary apparatus 95.

An optimal spatial variation of the magnitude of the fluid flow velocity within streamtube 100 can be found using existing methods, and need not be linear. For example, it can be desirable to reduce the rate of total vorticity shed by the upstream IMSA 104 into the fluid, amongst other criteria.

The optimal magnitude and direction of the fluid flow at the outside surface 96 in a full-slip scenario, as well as the magnitude and sign of the gradient of the flow velocity at the outside surface 96 can be optimized for a given flow condition or a given application using existing methods. The optimal distribution of fluid flow velocity within streamtube 100 can also be optimized using the same methods. The objective of such an optimization can be the minimization of the total power consumption of the boundary apparatus and the IMSA assembly.

The aforementioned velocity distribution in the proximity of boundary apparatus 95 is exemplified by the snapshot provided by velocity profile 102. This velocity distribution is very different from the velocity distribution in a reference scenario for a full-slip or no-slip condition. In accordance with some embodiments, this difference is provided by an intentional fluid manipulation apparatus. In the embodiment shown in FIG. 7, this fluid manipulation apparatus is embodied by the IMSA assembly. The IMSA assembly manipulates the fluid by imparting a particular spatial induced flow distribution on the fluid. This induced flow can be considered to be superimposed on the fluid flow in a reference scenario in a full-slip condition. In other words, a desired flow velocity distribution can be generated by calculating the induced flow distribution required in order to modify the flow from this reference scenario to the desired flow velocity distribution, and configuring the IMSA assembly in a manner in which this desired induced flow distribution is achieved. The extent of the viscous drag, i.e. the extent of the effect of the boundary layer and the no-slip condition, associated with outside surface 96 is dictated or defined by this superimposed flow, i.e. the superposition of the induced flow and the flow in the reference scenario. This viscous effect can in turn be considered to be superimposed on the aforementioned superimposed flow. As described in the following paragraphs, there are several ways in which the production or generation of the aforementioned induced velocity distribution of the IMSA assembly can be described.

The induced velocity distribution in the proximity of boundary apparatus 95 can be considered to be generated by the rate of change of momentum experienced by a fluid element due to its interaction with upstream IMSA 104. In some embodiments, some fluid elements experience a negative average rate of change of momentum throughout their interaction with upstream IMSA 104. This rate of change of momentum can result in a net decrease of momentum of a fluid element in the proximity of outside surface 96 of boundary apparats 95 after said fluid element has interacted with upstream IMSA 104. This decrease occurs relative to the reference scenario for a full-slip condition, i.e. relative to the case in which the IMSA assembly does not interact with the fluid. In other words, in some embodiments, upstream IMSA 104 is configured to reduce the average momentum of at least a portion of the fluid flow in the far wake of upstream IMSA 104 in an aforementioned isolated scenario.

In some embodiments, this decrease in the average momentum of the fluid flow in the far wake occurs at least for streamlines which interact with outside surface 96 of boundary apparatus 95, or for streamlines which pass in the proximity of outside surface 96. This reduction of momentum of the fluid flow compared to the free stream fluid flow in the isolated scenario results in a far wake induced velocity which has a non-zero component in the upstream direction as defined by the free stream flow in the isolated scenario. Since outside surface 96 of boundary apparatus 95 is located downstream of upstream IMSA 104, the flow at, or in the proximity of, outside surface 96 of boundary apparatus 95 also experiences an upstream induced velocity. As mentioned, the magnitude and the spatial distribution of this upstream induced velocity at, or in the proximity of, outside surface 96 of boundary apparatus 95 can be configured to reduce the magnitude of the free stream flow in a full-slip scenario compared to a full-slip reference scenario, and hence reduce the average drag of boundary apparatus 95, or the average power consumption associated with the interaction of boundary apparatus 95 with the fluid.

The aforementioned induced velocity distribution can also be generated by free vortices that are shed into the wake by the propeller blades of upstream IMSA 104 in the simplified framework of lifting-line theory. This is similar to the vortex shedding of a helicopter rotor, conventional propeller blade, or wind turbine blade. Note that, in some embodiments, the vortices shed by downstream IMSA 110 also contribute to the induced velocity in the proximity of boundary apparatus 95, such as at the location of velocity profile 102.

The aforementioned induced velocity distribution can also be generated by a suitable lift or thrust distribution along a propeller blade of upstream IMSA 104. Since the induced velocity of upstream IMSA 104 is directed in an upstream direction, i.e., in the positive x-direction of the BAF, for at least a portion of upstream IMSA 104, the operation of upstream IMSA 104 is similar to the operation of a wind turbine. In other words, corresponding to the induced velocity distribution in the wake of upstream IMSA 104, the thrust force experienced by at least a portion of a blade of upstream IMSA 104, such as first propeller blade 105, has a non-zero component in the negative x-direction of the BAF, as indicated by thrust vector 127.

At least a portion of upstream IMSA 104 is configured to extract useful power from the fluid. This power can be extracted in a multitude of ways. For example, an electric generator can be rigidly connected to the drive shaft that is rigidly connected to the propeller blades of upstream IMSA 104. In the embodiment shown in FIG. 7, the drive shaft can be parallel to the axis of rotation of the propeller blades of upstream IMSA 104, and parallel to the x-axis of the BAF. When, in some embodiments, upstream IMSA 104 is configured a conventional propeller, the aforementioned drive shaft is considered to be the rotor hub, or the propeller shaft of the conventional propeller. Since the electric motor is directly connected to the drive shaft, which is directly connected to the propeller blades, this configuration can also be described as a direct drive configuration.

In some embodiments, there can also be a transmission or a gear train between the electric generator and the drive shaft. In some embodiments, there can also be a clutch between the propeller and the transmission. In some embodiments, the transmission can be reconfigured. In other words, the gear ratio can be changed, or gears can be changed. In some embodiments, there can also be a mechanical disc brake attached to the drive shaft, where the brake is configured to be able to arrest, or prevent the rotation of, the drive shaft. The electricity generated by the electric generator due to the rotation of the drive shaft can be stored in an electrical energy storage apparatus. Such an electrical energy storage apparatus can be a battery or a capacitor, for example. The electrical energy storage apparatus can also comprise mechanical elements. For example, the electrical energy storage apparatus can comprise an electric motor or generator, which in turn is configured to accelerate or decelerate the rate of rotation of a flywheel, which stores the energy mechanically in the form of rotational kinetic energy. The electric motor generator can also power a pump that is configured to compress and or expand a gas such as air inside a tank. Note that at least a portion of the energy stored in an electrical energy storage apparatus is able to be extracted at a later point in time. A plethora of such energy storage apparatuses or mechanisms are available.

The electrical power can also be transferred directly to a second actuator, where the transfer can occur via electrical conductors, for example. The second actuator can consume the power instantaneously in some embodiments. The second actuator can be any actuator of an apparatus or assembly of apparatuses associated with boundary apparatus 95. For example, the second actuator can be used to actuate downstream IMSA 110. Thus a portion of the power extracted from the fluid by upstream IMSA 104 can be transferred to downstream IMSA 110, where the power is reinserted into the fluid. In some embodiments, the second actuator can also be used to power a separate apparatus or mechanism, which is not shown in FIG. 7.

The electrical power provided by upstream IMSA 104 can also be split, and used to drive a second actuator, a third actuator, and increase the energy contained within an energy storage apparatus, for instance. In some embodiments, the power extracted from the fluid by upstream IMSA 104 and applied to the drive shaft rigidly connected to the propeller blades of upstream IMSA 104 is transferred mechanically to downstream IMSA 110. This transfer can be facilitated in several ways. For example, the drive shaft rigidly attached to the propeller blades of upstream IMSA 104, where the drive shaft is denoted the "upstream drive shaft", can also be rigidly connected to the drive shaft rigidly connected to the propeller blades of downstream IMSA 110, where the drive shaft is denoted the "downstream drive shaft". In other words, the upstream drive shaft can be identical to the downstream drive shaft. In such a configuration, the upstream and downstream rotors of upstream IMSA 104 and downstream IMSA 110, respectively, are rotating in the same direction. In other embodiments the upstream drive shaft can transfer power to the downstream drive shaft via a transmission, a gear train, or a series of gears and secondary or auxiliary drive shafts. In some embodiments, there can also be a clutch along the load path between the upstream drive shaft and the downstream drive shaft. In some embodiments, the gear ratio, or the transmission ratio, of mechanical connection between the upstream and downstream drive shaft can be reconfigured. In other words, the gear ratio can be changed, or gears can be changed.

In some embodiments, the upstream and downstream rotors of upstream IMSA 104 and downstream IMSA 110, respectively, are rotating in opposite directions. Such a configuration can reduce any power losses associated with the IMSA assembly. This could be a result of downstream IMSA 110 cancelling any swirl imparted on the flow by upstream IMSA 104.

In some embodiments, the angle of attack of the propeller blades of upstream IMSA 104 or downstream IMSA 110 relative to the fluid can be controlled by means of a pitch control mechanism at the rotor hub, such as rotor hub 107. This pitch control mechanism and associated pitch degree of freedom, or "DOF", can comprise an electric motor and a disc brake. Alternatively or concurrently to the disc brake, some embodiments can also comprise a mechanical lock, where the mechanical lock can be configured to lock the pitch DOF of the propeller blade for a given pitch angle relative to the rotor hub. The pitch control mechanism can also involve a hydraulic system and mechanical linkages, such as those found in the collective pitch mechanisms of conventional helicopters or propellers. The pitch control mechanism and the pitch DOF of the propeller blades of upstream IMSA 104 or downstream IMSA 110 can also be configured to allow the propeller blades to be feathered. The pitch angle as well as the rate of rotation of the propeller blades can be controlled, such that the effect of the IMSA assembly on the fluid can be regulated. This in turn would allow the performance of the IMSA assembly to be optimized for different flow conditions, such as different free stream flow velocities.

In the IFMA configuration shown in FIG. 7, downstream IMSA 110 is configured to balance, cancel, or counteract the effect of upstream IMSA 104 and boundary apparatus 95 on the fluid. In this manner, the fluid flow velocity distribution in the far wake, as depicted by velocity profile 103, is substantially equal to the free stream fluid flow velocity distribution, as illustrated by velocity profile 101. During nominal cruise, the power consumed by the downstream IMSA 110 in this process is typically larger than the power extracted by upstream IMSA 104.

The downstream IMSA 110 is configured to impart a positive rate of change of momentum on the fluid, i.e. accelerate the fluid in the negative x-direction. As a result, the induced velocity of IMSA 110 in the far wake of IMSA 110 in an isolated scenario is directed in the negative x-direction of the BAF. The induced velocity of the downstream IMSA 110 in the far wake can be considered to cancel the induced velocity of the upstream IMSA 104 in the far wake.

The desired induced velocity distribution in the far wake of downstream IMSA 110 can also be considered to be generated by free vortices which are shed into the wake by the propeller blades of downstream IMSA 110 in the simplified framework of lifting-line theory. This is similar to the vortex shedding of a helicopter rotor, conventional propeller blade.

The aforementioned induced velocity distribution of downstream IMSA 110 in an isolated scenario can also be considered to be generated by a suitable lift or thrust distribution along a propeller blade of downstream IMSA 110. Since the induced velocity of downstream IMSA 110 is directed in a downstream direction, i.e. in the negative x-direction of the BAF, for at least a portion of downstream IMSA 110 in an isolated scenario, the operation of downstream IMSA 110 is similar to the operation of conventional propeller of a conventional fixed wing aircraft. In other words, corresponding to the induced velocity distribution in the wake of downstream IMSA 110 in an isolated scenario, the thrust force experienced by at least a portion of a blade of downstream IMSA 110, has a non-zero component in the positive x-direction of the BAF, as indicated by thrust vector 128.

Note that, in some embodiments, there is no designated downstream IMSA, such as downstream IMSA 110 in FIG. 7. In such embodiments, the power extracted by an upstream IMSA can be stored or employed to provide thrust via an alternative fluid manipulation apparatus or method. Note that upstream IMSA 104 in FIG. 7 is exerting a force in the negative x-direction of the BAF. During cruising flight, this force would need to at least be cancelled by a suitable thrust force in order to maintain a constant cruise velocity of the BAF. This thrust force could be provided in a wide variety of ways. In FIG. 7, this thrust force is provided by downstream IMSA 110. In other embodiments, this thrust force can be provided by a different thrust apparatus.

In some embodiments, this thrust force can be provided by an increase in the radius of the propeller blades of the upstream IMSA. In such embodiments, the length of a propeller blade of an upstream IMSA is larger than the radius of streamtube 100 shown in FIG. 7. The propeller blade of upstream IMSA 104 can have two distinct portions in this case. A first portion can be the portion of the propeller blade which is located within a first, inside streamtube, which can be of a similar size and configuration, and fulfill a similar purpose as streamtube 100 shown in FIG. 7. This first portion of the propeller blade of the upstream IMSA can be configured to fulfill a similar purpose as the entire upstream IMSA 104 shown in FIG. 7. The remaining, second portion of the propeller blade of such an upstream IMSA can be configured to produce the aforementioned required thrust. The wake of this second portion forms an outside streamtube, which encloses or envelops the inside streamtube. The induced velocity of this thrust producing segment of the upstream IMSA can be uniform throughout the outside streamtube in the far wake in order to minimize the induced power consumption. Thus, the power extracted by the first portion of the propeller blade is directly and mechanically transferred to the second portion of the propeller blade via the rigid structural connection between the first and second portion of the propeller blade. A portion of the associated loss in energy of the fluid within the inside streamtube is used to produce thrust and increase the energy of the fluid within the outside streamtube. Note that such a configuration would produce a momentum deficit in the wake within the inside streamtube, because, as mentioned, there is no designated downstream IMSA in this class of embodiments. Such a configuration would result in a non-uniform velocity distribution in the far wake, and would thus be less efficient than a configuration in which the velocity distribution in the entire far wake, i.e. across both the inside streamtube and the outside streamtube, is substantially uniform. However, such a configuration can nevertheless provide an improvement on embodiments of the prior art due to the recovery of a portion of the energy loss which would otherwise be attributed to viscous drag.

In other embodiments, the aforementioned momentum deficit within the inside streamtube is removed by adding a downstream IMSA to the aforementioned configuration.

In other embodiments, the downstream IMSA can extend beyond streamtube 100. For example, the length of a propeller blade of a downstream IMSA can be larger than the radius of streamtube 100. In this manner the induced power consumption of the thrust producing downstream IMSA can be reduced. In this configuration, it is possible to achieve a uniform far wake induced velocity distribution across the inside and outside streamtubes of the downstream IMSA, which is desirable for minimizing the induced power.

In yet other embodiments, both the upstream IMSA and the downstream IMSA can comprise rotor tip extensions compared to the embodiment shown in FIG. 7. In some such embodiments, the rotor diameter of the upstream IMSA and the downstream IMSA are substantially identical. In other such embodiments, this need not be the case. As before, the rotor tip extensions give rise to an outside streamtube which encompasses the inside streamtube. The inside portions of the rotors of upstream IMSA and the downstream IMSA can be configured in the same manner as described in the context of FIG. 7 and streamtube 100. The outside portions of the rotors can be configured to produce a desired amount of thrust while minimizing the total power consumption, which comprises profile drag and induced drag. For example, the outside portions of upstream IMSA and the downstream IMSA, i.e. the portions associated with the outside streamtube, can be configured in a manner similar to a contra-rotating coaxial rotor, with both the upstream and the downstream IMSA producing thrust in the positive x-direction of the BAF. In another example, the outside portion of upstream IMSA can be configured to produce a thrust which is directed in the positive x-direction of the BAF, and larger in magnitude than the desired thrust required of the outside portions of the upstream and downstream IMSA. Accordingly, the outside portion of downstream IMSA can be configured to produce a thrust which is directed in the negative x-direction of the BAF. Such a configuration can reduce the induced power consumption associated with the outside portions of the upstream and downstream ISAs compared to configurations in which the thrust vector of both the upstream and the downstream IMSAs is directed in the positive x-direction of the BAF.

In some embodiments, there can be more than a single upstream propeller, such as upstream IMSA 104, and more than a single downstream propeller, such as downstream IMSA 110. There can be several propellers located within streamtube 100 in the proximity of boundary apparatus 95. Using several propellers within streamtube 100 can be desirable in order to maintain a desired velocity distribution within streamtube 100. For example, consider a boundary apparatus which is cylindrical in shape with tapered ends, such as the fuselage of a conventional commercial transport aircraft. In this case, it can be convenient and desirable to place several rotors or propellers along the length of the fuselage. For example, a propeller can be located at the same location along the x-axis of the BAF at which a duct, such as third IMCA 81, is shown to be located in FIG. 6. The propeller can be mounted on the fuselage in a manner in which the fuselage diameter is unchanged, i.e. the fuselage is located within, or passes through the center of, the propeller hub. The circular shape of the fuselage is conducive to a rotor which revolves around the fuselage. The rotor hub can form a rigid ring which is able to rotate around the fuselage. As shown in FIG. 7, the axis of rotation is in this case parallel to the longitudinal axis of the cylindrical fuselage. Several propeller blades can be attached to the rotor hub and perform the desired fluid flow manipulation. An electric motor can power the rotor hub, as well as extract power from the rotation of the rotor hub relative to the fuselage, depending on whether the rotor is in an "upstream" or "downstream" location or configuration. In such a configuration, it is at least in theory possible for a fuselage to be infinitely long and the flow field within streamtube 100 to remain constant on average during nominal, constant velocity cruise, where the average is calculated along the x-axis of the BAF over one distance of separation between the uniformly spaced propellers along the length of the fuselage.

The length of each rotor blade can be a fraction of the diameter of the fuselage. The length of a rotor blade can be on the order of the boundary layer thickness at that particular location in the flow in a no-slip reference scenario. In some embodiments, the ratio of the length of a rotor blade to the maximum thickness of the boundary layer along the outside surface of a boundary apparatus, such as a fuselage, in a no-slip reference scenario is less than two. In some embodiments, this ratio is less than five. In some embodiments, this ratio is less than ten. In some embodiments, this ratio is less than one hundred.

Figure 6:
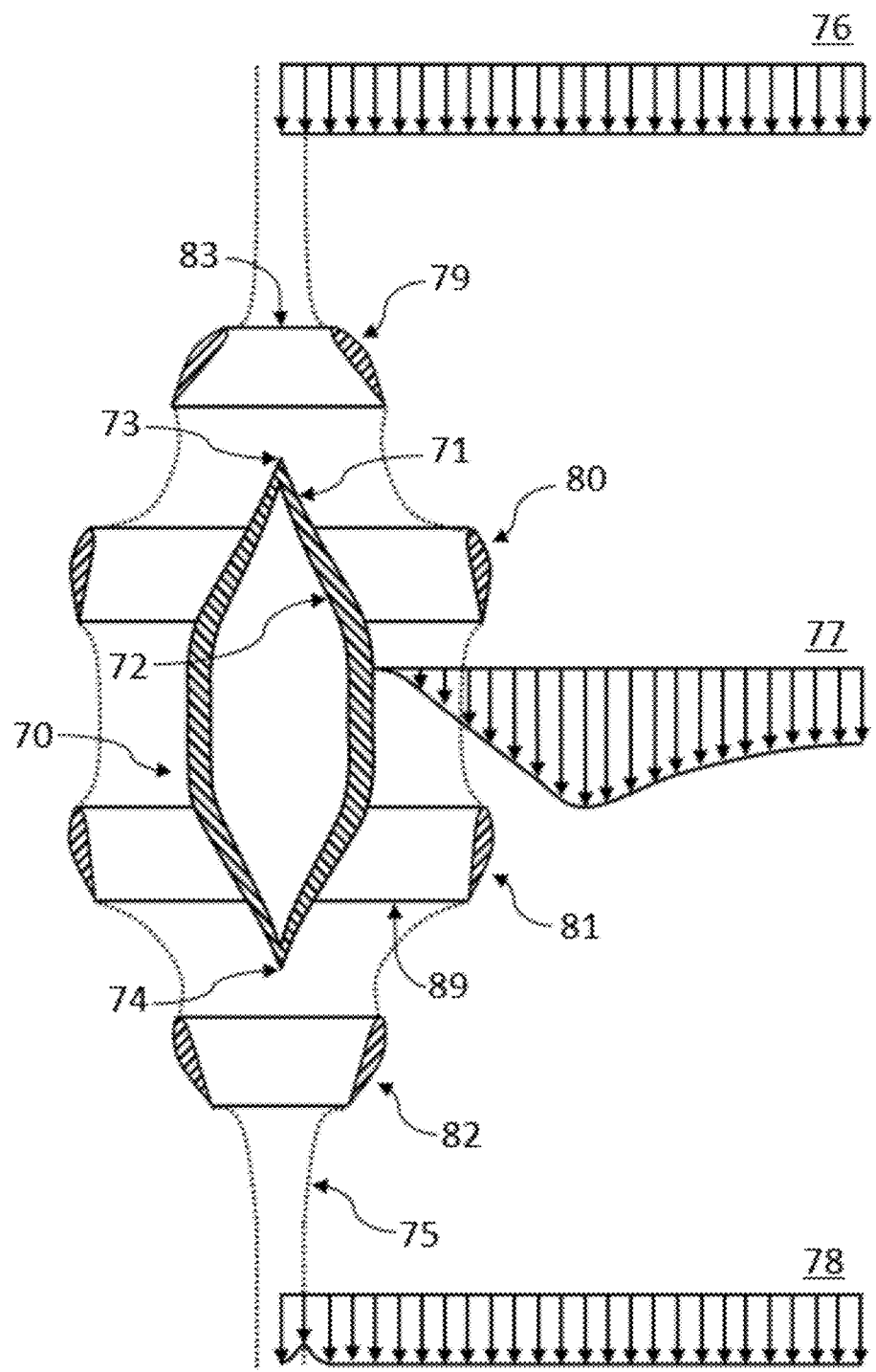
FIG. 6 is a cross-sectional view of an IFMA configuration, according to some embodiments.

FIG. 6 shows a cross-sectional view of another IFMA configuration. Some features of the apparatus shown in FIG. 6, as well as some of the principles of operation of the apparatus share similarities with the apparatus shown in FIG. 7, and will therefore not be described in the same detail in the context of FIG. 6, and vice versa.

FIG. 6 depicts a boundary apparatus 70 moving relative to a surrounding fluid. Boundary apparatus 70 has a leading point 73, and a trailing point 74. The leading and trailing point can also be an edge, such as the leading edge or trailing edge of a wing or an airfoil. In the case of a wing, the leading edge and the trailing edge can be considered to be the leading and trailing stagnation lines for a specified flow condition. In this embodiment, the boundary apparatus is a rigid body which can be described as a thin shell, with a closed outside surface 71 and inside surface 72. In this embodiment, the shape of boundary apparatus 70 is a revolute shape, i.e., it is axially symmetric about an axis passing through the leading point 73 and trailing point 74.

Boundary apparatus 70 can be the hull of a ship, or the fuselage of an aircraft. In other embodiments, boundary apparatus 70 can have a different geometric shape. For instance, the shape of boundary apparatus can be similar to the shape of boundary apparatus 61 shown in FIG. 5. A suitable geometry can be found for any given application. A boundary apparatus can be manufactured using a variety of existing methods and materials.

One can define a "boundary apparatus frame", or "BAF", as follows. The origin is located at the geometric centroid of the volume enclosed by outside surface 71 of boundary apparatus 70. The x-axis is coincident with the straight line connecting the leading point 73 with the trailing point 74, and is directed towards the leading point 73. Unless specified, the z-axis is pointing perpendicularly into the page of the figure.

Three velocity profiles 76-78 are shown. Each arrow in a velocity profile indicates the velocity vector of an incremental fluid element relative to the boundary apparatus, where the incremental fluid element is located at the base of the arrow at the point in time in which the velocity it measured relative to the boundary apparatus. The line connecting the tips of the arrows in a velocity profile describes the continuous velocity distribution.

Boundary apparatus 70 is moving relative to the surrounding fluid. The free stream flow velocity is uniform in space and constant in time in the simplified scenario shown. In FIG. 6 the free stream fluid flow relative to boundary apparatus 70 is directed parallel to, and in the opposite direction of, the x-axis of the BAF, i.e. from the top of the figure towards the bottom. Far upstream of boundary apparatus 70 the velocity of incremental fluid elements is approximately equal to the free stream flow velocity. Thus, the velocity in velocity profile 76 is uniform in space and constant in time, with magnitude and direction equal to the free stream flow velocity relative to the boundary apparatus.

Velocity profile 77 describes the velocity distribution in the proximity of boundary apparatus 70. In this embodiment, there is a no-slip condition on outside surface 71 of boundary apparatus 70. In other embodiments, there can be a non-zero slip velocity along outside surface 71. The velocity profile 77 is similar to the velocity profile 102 shown in FIG. 7. The features of this velocity profile, as well as alternate embodiments thereof, will therefore not be described in the same detail in the context of FIG. 6.

Velocity profile 78 describes the velocity distribution in the far wake of boundary apparatus 70. In the simplified, ideal scenario the velocity profile 78 is substantially equal to the velocity profile 76, as shown in FIG. 6. Note that there is a momentum deficit due to the drag associated with the IMCA assembly, which can arise from pressure drag or viscous drag, for example. In other embodiments, there can also be a momentum deficit due to the drag associated with the boundary apparatus 70.

In accordance with some embodiments, a boundary apparatus, such as boundary apparatus 70 is provided with an intentional fluid manipulation apparatus. In the embodiment shown in FIG. 6, this intentional fluid manipulation apparatus can be described as an IMCA assembly comprising a first IMCA 79, a second IMCA 80, a third IMCA 81, and a fourth IMCA 82. Four IMCAs are shown in this embodiment, however, more or less can be used.

Each IMCA, such as first IMCA 79, can be described as a circular duct. In the embodiment shown in FIG. 6, each duct is configured to produce a lift force with a component in the radially outward direction. The central axis of each circular duct is coincident with, and directed in the direction of, the x-axis of the BAF. In a rough approximation, the effect of a duct on the fluid flow can be considered to be produced by a vortex loop in lifting-line theory. In this simplified model, each vortex loop of each IMCA lies within a plane parallel to the yz-plane. The circulation of each vortex loop is directed in the clock-wise direction around each loop when viewed along the positive x-direction. Each IMCA has a leading edge, such as leading edge 83 of first IMCA 79, and a trailing edge, such as trailing edge 89 of third IMCA 81.

Streamline 75 describes the boundary of a streamtube, which has a circular cross-section when viewed along the x-direction. The dotted streamline 75 in FIG. 6 schematically indicates the approximate location of the stagnation streamline of first IMCA 79, i.e. the streamline which is incident on the leading edge stagnation line of first IMCA 79. The volume enclosed by all such streamlines can be described as a streamtube.

Note that streamtube 75 shown in FIG. 6 is only an example for a certain operating conditions, and a certain configuration of the IMCA assembly. For other operating conditions, such a different free stream velocity magnitude, the shape of streamtube 75 can be different. For example, streamtube 75 can pass within the interior region of second IMCA 80 rather than also being incident on the leading edge stagnation line of second IMCA 80. In order to avoid flow separation and the associated pressure drag increase, it can be desirable for an IMCA to not be located within the wake of an upstream IMCA, i.e. along, or in proximity of, the stagnation streamline of an upstream IMCA. This can increase the viscous skin friction drag losses associated with the IMCA assembly, however.

Each IMCA in the IMCA assembly is rigidly connected to boundary apparatus 70 via a connection apparatus. This apparatus is not shown in FIG. 6 for clarity.

In other embodiments, an IMCA, such as IMCA 79, can comprise several ducts. In such a configuration, an IMCA can be described as a multi-element airfoil as opposed to a single element airfoil shown in FIG. 6. For example, an IMCA can comprise a four-element airfoil, with each section effectively forming a separate duct. Such a configuration can increase the maximum lift coefficient of the IMCA.

The effect of the IMCA assembly on the fluid flow is the creation of a local induced velocity distribution in the proximity of the IMCA assembly. In general, the induced velocity within the IMCA assembly, i.e. in the proximity of the central axis of the IMCA assembly, has a non-zero component in the positive x-direction of the BAF. A desired distribution of induced velocity can be achieved by placing IMCAs, such as first IMCA 79 and second IMCA 80 at suitable locations within the fluid flow, and by selecting an appropriate strength of circulation, or an appropriate lift force per unit circumference.

In accordance with some embodiments, the IMCA assembly is configured in a manner in which the magnitude of the flow velocity at the outside surface 71 of boundary apparatus 70 in a full-slip scenario is reduced compared to a full-slip reference scenario. This reduction can result in a lower skin friction drag at outside surface 71 in a no-slip scenario. This reduction can arise from the reduction of the effective free stream flow at outside surface 71, the establishment or maintenance of laminar flow on outside surface 71, or the reduction in the Reynolds number of the flow at outside surface 71, for example. For some operating conditions, this reduction in the drag associated with boundary apparatus 71 can be larger than the added drag of the IMCA assembly.

Figure 8:
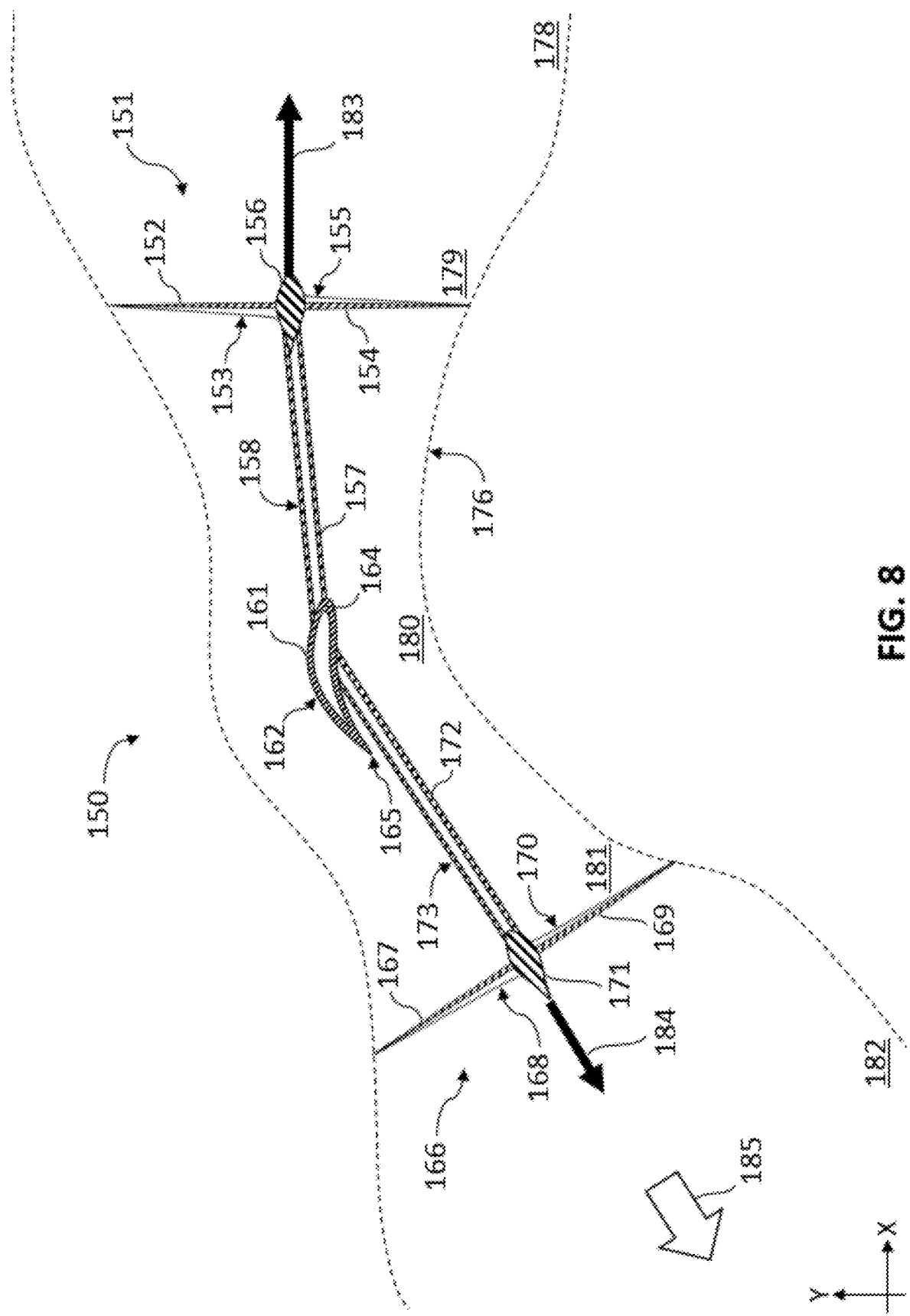
FIGS. 8 and 9 are cross-sectional and frontal views, respectively, of an IFMA configuration, according to some embodiments.

FIG. 8 is a cross-sectional view of IFMA configuration 150. The center of mass of IFMA configuration 150 is moving with a velocity in an inertial frame, where the velocity is constant in magnitude and direction in space and time. The velocity is aligned with the X-axis, i.e. directed in the positive X-direction.

There is an upstream IMSA 151, which in this embodiment can be described as a propeller. The cross-sectional view of upstream IMSA 151, shows a first propeller blade 152 and a second propeller blade 154. The trailing edge 153 of the first propeller blade 152 and the leading edge 155 of the second propeller blade 154 are also visible. The propeller blades are structurally supported by rotor hub 156. The thrust of IMSA 151 is indicated by thrust vector 183. At station 179, a positive rate of change of momentum is applied to the fluid by upstream IMSA 151 in this embodiment.

There is a downstream IMSA 166, which in this embodiment can be described as a propeller. The cross-sectional view of downstream IMSA 166, shows a first propeller blade 167 and a second propeller blade 169. The trailing edge 168 of the first propeller blade 167 and the leading edge 170 of the second propeller blade 169 are also visible. The propeller blades are structurally supported by rotor hub 171. The thrust of IMSA 166 is indicated by thrust vector 184. At station 181, a negative rate of change of momentum is applied to the fluid by downstream IMSA 166. Downstream of the IFMA configuration 150, the direction of the flow within streamtube 176 relative to IFMA configuration 150 is indicated by arrow 185.

A middle IMSA 161 is also shown. In this embodiment, the middle IMSA 161 can be described as a wing. For simplicity, the wing 161 is a straight wing. The wing can be rigidly attached to a fuselage, for example. For clarity, a fuselage is not shown. Middle IMSA 161 can be configured in a similar manner as the fixed wing of a conventional fixed wing aircraft. Middle IMSA 161 produced a lift force that is directed in the positive Y-direction and negative X-direction. Note that the associated deflection of the direction of the flow within streamtube 176 is exaggerated for illustrative purposes.

Middle IMSA 161 comprises an outside surface 162, a trailing edge 165, and bulk material 164. Bulk material 164 can comprise a metal such as aluminium or steel, or a composite such as fiberglass or carbon fiber. Upstream IMSA 151 is rigidly attached to middle IMSA 161 by a hollow connecting rod 157 with outside surface 158. Downstream IMSA 166 is rigidly attached to middle IMSA 161 by a connecting rod 172 with outside surface 173.

In other embodiments, connecting rod 157 or connecting rod 172 are rotably connected to middle IMSA 161 or an associated middle support apparatus. In some embodiments, connecting rod 157 or connecting rod 172 are rotably connected to hub 157 or hub 171 respectively. The rotating connection allows the configuration to be adapted to different operating conditions. A rotating connection can contribute to the control the pitch angle of the middle IMSA 161 and any associated apparatus, such as a fuselage, during cruise or maneuvering.

In this particular embodiment, the magnitude of upstream thrust vector 183 is larger than the magnitude of the downstream thrust vector 184. The upstream IMSA 151 and the downstream IMSA 166 therefore produce a net thrust force with a non-zero component in the positive X-direction. This net thrust can therefore contribute to the cancellation of any drag forces acting on IFMA configuration 150. In other embodiments, the magnitudes of these thrust vectors can be substantially identical. In yet other embodiments, the magnitude of upstream thrust vector 183 is smaller than the magnitude of the downstream thrust vector 184.

Upstream IMSA 151 is configured to increase the local free stream flow velocity of the middle IMSA 161 to a value which is larger than the free stream flow velocity of middle IMSA 161. Downstream IMSA 166 is configured to recover at least a portion of the excess thrust and excess energy transferred to the fluid by upstream IMSA 151 throughout this process. The induced drag of the middle IMSA 161 can be reduced compared to the baseline scenario in which the same middle IMSA 161 produced the same amount of lift without an upstream IMSA 151 and downstream IMSA 166.

As a result, the average flow velocity magnitude at station 180 is larger than at station 178 and station 182. The streamtube 176 at station 180 has a smaller streamwise cross-sectional area than at station 182 or 178. This increase in the streamwise cross-sectional area of streamtube 176 at station 182 compared to station 180 can be considered to increase the aspect ratio or the span of middle IMSA 161.

Figure 9:
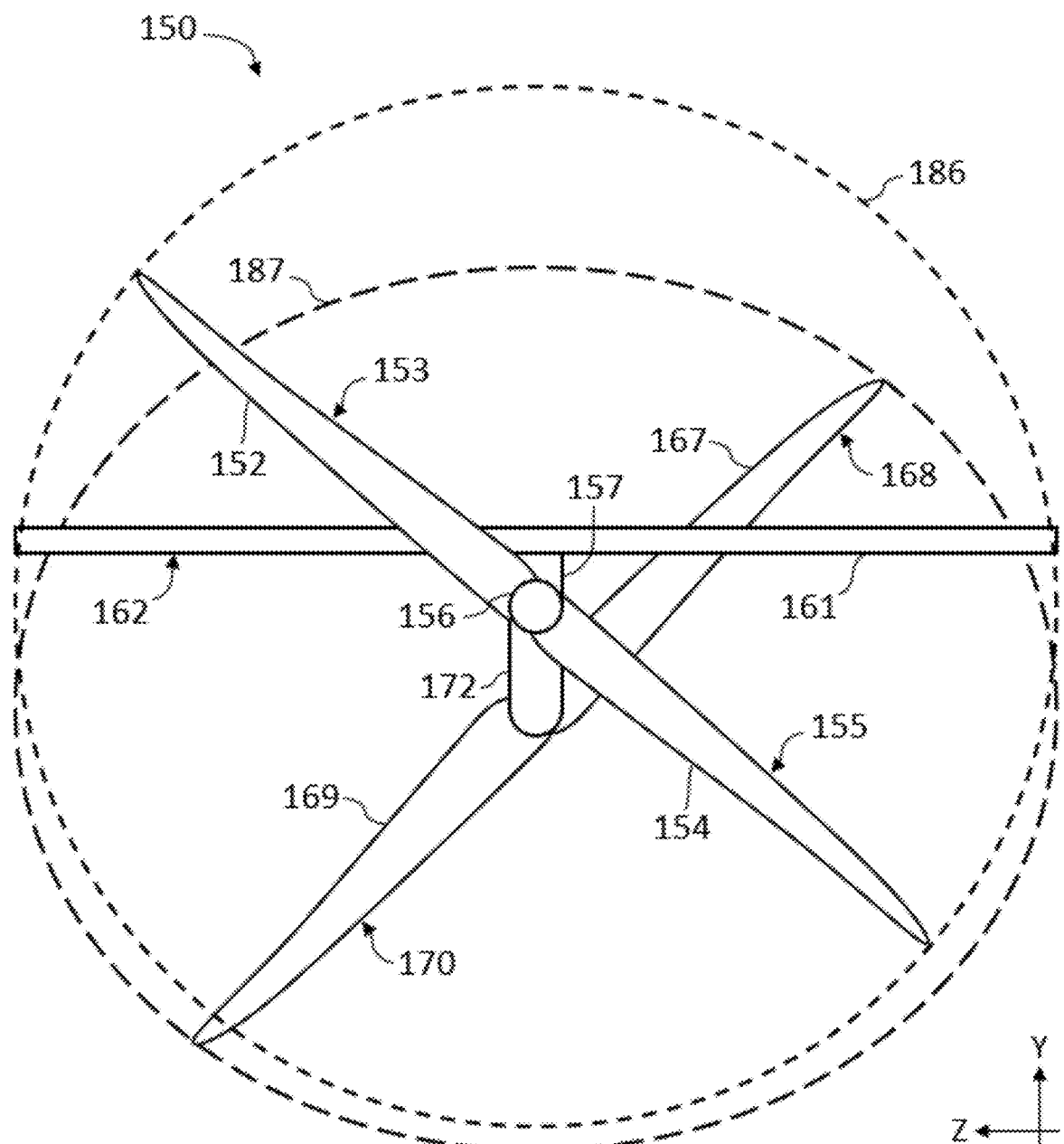

FIG. 9 is a frontal view of the IFMA configuration 150 shown in FIG. 8. Both the upstream IMSA 151 and the downstream IMSA 166 can rotate in a counter-clockwise direction when viewed in the negative X-direction. Alternatively, the upstream and downstream IMSAs can be rotating in opposite directions.

In other embodiments, or an upstream or downstream IMSA can comprise several individual propellers. These propellers can be offset from one another in the streamwise direction. An upstream or downstream IMSA can comprise counter-rotating coaxial propellers, for example. In some embodiments, or upstream or downstream IMSA can comprise several propellers distributed along the width of the streamtube. In other words, the propellers can also be offset from one another in a direction transverse to the streamwise direction.

The path followed by the tips of the propeller blades of upstream IMSA 151 is shown by dashed line 186. The path followed by the tips of the propeller blades of downstream IMSA 166 is shown by dashed line 187 in FIG. 9.

FIGS. 10, 11, 12, and 13 show perspective, side, top, and rear views, respectively, of IFMA configuration 200, which includes a middle IMSA 201. For simplicity, the middle IMSA 201 can be configured as a straight wing with an elliptical spanwise chord distribution, a constant airfoil shape, and zero twist. The wing can be rigidly attached to a fuselage, for example. For clarity, a fuselage is not shown. Middle IMSA 201 can be configured in a similar manner as middle IMSA 161, and vice versa. Middle IMSA 201 can be configured in a similar manner as a wing or hydroplane of an aircraft or ship. Middle IMSA 201 comprises an outside surface 202 and trailing edge 205. An IMCA 206 is configured to increase the local free stream flow of middle IMSA 201.

In other words, the magnitude of the flow velocity at station 224 is artificially increased by IMCA 206 compared to the magnitude of the flow velocity at upstream station 223 or downstream station 224. IMCA 206 can be considered to be a duct.

Figure 13:
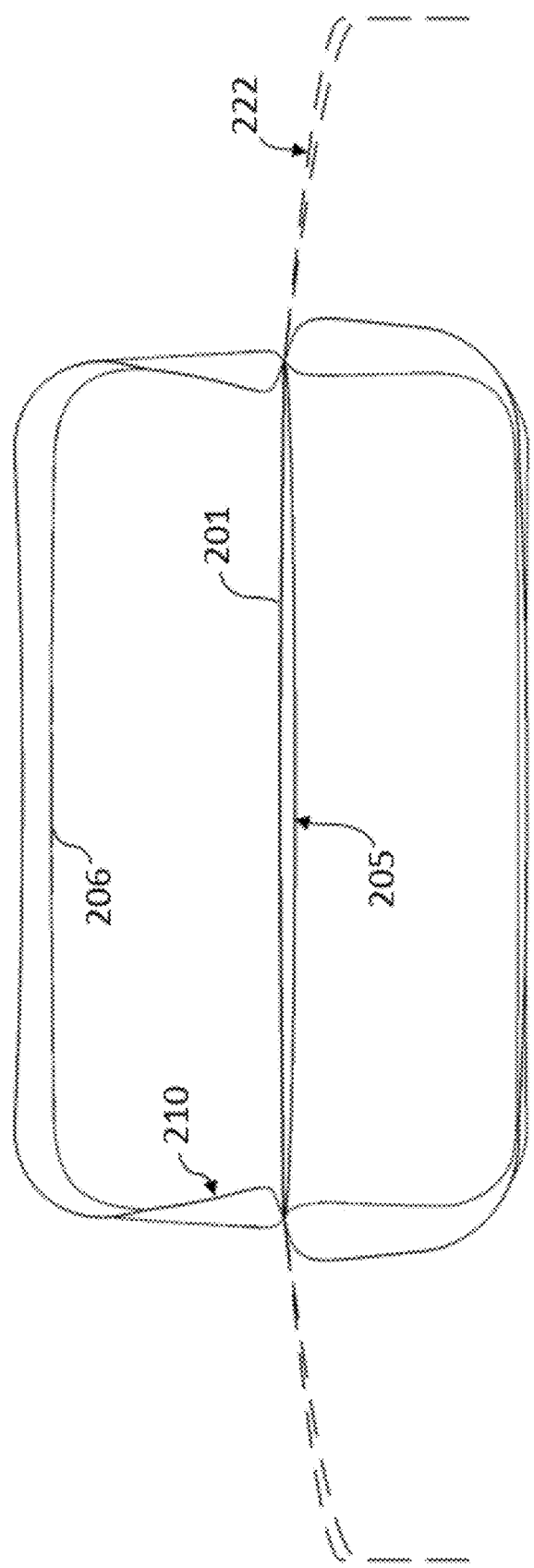

IMCA 206 is rigidly attached to IMSA 201. IMCA 206 comprises an outside surface 207 and a trailing edge 210. In this embodiment, IMCA 206 is rectangular in shape when viewed in the streamwise direction, as shown in FIG. 13. In other embodiments, IMCA 206 can be elliptical, or circular in shape. In other embodiments IMCA can describe a mirrored Bell shape, where the mirroring plane is coincident with the span of the wing.

IMCA 206 can be configured to not shed any vorticity in the framework of lifting line theory. In other words, the circulation associated with IMCA 206 is constant along the spanwise length of IMCA 206. In other embodiments, IMCA 206 can also shed vortices. For example, IMCA 206 can be configured to contribute to the net lift of IFMA configuration 200. In such embodiments, IMCA 206 can be considered to be a conventional closed wing, or annular wing, with a constant spanwise circulation added to the bound vorticity of the IMCA that is shed into the far wake of the IMCA. In other words, the IMCA can be considered to be a superposition of an IMCA and an IMSA. In some embodiments, middle IMSA 201 can also be described as a closed wing.

The varying twist angle of IMCA 206 along the span of IMCA 206 is a result of the effect of IMSA 201 on the flow field and the requirement for the bound vorticity or the circulation of IMCA 206.

In some embodiments, IFMA configuration 200 can include several individual closed wings configured in a similar manner as IMCA 206. These individual IMCAs, can be offset in the streamwise direction, in a manner similar to multi-element airfoils. The individual IMCAs can also be offset in a direction perpendicular to the local streamwise direction. An IMCA can be considered to lie within another IMCA. For example, a first circular IMCA can be considered to be arranged concentrically with a second circular IMCA.

Streamline 222 illustrates the reduction in the cross-sectional area of the streamtube enclosed by IMCA 206 at station 224 due to the acceleration of the flow by IMCA 206. The cross-sectional area of this streamtube is larger at station 225, which corresponds to a larger effective span of IMSA 201.

Figure 10:
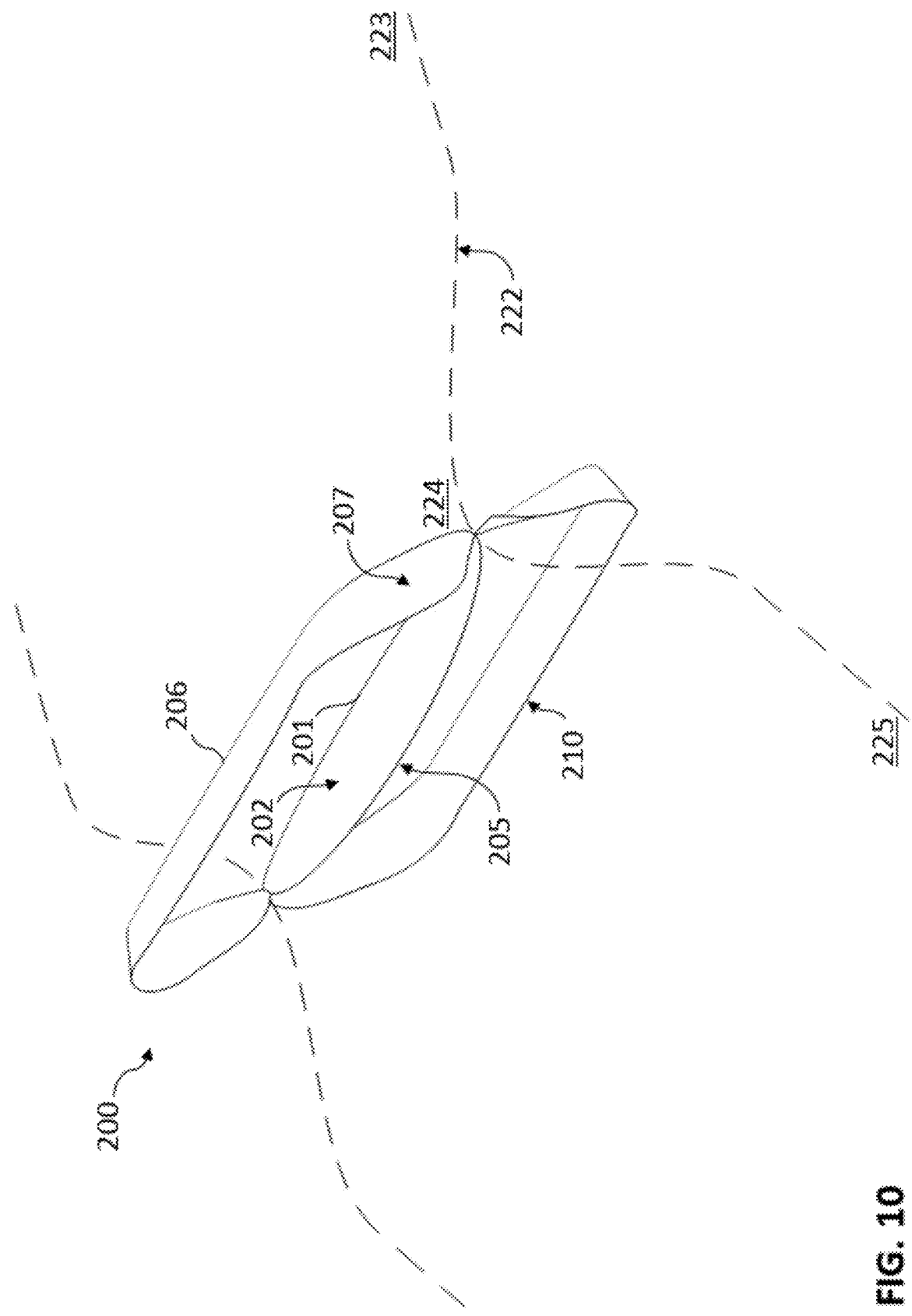
FIGS. 10, 11, 12, and 13 are perspective, side, top, and rear views, respectively, of an IFMA configuration, according to some embodiments.
Figure 11:
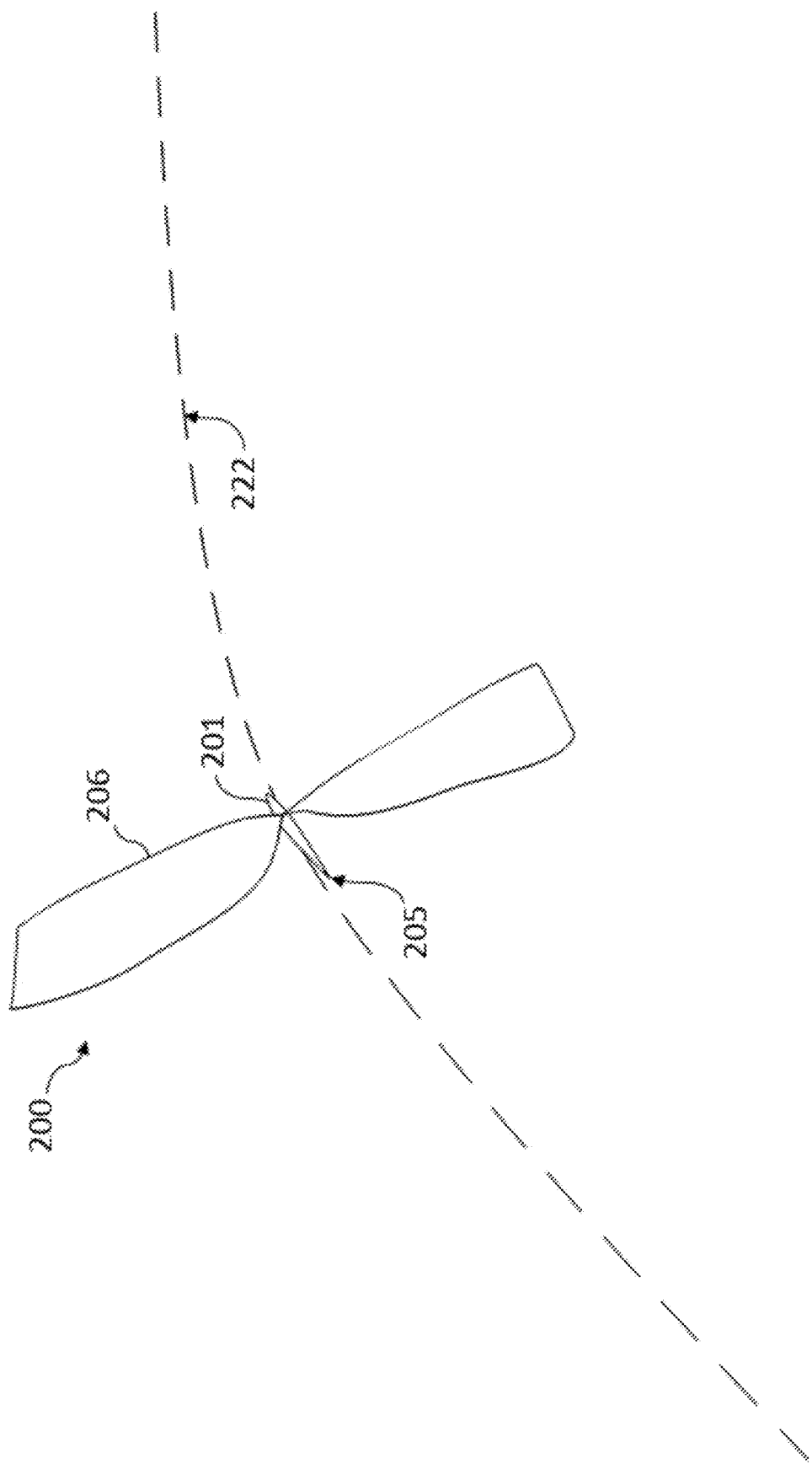
Figure 12:
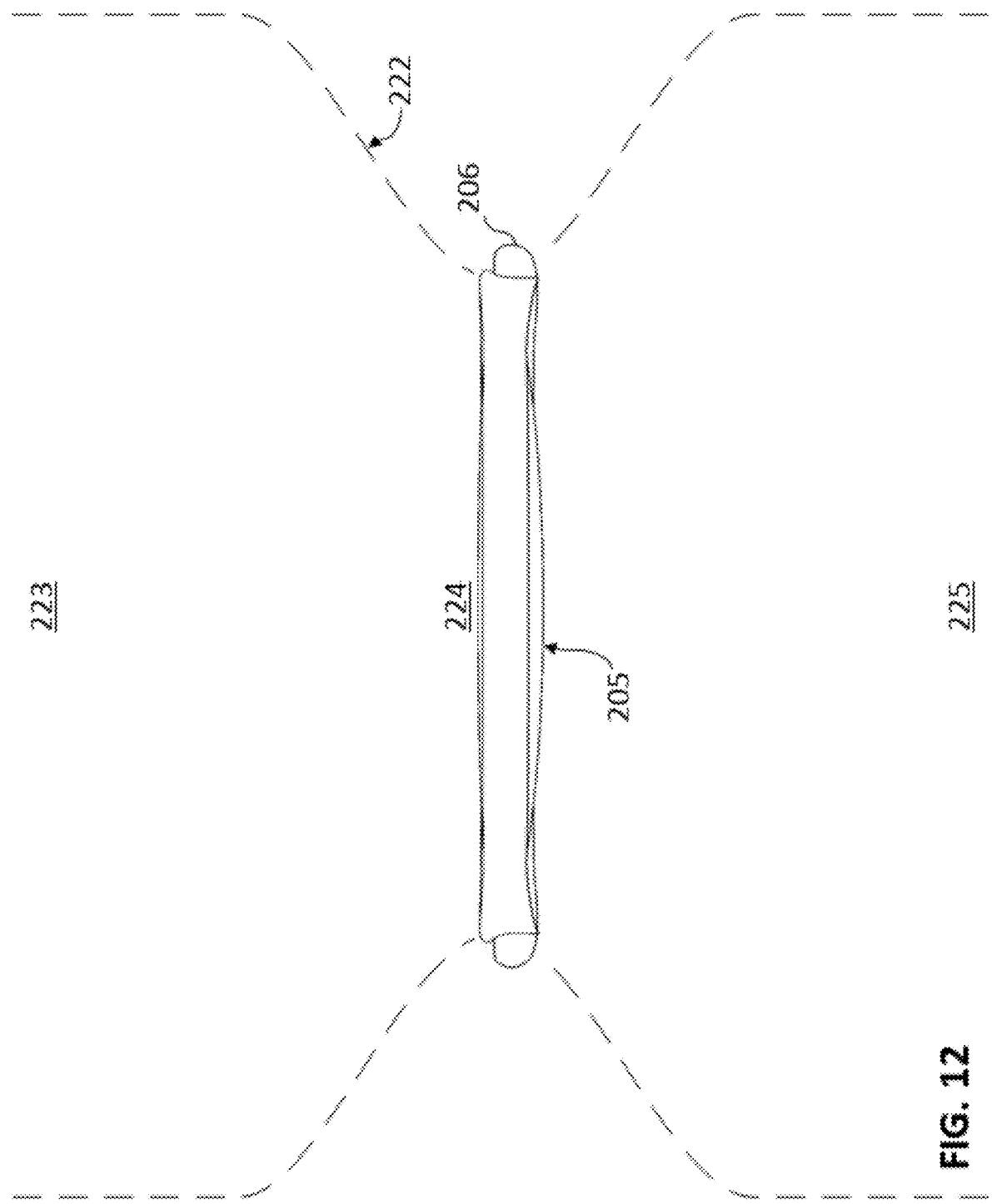
Figure 14:
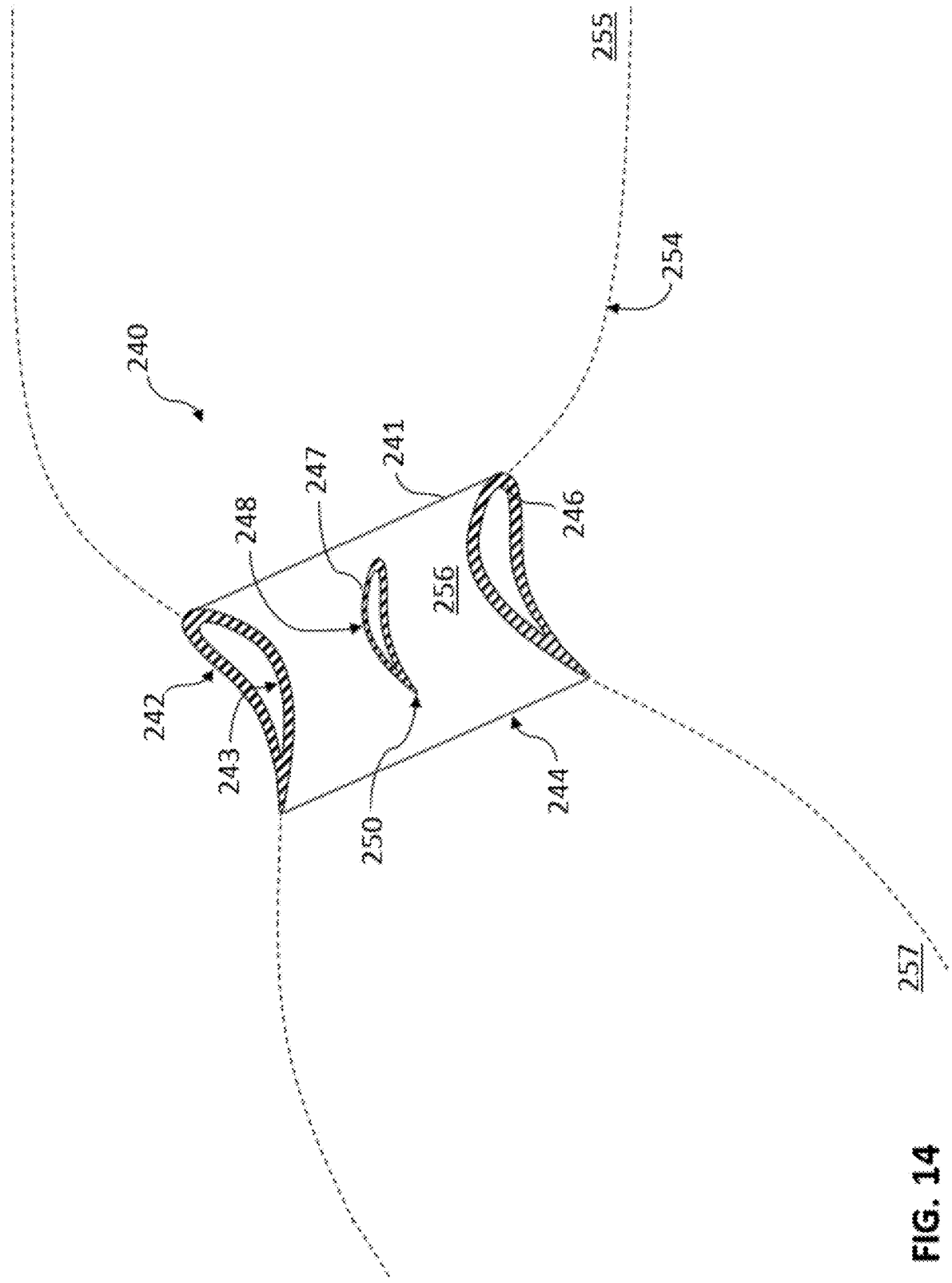
FIG. 14 are cross-sectional, perspective, oblique view an IFMA configuration, according to some embodiments.

FIG. 14 is a cross-sectional view of an IFMA configuration 240, which is configured in a similar manner as IFMA 200 shown in FIG. 10. In this embodiment, the duct 241 does shed vorticity into the wake. Therefore, duct 241 is also referred to as IMSA 241. IMSA 241 can be considered to be a superposition of an IMCA and an IMSA. IMSA 241 is configured to increase the local free stream velocity of middle IMSA 247.

IMSA 241 is substantially axially symmetric in this embodiment. IMSA 241 comprises an outside surface 242, an inside surface 243, bulk material 246, and a trailing edge 244. Bulk material 246 can be configured in a similar manner as bulk material 164. A middle IMSA 247 is configured in a similar manner as middle IMSA 201. Middle IMSA 247 comprises an outside surface 248 and a trailing edge 250.

Streamtube 254 encloses all streamlines that encompass, i.e. pass through the interior of, IMSA 241. The cross-sectional area of streamtube at upstream station 255 is larger than the cross-sectional area at station 256, which in turn is smaller than the cross-sectional area at downstream station 257.

Figure 15:
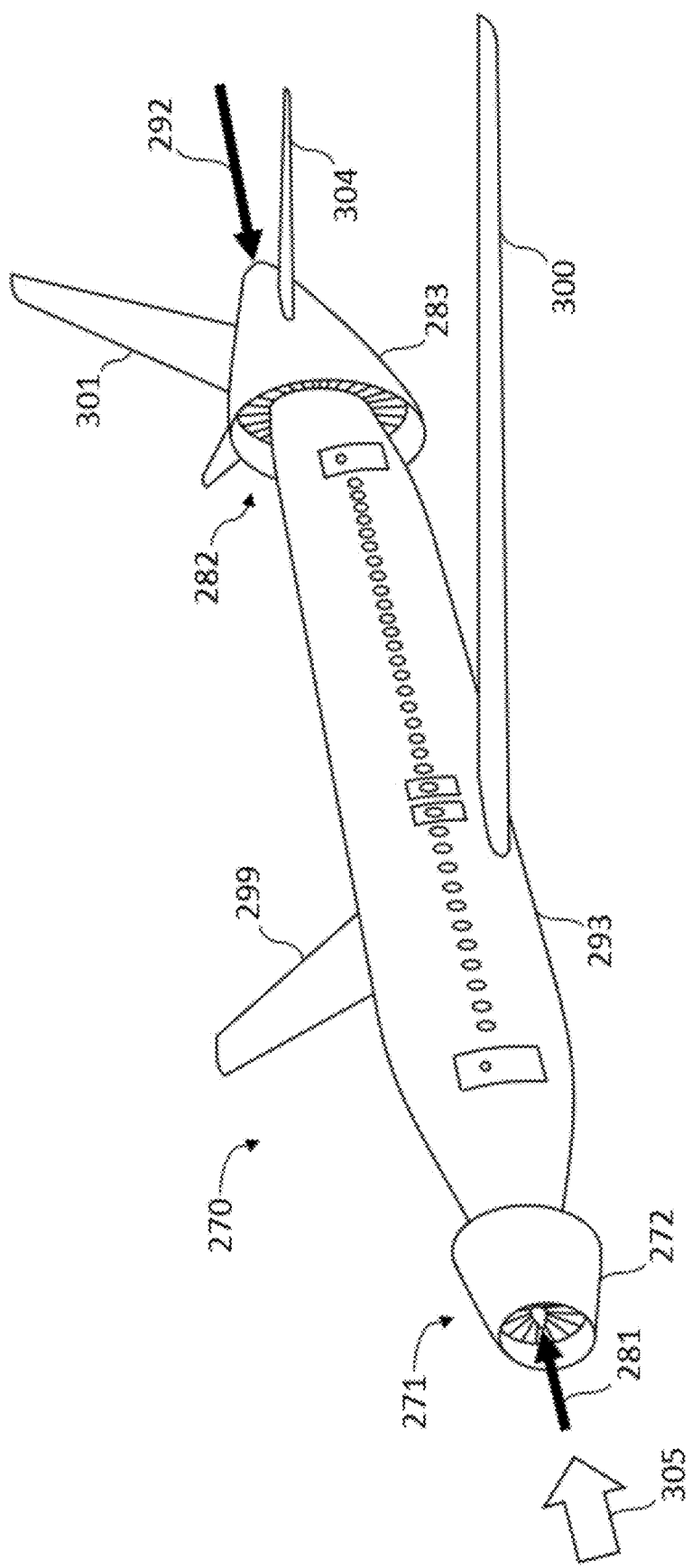
FIGS. 15-18 are oblique views of various IFMA configurations, according to some embodiments.

FIG. 15 is a perspective view of another IFMA configuration 270. Some features of the apparatus shown in FIG. 15, as well as some of the principles of operation of the apparatus share similarities with the apparatus shown in the other figures, and FIG. 7 in particular, and will therefore not be described in the same detail in the context of FIG. 15, and vice versa.

IFMA configuration 270 is depicted as a fixed wing aircraft, such as a commercial transport, or a jet airliner, such as the Boeing 737 or the Airbus A320. There is fuselage 293, a left wing 300 and a right wing 299, a vertical tail 301 comprising a rudder, and a full-flying left horizontal stabilizer 304 and a full-flying right horizontal stabilizer. The flight direction of IFMA 270 is substantially in the direction of thrust vector 292 during nominal level cruise. The free stream flow direction of the air surrounding embodiment 270 relative to embodiment 270 during nominal level cruise is indicated by arrow 305.

There is an upstream IMSA 271, which in this embodiment can be described as a ducted fan. The duct in this embodiment is configured to decelerate the flow prior to encountering the fan disc located within the fan. For some embodiments, wave drag losses associated with the fan disc can be avoided or mitigated in this manner. Upstream IMSA 271 comprises a duct 272 and a fan disc. Upstream IMSA 271 is configured to apply a force on IFMA configuration 270 that is directed in the same direction as the average free stream flow relative to IFMA 270, as indicated by thrust vector 281. Upstream IMSA 271 is configured to extract energy from the surrounding fluid. IFMA 270 is configured to transfer at least a portion of this energy to downstream IMSA 282. As mentioned this transfer can be facilitated by a mechanical drive shaft connecting the fan disk of upstream IMSA 271 to the fan disk of downstream IMSA 282. The fan disk of upstream IMSA 271 can transmit power to the fan disk of downstream IMSA 282 via a direct, rigid, mechanical connection, for instance. The fan disk of upstream IMSA 271 can transmit power to the fan disk of downstream IMSA 282 via a drive shaft and a gear train. Said drive shaft can pass through fuselage 293. The fan disk of upstream IMSA 271 can transmit power to the fan disk of downstream IMSA 282 via an electric generator, which transmits power to an electric motor which via electrical wires or conductors, where the electric motor transmits power to the fan disk of downstream IMSA 282. Upstream IMSA 271 and downstream IMSA 282 are rigidly attached to fuselage 293.

Downstream IMSA 282 can be described as a turbofan engine in some embodiments. In the case in which power is transferred from upstream IMSA 271 to downstream IMSA 282 electrically, downstream IMSA 282 can be described as a hybrid electric turbofan engine. In other embodiments, downstream IMSA 282 can be described as a turbojet engine. Downstream IMS 282 comprises a duct 283. Downstream IMSA 282 is configured to apply a force on embodiment 270 which is directed in the opposite direction as the average free stream flow relative to IFMA configuration 270, as indicated by thrust vector 292. In this embodiments, the magnitude of the thrust of downstream IMSA 282 is larger than the magnitude of the thrust of upstream IMSA 271. Thus, downstream IMSA 282 is configured to satisfy any outstanding thrust requirements of IFMA configuration 270. In other embodiments, at least one separate propulsion unit or engine can be attached to at least one wing. Such a separate engine can be a conventional turbofan or a hybrid electric turbofan, for example.

Upstream IMSA 271 can be configured to artificially reduce the local free stream flow of at least fuselage 293, and downstream IMSA 282 is configured to cancel at least a portion of the reduction in the flow velocity in the wake of and in the proximity of fuselage 293.

In some embodiments, upstream IMSA 271 can be considered to create an artificial boundary layer for fuselage 293, where the boundary layer is approximately enclosed by the streamtube which passes through the interior of duct 272. Note that the fuselage 293 and the artificial boundary layer can also be considered to be enveloped by a natural boundary layer. Upstream IMSA 271 is configured to modify the velocity profile within this artificial boundary layer, or in the proximity of the wetted surface of fuselage 293, in a manner in which the drag of the fuselage 293, and IFMA configuration 270 as a whole, is reduced compared to a baseline scenario in which there is no upstream IMSA 271, i.e. compared to the scenario in which the fuselage is enveloped only by a natural boundary layer. The reduction in drag can comprise a reduction in the viscous drag, and/or a reduction in the wave drag or compressibility drag, for example. The drag reduction is associated with the modification of the spatial profile of the fluid flow velocity relative to fuselage 293 by the upstream IMSA 271, and, to a lesser extent, downstream IMSA 282.

The reduction of the magnitude of the local free stream fluid flow velocity of fuselage 293, the reduction in the fluid flow velocity at, and relative to, the wetted surface of fuselage 293, as well as the generation of a more favorable velocity profile in the vicinity of wetted surface of fuselage 293, by upstream IMSA 271 can contribute to said reduction in viscous drag. A more favorable velocity profile can comprise a reduced peak spatial fluid flow velocity gradient, or a reduced spatial average magnitude of the spatial fluid flow velocity gradient in the vicinity of IFMA configuration 270, for example.

The reduction in the wave drag can be a result of the more gradual change in the fluid flow direction as the fluid flows around IFMA configuration 270, or a more gradual displacement of the fluid by IFMA configuration 270. This is facilitated by the deceleration of the fluid flow by upstream IMSA 271 and the acceleration of the fluid flow by IMSA 282. The strength of the disturbance to the fluid flow by IFMA configuration 270 can thus be reduced, which can reduce the wave drag associated with IFMA configuration 270.

The reduction in drag can reduce the power consumption of IFMA configuration 270 compared to the baseline scenario or allow the IFMA configuration 270 to move faster relative to the fluid for a given power consumption. This can increase the range or the top speed of IFMA configuration 270.

Figure 16:
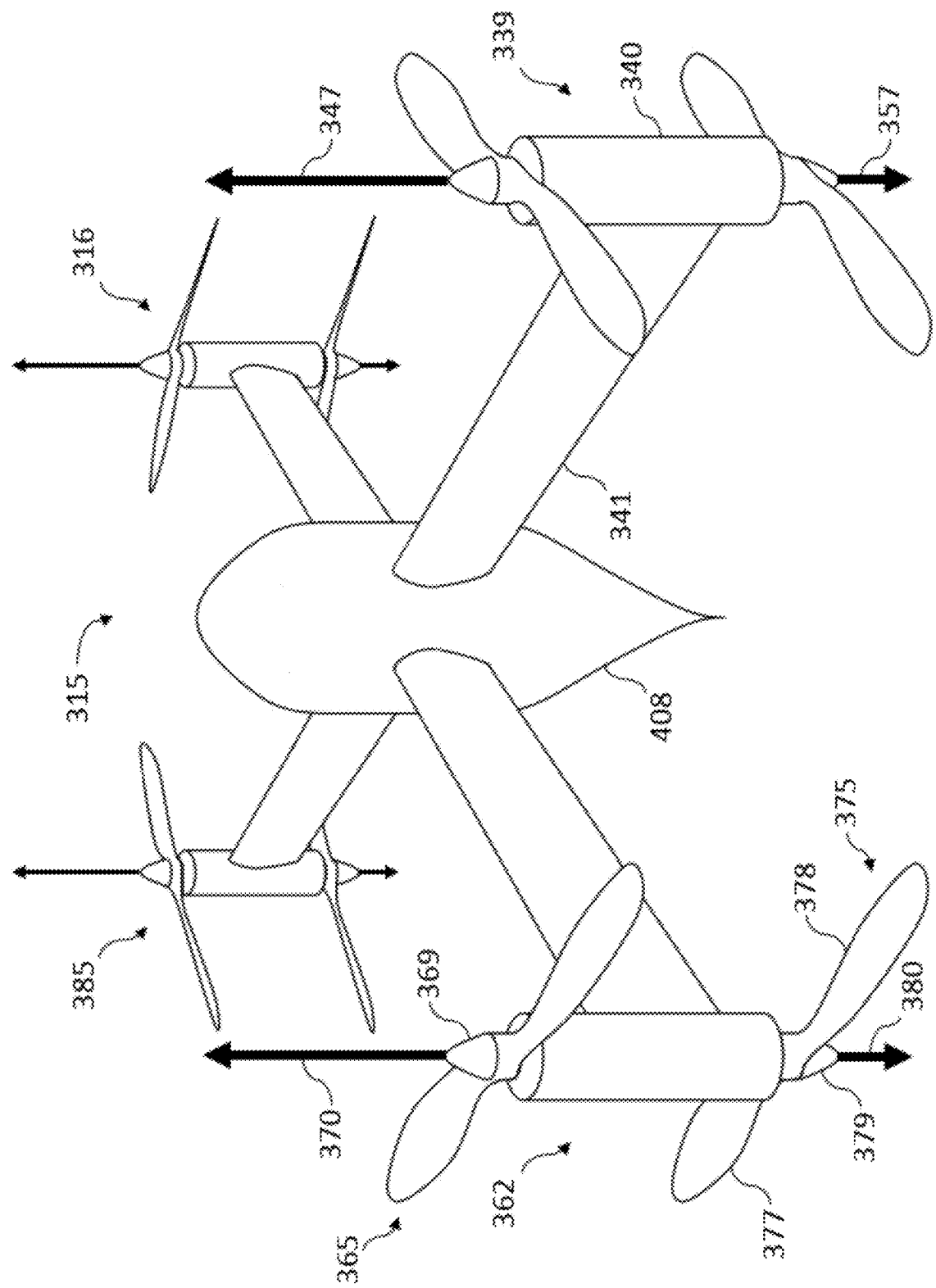

FIG. 16 is an oblique top view of another IFMA configuration 315. Some features of the apparatus shown in FIG. 16, as well as some of the principles of operation of the apparatus share similarities with the apparatus shown in the other figures, and FIG. 3 in particular, and will therefore not be described in the same detail in the context of FIG. 16, and vice versa.

IFMA configuration 315 can be described as a quadrotor helicopter or quadcopter. Embodiment 315 can also be described as an octorotor or multirotor. IFMA configuration 315 comprises four IMSA assemblies, such as IMSA assemblies 316, 339, 362, and 385. Each IMSA assembly comprises an upstream IMSA, such as upstream IMSA 365 of IMSA assembly 362, and a downstream IMSA, such as downstream IMSA 375 of IMSA assembly 362.

Each upstream or downstream IMSA can be described as a propeller. Each propeller can include a first propeller blade, such as first propeller blade 377 of downstream IMSA 375, and a second propeller blade, such as second propeller blade 378 of downstream IMSA 375. In other embodiments, a propeller can include at least one, or only one blade. In other embodiments, a propeller can include at least 3 blades. A propeller hub, such as propeller hub 379 or 369 connect each propeller to a drive shaft or actuator.

IFMA configuration 315 is shown in a hover. The flow induced by an IMSA assembly is directed in the vertically downwards direction, i.e. substantially aligned with thrust vector 380.

An upstream IMSA, such as upstream IMSA 365, is configured to produce a thrust force acting on IFMA configuration 315 which is directed in the upwards direction, as indicated by thrust vectors 370 or 347. A downstream IMSA, such as downstream IMSA 375, is configured to produce a thrust force acting on embodiment 315 which is directed in the downwards direction, as indicated by thrust vectors 380 or 357.

An upstream IMSA is configured to increase the local free stream flow velocity relative to itself compared to a scenario in which an IMSA assembly comprises just one IMSA, i.e. only the upstream IMSA. A corresponding downstream IMSA is configured to cancel any excess momentum in the fluid flow in the wake of the upstream IMSA. Note that, during nominal hover, the sum of the net thrust produced by all four IMSA assemblies is substantially equal to the weight of IFMA configuration 315. During nominal hover, the net thrust produced by any one IMSA assembly is substantially equal to the net thrust produced by any other of the four IMSA assemblies. Downstream IMSA is configured to produce a thrust force acting on embodiment 315 in the direction of the fluid flow relative to embodiment 315 through the upstream IMSA, as indicated by thrust vectors 380 or 357. The magnitude of the thrust vector of a downstream IMSA is smaller than the magnitude of the thrust vector of the corresponding upstream IMSA during nominal hover.

Each IMSA assembly in IFMA configuration 315 also comprises a nacelle, such as nacelle 340, which houses actuators, generators, gear boxes, or drive shafts which facilitate the transfer of energy from a downstream IMSA to an upstream IMSA. Note that a downstream IMSA of a first IMSA assembly can also transmit power to an upstream IMSA of a second IMSA assembly.

In the configuration shown in FIG. 16, the induced power consumption of an IMSA assembly is lower than the induced power consumption of an equivalent baseline or reference configuration, in which the effect of the downstream IMSA on the fluid is negligible, i.e., the thrust of the upstream IMSA is substantially equal to the net thrust requirement. In the baseline configuration an IMSA assembly can be considered to only comprise the upstream IMSA. Note that, as mentioned, an IMSA, such as the upstream IMSA, can comprise several propellers or thrust apparatuses in some embodiments. In this case, the baseline configuration is identical to a conventional quadrotor helicopter.

Each IMSA assembly is rigidly connected to fuselage 408 via a beam. Each beam is enclosed in an aerodynamic or hydrodynamic fairing, such as beam fairing 341. In some embodiments, the beam fairings are rotably connected to the beam, i.e., able to rotate relative to fuselage 408 and the corresponding nacelle. In some embodiments, at least one beam fairing can be employed to produce lift during nominal level cruise, where the lift is generated in a similar manner as the lift of a conventional fixed wing aircraft, where the fuselage long axis is oriented in a substantially horizontal direction, i.e. the direction of motion in an inertial frame, and where at least one IMSA assembly is configured to produce a net thrust which counteracts the drag acting on IFMA configuration 315. Note that the pitch angle of the propellers of some IMSA can be modified in some embodiments. Note that, during cruise, the propellers of some IMSA assemblies can be feathered.

In some embodiments, the upstream IMSA can be powered by an electric motor. In some embodiments, upstream IMSA can be powered by a brushless DC motor comprising permanent magnets. In some embodiments, an IMSA assembly can be powered by an AC induction motor. In some embodiments, the drive shaft of an upstream IMSA is rigidly connected to the drive shaft of the corresponding downstream IMSA. In some embodiments the actuator powering the drive shaft is rigidly connected to the drive shaft in a direct drive configuration. In some embodiments, the actuator is connected to the drive shaft via a clutch or gear train. The power can be provided by a battery, an internal combustion engine, or a turboshaft engine, for example. The actuator powering one or more IMSA assemblies can also be located within fuselage 408. The power can be transmitted from such an actuator to an IMSA assembly mechanically or electrically, for example.

In some embodiments, an upstream or downstream IMSA comprises several propellers. For example, an upstream or downstream IMSA can comprise at least two counter-rotating or co-rotating coaxial propellers.

Note that the propellers of an upstream IMSA and corresponding downstream IMSA need not be in phase, and need not be rotating at the same angular velocities during nominal operations. In some embodiments, there is an optimal phase angle for a given distance of separation between an upstream IMSA and a downstream IMSA, where optimality can refer to the minimization of the cost of operation of the vehicle, or the maximization of the endurance of the vehicle.

Figure 17:
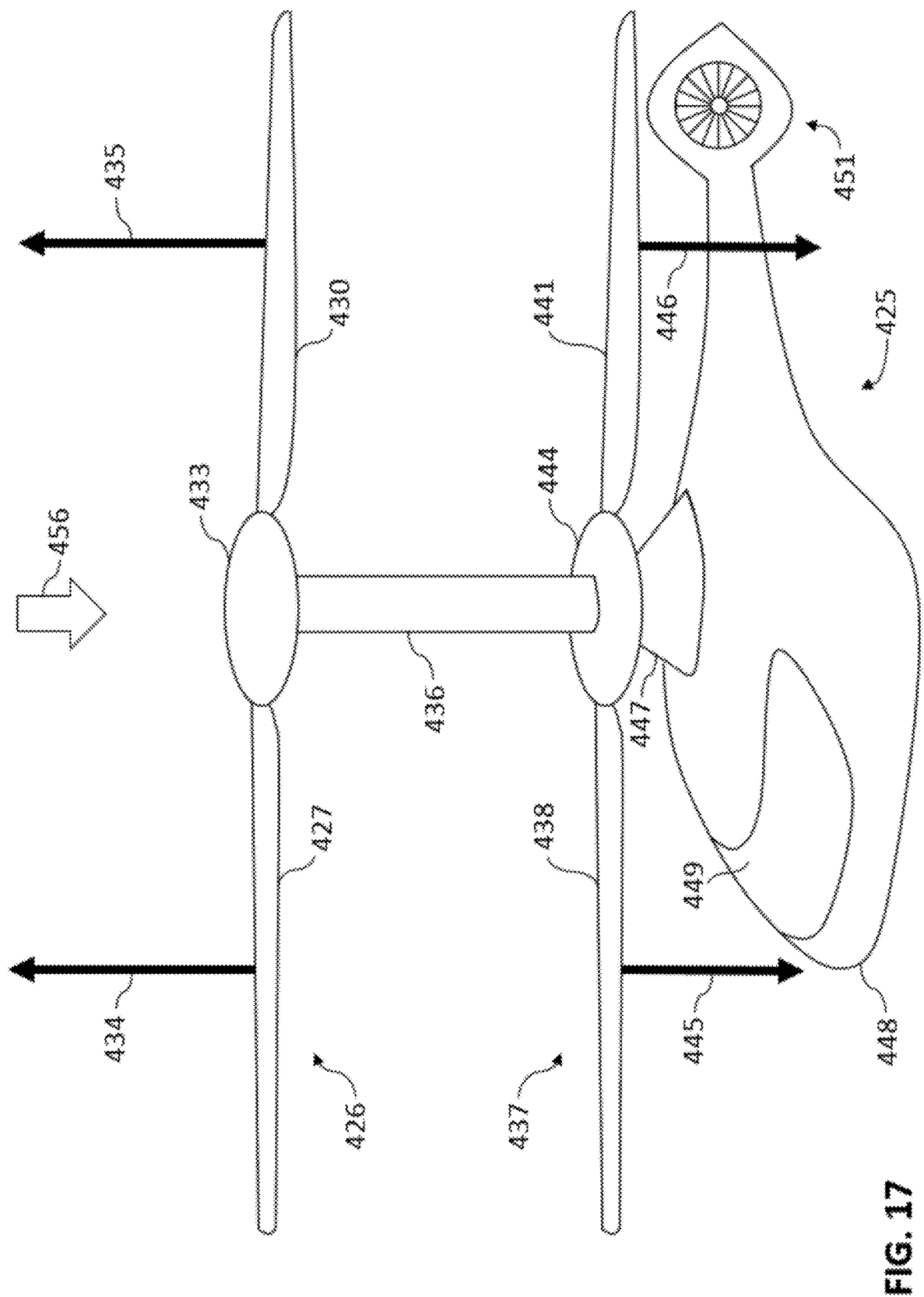

FIG. 17 is an oblique top view of another IFMA configuration 425. Some features of the apparatus shown in FIG. 17, as well as some of the principles of operation of the apparatus share similarities with the apparatus shown in the other figures, and FIG. 3 in particular, and will therefore not be described in the same detail in the context of FIG. 17, and vice versa.

IFMA configuration 425 can be described as a conventional helicopter. IFMA configuration 425 comprises a fuselage 448 with window 449, and a tail rotor assembly 451.

IFMA configuration 425 is shown in a nominal hover, where the induced flow is directed in the vertically downwards direction, as indicated by flow direction 456.

An upstream IMSA 426, is configured to produce a thrust force acting on IFMA configuration 425 which is directed in the upwards direction, as indicated by thrust vector 434 associated with a first rotor blade 427 or thrust vector 435 associated with a second rotor blade 430. First blade 427 and second blade 430 are connected to a drive shaft via a rotor hub 433. The drive shaft can be enclosed by an aerodynamic fairing 436.

An downstream IMSA 437, is configured to produce a thrust force acting on embodiment 425 which is directed in the downwards direction, as indicated by thrust vector 445 associated with a first rotor blade 438 or thrust vector 446 associated with a second rotor blade 441. First blade 438 and second blade 441 are connected to a drive shaft via a rotor hub 444. The drive shaft can be enclosed by an aerodynamic fairing 447. In some embodiments, the drive shaft of upstream IMSA 426 and downstream IMSA 437 are identical. In other embodiments, the drive shaft of upstream IMSA 426 passes through the center of the drive shaft of downstream IMSA 437 in a coaxial configuration. In other embodiments, the fuselage 448 is located between upstream IMSA 426 and downstream IMSA 437.

The main rotor system of IFMA configuration 425 can be described as an IMSA assembly comprising the upstream IMSA 426 and the downstream IMSA 437. In the hovering configuration shown in FIG. 17, the induced power consumption of the IMSA assembly is lower than the induced power consumption of an equivalent baseline or reference configuration, in which the effect of the downstream IMSA on the fluid is negligible, i.e., the thrust of the upstream IMSA is substantially equal to the net thrust requirement. In the baseline configuration an IMSA assembly can be considered to only comprise the upstream IMSA. In this case, the baseline configuration is identical to a conventional helicopter.

During a range of operating conditions in nominal level cruise, at least a portion of downstream IMSA 437 is no longer located in the wake of upstream IMSA 426. When this portion is sufficiently large, downstream IMSA 437 can be feathered. In some embodiments, the feathering of the downstream IMSA 437 can comprise the reduction of the angular velocity of the rotor blades to zero. In some embodiments, the rotor blades of downstream IMSA 437 are folded. For instance, the rotor blades can be folded into an aerodynamic fairing for nominal level cruise. In other embodiments, during nominal level cruise, the downstream IMSA 437 can be configured to produce a thrust or lift which has a positive component along the thrust of lift vector of the upstream IMSA 426. In that regard, downstream IMSA 437 and upstream IMSA 426 can be operated or configured in a similar manner as the rotors of coaxial helicopters in the prior art.

Note that the principles of some embodiments can also be applied to tiltrotors. For example, a single rotor of a tiltrotor can be replaced by two rotors separated by a support shaft, similar to the two rotors, i.e. upstream IMSA 426 and downstream IMSA 437, shown in FIG. 17. In this manner, the benefits of some embodiments can be made available for both cruising flight and hovering flight.

Figure 18:
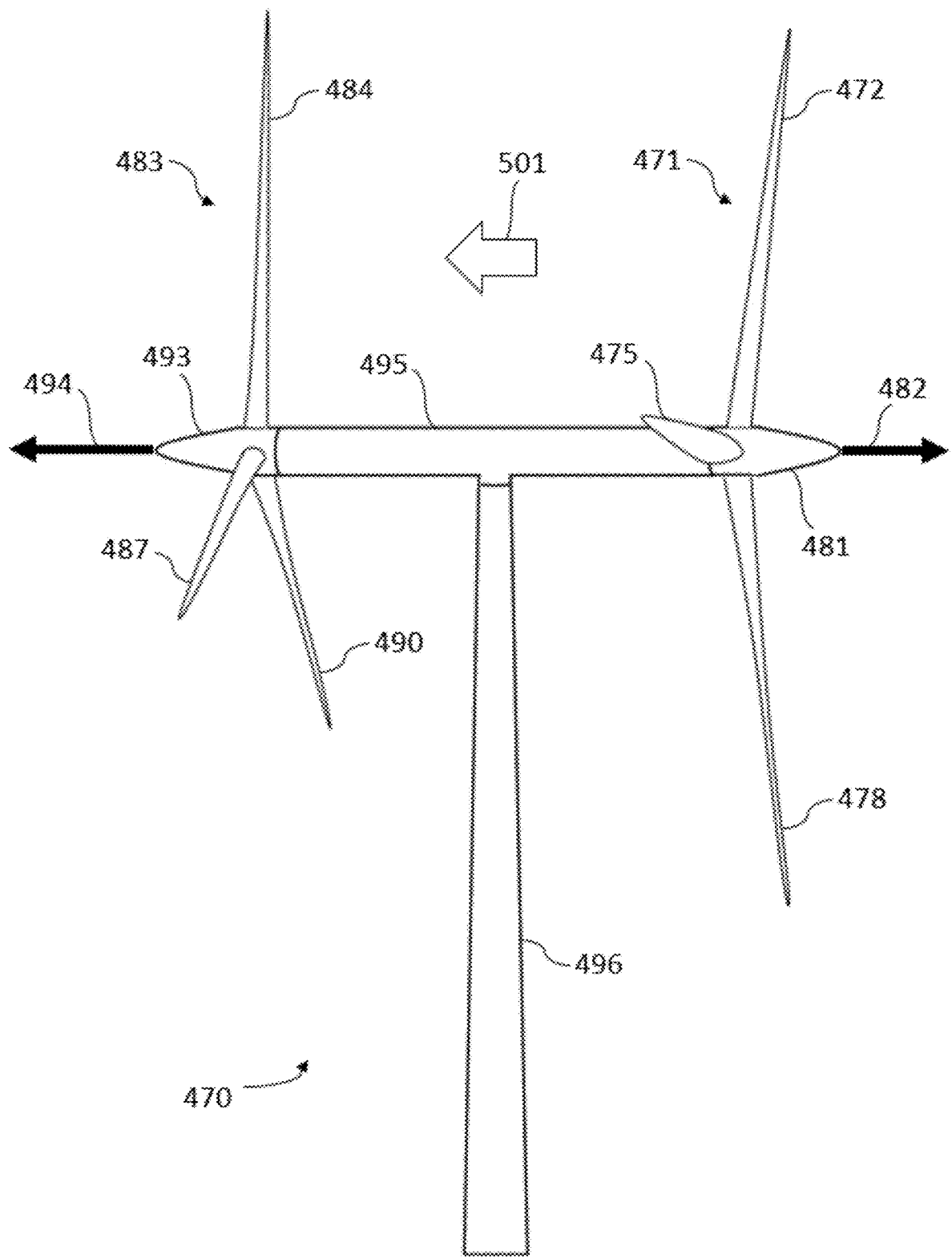

FIG. 18 is an oblique side view of another IFMA configuration 470. Some features of the apparatus shown in FIG. 18, as well as some of the principles of operation of the apparatus share similarities with the apparatus shown in the other figures, and FIG. 3 in particular, and will therefore not be described in the same detail in the context of FIG. 18, and vice versa.

IFMA configuration 470 can be described as a wind turbine. The wind direction is indicated by arrow 501. IFMA configuration 470 includes a vertical support 496 rotably connected to a horizontal nacelle 495, where the rotation axis is parallel to the vertical axis. An upstream IMSA 471 and a downstream IMSA 483 are rotably connected to nacelle 495, where the rotation axes are coaxial, and parallel to the horizontal axis.

Upstream IMSA 471 can be described as a propeller in this embodiment, and comprises a first blade 472, a second blade 478, and a third blade 475. Each blade is rotably connected to a rotor hub 481, where the rotation axis is substantially parallel to the long axis of the blade. The pitch angle of each rotor blade can be adjusted according to the wind conditions in order to optimize the performance of the wind turbine, where the performance can refer to the power extracted from the wind, for example. Upstream IMSA 471 is configured to accelerate the fluid flow, i.e. increase the magnitude of the velocity of the fluid relative to an inertial frame, at the location of the downstream IMSA 483. Upstream IMSA 471 exerts a thrust force on embodiment 470 directed in the upstream direction, as indicated by thrust vector 482.

Downstream IMSA 483 can be described as a propeller in this embodiment, and comprises a first blade 484, a second blade 490, and a third blade 475. Each blade is rotably connected to a rotor hub 493, where the rotation axis is substantially parallel to the long axis of the blade. The pitch angle of each rotor blade can be adjusted. Downstream IMSA 483 is configured to decelerate the fluid flow, i.e. decrease the magnitude of the velocity of the fluid relative to an inertial frame, downstream of downstream IMSA 483. Downstream IMSA 483 exerts a thrust force on IFMA configuration 470 directed in the downstream direction, as indicated by thrust vector 494. A portion of the power extracted by downstream IMSA 483 from the fluid is transferred to upstream IMSA 471, and a portion of this transferred power is applied to the fluid by upstream IMSA 471. As mentioned, this power can be transferred mechanically or electrically, for example.

The rotor system of IFMA configuration 470 can be described as an IMSA assembly comprising the upstream IMSA 471 and the downstream IMSA 483. In the configuration shown in FIG. 18, the power extracted by the IMSA assembly from the motion of the surrounding fluid, e.g., the wind or water current, is larger than the power extracted by an equivalent baseline or reference configuration, in which the effect of the upstream IMSA on the fluid is negligible, i.e. the thrust of the downstream IMSA in the baseline configuration is substantially equal to the net thrust of IFMA configuration 470 shown in FIG. 18. In the baseline configuration an IMSA assembly can be considered to only comprise the downstream IMSA. For the depicted configuration, the baseline configuration is identical to a conventional wind turbine. The improvement in performance is particularly pronounced at low wind or current velocities.

Figure 19:
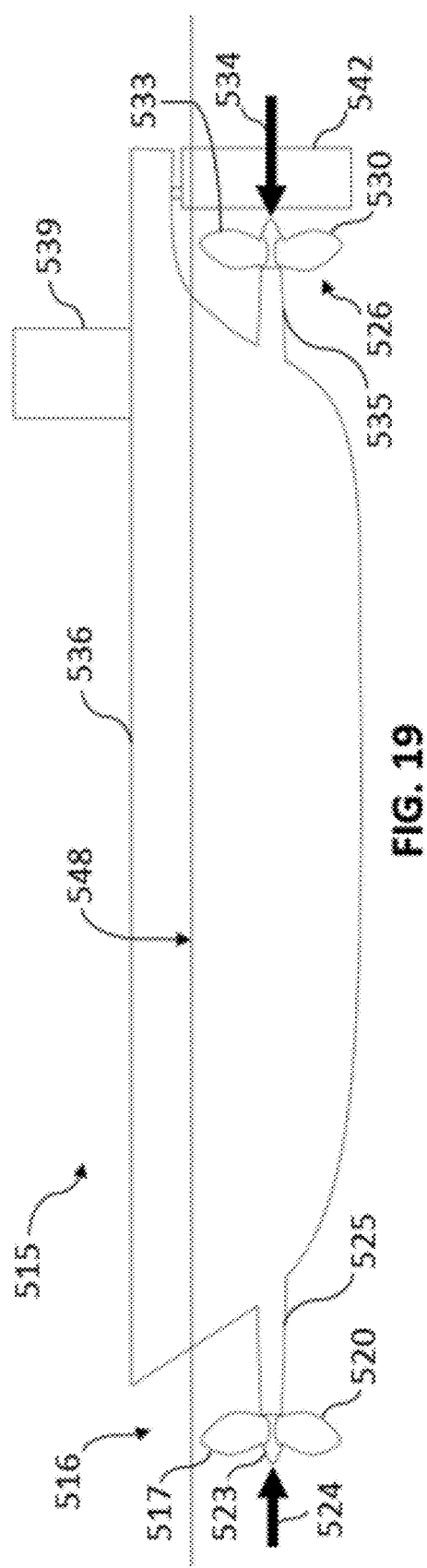

FIG. 19 is a side view of another IFMA configuration 515. Some features of the apparatus shown in FIG. 19, as well as some of the principles of operation of the apparatus share similarities with the apparatus shown in the other figures, and FIG. 7 in particular, and will therefore not be described in the same detail in the context of FIG. 19, and vice versa.

IFMA configuration 515 can also be described as a ship, with a hull 536, superstructure 539 above the water surface 548, and a rudder 542 below the surface.

An upstream IMSA 516 can be described as a propeller with at least a first propeller blade 517 and a second propeller blade 520. Each propeller blade is rotably connected to hub 523, where the rotation axis is parallel to the long axis of the blade. The pitch of each propeller blade can be adjusted to the operating conditions of the ship. Upstream IMSA 516 is supported by a fairing 525 which, in some embodiments, encloses a drive shaft which is rigidly connected to hub 523. In some embodiments, hub 523 is connected to an electric generator in a direct drive configuration. Upstream IMSA 516 is configured to decelerate the flow and reduce the local free stream flow of hull 536. Accordingly, upstream IMSA 516 exerts a thrust force on IFMA configuration 515 which is directed in the direction of fluid flow relative to hull 536, as indicated by thrust vector 524.

A downstream IMSA 526 can be described as a propeller with at least a first propeller blade 533 and a second propeller blade 530. Each propeller blade is rotably connected to hub, where the rotation axis is parallel to the long axis of the blade. The pitch of each propeller blade can be adjusted to the operating conditions of the ship. Downstream IMSA 526 is supported by a fairing 535 which, in some embodiments, encloses a drive shaft which is rigidly connected to said hub. In some embodiments, the hub is connected to an electric motor in a direct drive configuration. Downstream IMSA 526 is configured to accelerate the flow. Accordingly, downstream IMSA 526 exerts a thrust force on IFMA configuration 515 which is directed in the opposite direction of fluid flow relative to hull 536, as indicated by thrust vector 534.

The upstream IMSA 516 can reduce the drag of the IFMA configuration 515. The drag reduction can comprise a reduction in the viscous drag of hull 536, and/or a reduction in the gravitational wave drag of hull 536. The drag reduction is associated with the modification of the spatial profile of the fluid flow velocity relative to hull 536 by the upstream IMSA 516. The reduction of the magnitude of the local free stream fluid flow velocity of hull 536, the reduction in the fluid flow velocity at, and relative to, the wetted surface of hull 536, as well as the generation of a more favorable velocity profile in the vicinity of wetted surface of hull 536, by upstream IMSA 516 can contribute to said reduction in viscous drag. A more favorable velocity profile can comprise a reduced peak spatial fluid flow velocity gradient, or a reduced spatial average magnitude of the spatial fluid flow velocity gradient in the vicinity of IFMA configuration 515, for example. The reduction in the wave drag can be a result of the more gradual change in the fluid flow direction as the fluid flows around IFMA configuration 515, or a more gradual displacement of the fluid by IFMA configuration 515 as a result of the deceleration of the fluid flow by upstream IMSA 516 and acceleration of the fluid flow by IMSA 526. The strength of the disturbance to the fluid flow by IFMA configuration 515 can thus be reduced. In some embodiments, the upstream IMSA 516 can be configured to perform a similar function as the bulbous bow found on conventional ship hull designs, for example.

FIG. 20 is a side view of another IFMA configuration 560. Some features of the apparatus shown in FIG. 20, as well as some of the principles of operation of the apparatus share similarities with the apparatus shown in the other figures, and FIG. 7 in particular, and will therefore not be described in the same detail in the context of FIG. 20, and vice versa.

IFMA configuration 560 can also be described as a train or a truck, and comprises a first wagon 561, a second wagon 576, a third wagon 577, a fourth wagon 589, and a fifth wagon 591. Each wagon is supported by wheels, such as wheel 563, which facilitate the motion of the wagon relative to road or rails 605. Each wagon is connected to an adjacent wagon by a connection, such as connection 566. The wagons are rotably connected to the wheels by a supporting structure, such as supporting structure 578.

An upstream IMSA 567 can be described as a propeller with at least a first propeller blade 568 and a second propeller blade 571. Each propeller blade is rotably connected to hub 574, where the rotation axis is parallel to the long axis of the blade. The pitch of each propeller blade can be adjusted to the operating conditions of the vehicle. Upstream IMSA 567 is configured to decelerate the flow and reduce the local free stream flow of the remaining vehicle. Accordingly, upstream IMSA 567 exerts a thrust force on IFMA configuration 560 which is directed in the direction of fluid flow relative to IFMA configuration 560, as indicated by thrust vector 575.

A downstream IMSA 596 can be described as a propeller. In IFMA configuration 560, first wagon 561 can be identical to fifth wagon 591 in order to reduce the manufacturing cost of embodiment 560. Note that first wagon 561 is operated in a different manner as fifth wagon 591. Downstream IMSA 596 is configured to accelerate the flow. Accordingly, downstream IMSA 596 exerts a thrust force on IFMA configuration 560 that is directed in the opposite direction of fluid flow relative to embodiment 560, as indicated by thrust vector 604.

Due to the length of IFMA configuration 560, the drag reducing effect of upstream IMSA 574 is reduced as the distance from upstream IMSA 574 along the length of embodiment 560 is increased. This can be due to the viscous effects, for instance. A middle IMSA 580 is configured to correct for any distortional effects on the actual velocity profile compared to the ideal velocity profile in the vicinity of the outside surface of IFMA configuration 560. Middle IMSA 580 comprises at least a first propeller blade 581 and a second propeller blade 584. Each propeller blade is rotably connected to hub 587, where the rotation axis is parallel to the long axis of the blade. The pitch of each propeller blade can be adjusted to the operating conditions of the vehicle. Middle IMSA 580 is configured to decelerate the flow and reduce the local free stream flow of the remaining vehicle. Accordingly, middle IMSA 580 exerts a thrust force on IFMA configuration 560 that is directed in the direction of fluid flow relative to embodiment 560, as indicated by thrust vector 588.

In some embodiments, the sum of the drag force acting on the portions of the vehicle between middle IMSA 580 and downstream IMSA 596 and the thrust or drag acting on middle IMSA 580 is smaller than the drag force acting between a third wagon and the last wagon of the embodiment in the scenario in which there is no middle IMSA, i.e. in the scenario in which the third wagon is configured in a similar manner as the second wagon 576. For some embodiments, for some operating conditions, the net drag force acting on an embodiment without a dedicated middle IMSA, such as middle IMSA 580 is larger than the net drag force acting on IFMA configuration 560. Note that some embodiments can comprise several middle IMSAs, configured in a similar manner as middle IMSA 580. Note that several wagons, such as wagon 576, can be located between an upstream, middle, or downstream IMSA. In some embodiments, the connection between adjacent wagons comprises an aerodynamic fairing configured to allow wagons to rotate relative to each other during curves or bends in the road or rail.

Upstream IMSA 567 and middle IMSA 580 can be configured to extract energy from the surrounding fluid, while downstream IMSA 596 can be configured to apply at least a portion of the extracted energy to the fluid surrounding IFMA configuration 560. Note that embodiments similar to IFMA configuration 560 can include a separate traction motor configured to contribute to the propulsion of the embodiment by transmitting a torque to at least one wheel. In other embodiments, any outstanding thrust requirements of the embodiment are provided by downstream IMSA 596.

FIG. 21 is a side view of another IFMA configuration 620. Some features of the apparatus shown in FIG. 21, as well as some of the principles of operation of the apparatus share similarities with the apparatus shown in the other figures, and FIG. 7 and FIG. 20 in particular, and will therefore not be described in the same detail in the context of FIG. 21, and vice versa.

IFMA configuration 620 can also be described as a train or a truck, and comprises a first wagon 621, a second wagon 632, a third wagon 633, a fourth wagon 634, a fifth wagon 646, and a sixth wagon 647. Each wagon is supported by wheels, such as wheel 623, which facilitate the motion of the wagon relative to road or rails 657. Each wagon is connected to an adjacent wagon by a connection, such as connection 626. The wagons are rotably connected to the wheels by a supporting structure.

An upstream IMSA 627 can be described as a ducted fan, comprising a duct 628 surrounding a propeller with at least a first propeller blade and a second propeller blade. Each propeller blade is rotably connected to a hub, where the rotation axis is parallel to the long axis of the blade. The pitch of each propeller blade can be adjusted to the operating conditions of the vehicle. Upstream IMSA 627 is configured to decelerate the flow and reduce the local free stream flow of the remaining vehicle. Accordingly, upstream IMSA 627 exerts a thrust force on embodiment 620 which is directed in the direction of fluid flow relative to embodiment 620, as indicated by thrust vector 631.

A downstream IMSA 652 can be described as a ducted fan. In IFMA configuration 620, first wagon 621 is identical to sixth wagon 647 in order to reduce the manufacturing cost of embodiment 620. Note that first wagon 621 is operated in a different manner as sixth wagon 647. Downstream IMSA 652 is configured to accelerate the flow. Accordingly, downstream IMSA 652 exerts a thrust force on embodiment 620 which is directed in the opposite direction of fluid flow relative to embodiment 620, as indicated by thrust vector 656.

IFMA configuration 620 can include one middle IMSA, similar to embodiment 560. In IFMA configuration 620, the middle IMSA is embodied by two wagons instead of one, i.e. the third wagon 633 and the fourth wagon 634. Both of these wagons are identical to sixth wagon 647 or first wagon 621 in order to reduce the manufacturing cost of embodiment 620. The ducted fan 634 of the third wagon 633 is feathered in this embodiment. The ducted fan 640 of the fourth wagon 634 is configured in a similar manner as middle IMSA 580 in FIG. 20. Accordingly, IMSA 640 exerts a thrust force on embodiment 620 which is directed in the direction of fluid flow relative to embodiment 620, as indicated by thrust vector 644.

The upstream IMSAs can reduce the drag of the IFMA configurations 560 or 620. The drag reduction can comprise a reduction in the viscous drag of the wagons. The drag reduction is associated with the modification of the spatial profile of the fluid flow velocity relative to, and in the vicinity of, IFMA configurations 560 or 620 by the upstream IMSAs. The modification can refer to the reduction in the average magnitude of the spatial velocity gradient of the fluid flow. The configuration of the upstream and downstream IMSAs can be optimized mathematically in a manner which minimizes the total power consumption of the IFMA configurations 560 or 620 subject to constraints, such as structural or financial limits, for example.

Figure 22:
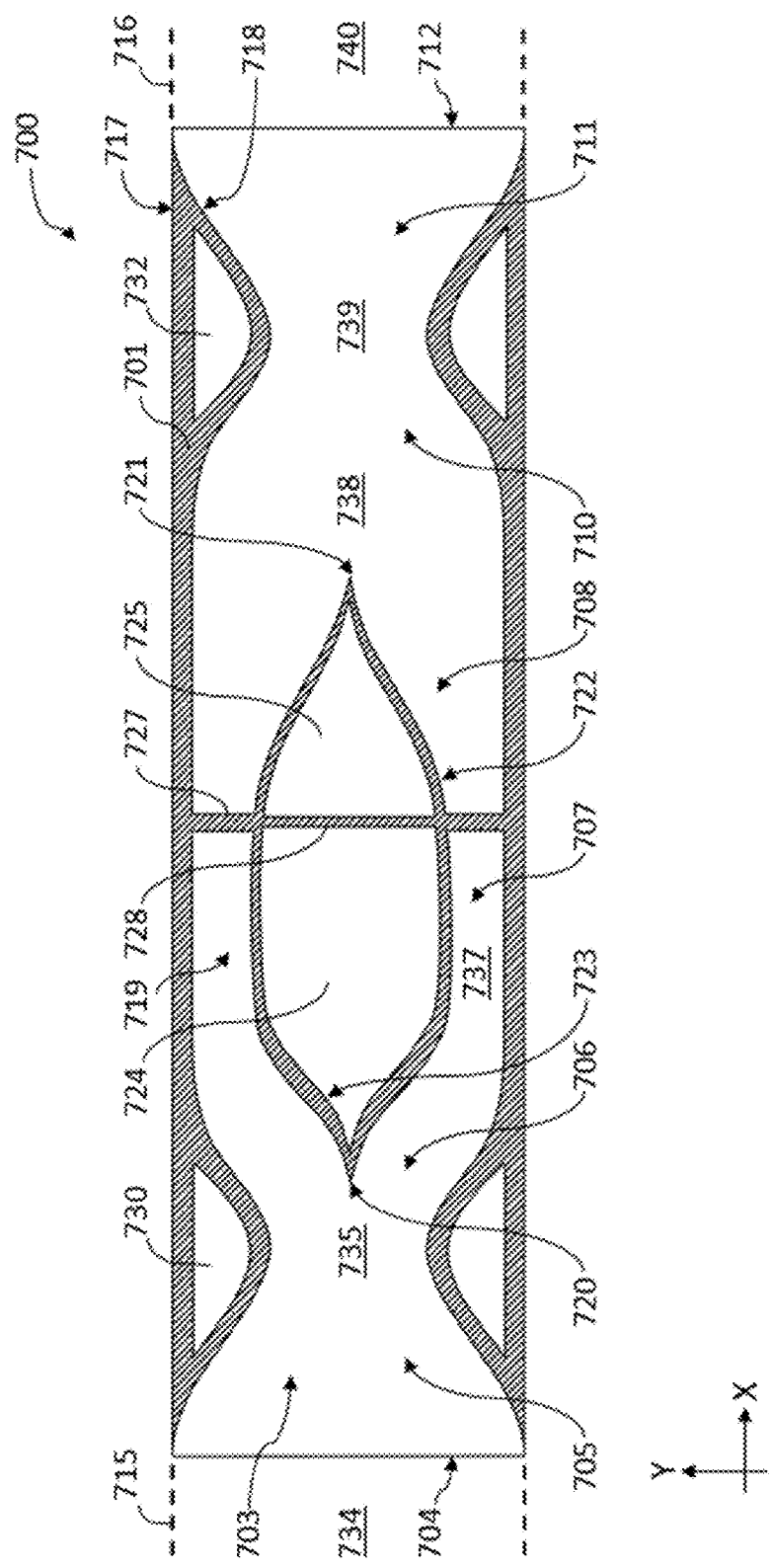
FIG. 22 is a cross-sectional view of a duct apparatus, according to some embodiments.

FIG. 22 is a cross-sectional view of a duct apparatus 700, according to some embodiments. Some features of the apparatus shown in FIG. 22, as well as some of the principles of operation of the apparatus share similarities with the apparatus shown in the other figures, and will therefore not be described in the same detail in the context of FIG. 22, and vice versa.

The duct apparatus 700 can enclose a fuselage apparatus 719. As shown, duct apparatus 700 is circular in cross-section when viewed along the X-axis and axially symmetric about an axis parallel to the X-axis. Duct apparatus 700 is an embodiment of an IMCA. Duct apparatus 700 can include an outside surface 717 and a channel 703 with an inside surface 718 located between first opening 704 and second opening 712, where the channel can be formed to include a first contraction 705, a first expansion 706, a region of substantially constant cross-sectional area 707 of channel 703 when viewed in the X-direction, a second expansion 708, a second contraction 710, and a third expansion 711. Note that the terms "contraction" and "expansion" refer to the relative magnitude of the radius of the axially symmetric channel.

The duct apparatus 700 can include a first compartment 730 and a second compartment 732. These compartments can be used for a number of purposes. In some embodiments, they can be used to hold landing gear, fuel, cargo, or components of other lifting or thrusting mechanisms.

Note that the channel radius or geometry can change in a different manner as a function of position along the X-axis, or be configured differently, for other embodiments, or other operating conditions. In some embodiments, there need not be a third expansion 711, i.e. the second opening can be located at the end of second contraction 710. In some embodiments the cross-sectional geometry of channel 703 or outside surface 717 can be square, rectangular, or elliptical. In some embodiments, the cross-sectional geometry of channel 703 can change from square to circular in the positive X-direction, for example.

For some embodiments, the cross-sectional area of the circular or annular channel 703 can vary with time. For example, the radius of the channel at station 739 can be modified for different operating conditions. The radius can be increased or decreased depending on the free stream flow velocity magnitude. In this manner, the properties of the flow through duct 703 can be modified and controlled such that the principles of the invention can be applied at different free stream flow conditions. For example, the existence, or the location, of a shock wave within the first expansion 706 or second expansion 708 can be regulated by controlling the cross-sectional area of the channel 703 at station 739. A wide variety of methods for changing the cross-sectional area of a channel as a function of time are available. For example, a ramp connected to the duct apparatus 700 can be hydraulically extended into the channel, thus reducing the cross-sectional area of the channel. In another example, a spike located within channel 703 can be moved along the length of the channel, i.e. axially along the X-direction, towards or away from a contraction of the channel, thus decreasing or increasing the annular cross-sectional area of the channel, respectively.

Duct apparatus 700 can be constructed from a bulk material 70, which can include a metal alloy such as aluminum, steel, or titanium. In some embodiments, bulk material 701 comprises composites, such as carbon fiber or fiberglass.

In some embodiments, fuselage apparatus 719 includes a leading point 720, a trailing point 721, an inside surface 723, and an outside surface 722. In some embodiments, first fuselage compartment 724 separated from a second fuselage compartment 725 by a bulkhead 728. The fuselage apparatus 719 can be rigidly connected to the duct apparatus 700 by one or more support struts, such as support strut 727. The support struts can reduce the cross-sectional area of channel 703 at the location of the support struts by only a small amount in some embodiments. In some embodiments, the fuselage can be configured to carry cargo, passengers, or fuel, for example.

Embodiments of the invention are at least partially enveloped by a fluid, as defined earlier. Note that different types of fluids can envelop at least a portion of an embodiment of the invention at the same time. For example, water traversing embodiments such as a ship, can be enveloped by both water and air, i.e. a liquid fluid and a gaseous fluid. In FIG. 22, the fluid is compressible. For example, the fluid can be a gas such as air.

An operating condition depicted in FIG. 22 can include a nominal, level cruise operating condition. In the depicted, simplified scenario, the free stream flow relative to the center of mass of duct apparatus 700 is constant in time and spatially uniform in magnitude and direction, where the direction is parallel to the X-axis. In the depicted operating condition, the free stream flow velocity magnitude relative to the duct apparatus 700 is larger than the speed of sound in the fluid. Since the wind velocity is assumed to be negligible in this scenario, this is equivalent to duct apparatus 700 moving relative to the fluid at a speed faster than the speed of sound in the fluid in an inertial reference frame. In FIG. 22, the free stream flow velocity relative to duct apparatus 700 is aligned with and parallel to the X-axis, i.e. from the left of the page to the right of the page.

Dashed lines 715 and 716 indicate stagnation streamlines which are incident on the leading edge or originate at the trailing edge of duct apparatus 700. Streamlines 715 and 716 are therefore part of a streamsurface, or streamtube, which separate fluid flowing around duct apparatus 700 from fluid flowing through channel 703 of duct apparatus 700. In this embodiment, the steamtube is circular when viewed along the X-direction.

The fluid upstream of duct apparatus 700, such as at station 734, is moving faster relative to duct apparatus 700 than the speed of sound in the fluid in the configuration shown in FIG. 22. The first contraction 705, the first expansion 706 and the second expansion 708 of channel 703 are configured to compress the fluid flowing through channel 703 in the positive X-direction. The first throat is defined to be the portion of channel 703 with the smallest cross-sectional area of channel 703 between first contraction 705 and first expansion 706 when viewed along the X-direction. The average speed of the fluid relative to duct apparatus 700 at the first throat, i.e. station 735, is approximately equal to the speed of sound within fluid at that location. Upstream, such as at station 734, the average relative speed is larger than the speed of sound, and further downstream, such as at station 737 or 738, the average relative speed is smaller than the speed of sound within the fluid in this embodiment. In the depicted embodiment, the flow through channel 703 is substantially adiabatic and isentropic when neglecting friction. In other embodiments, there can be a shock wave located between the first throat and station 738. In other words, the relative flow speed of the fluid downstream of the first throat can be faster than the speed of sound within the fluid, where the relative flow speed is reduced to a speed slower than the speed of sound throughout the shock wave, resulting in a relative flow speed at station 738 which is slower than the speed of sound, as in the ideal scenario in which there is an infinitely weak shock at the first throat.

Both the second contraction 710 and the third expansion 711 of channel 703 are configured to expand the fluid flowing through channel 703 in the positive X-direction. The second throat is defined to be the portion of channel 703 with the smallest cross-sectional area of channel 703 between second contraction 710 and third expansion 711 when viewed along the X-direction. The average speed of the fluid relative to duct apparatus 700 at the second throat, i.e. station 739, is approximately equal to the speed of sound within fluid at that location. Upstream, such as at station 738, the average relative speed is smaller than the speed of sound, and downstream, such as at station 740, the average relative speed is larger than the speed of sound within the fluid in this embodiment.

Note that in other embodiments, a fuselage, such as fuselage apparatus 719, can be incorporated into the duct apparatus. For example, such embodiments need not feature a centrally located fuselage, such as fuselage apparatus 719, but can be located in annularly shaped volumes. For example, the first compartment 730 or the second compartment 732 can be considered to be, and configured as, a fuselage. In another example, the axially symmetric fuselage apparatus 719 need not be arranged concentrically with the axially symmetric duct apparatus 700. In other words, the central axis of fuselage apparatus 719 need not be coincident with the central axis of duct apparatus 700. For instance, the fuselage apparatus can be arranged flush with inside surface 718 of duct apparatus 700, similar to first compartment 730, instead of being located centrally within channel 703 as shown in FIG. 22. In this case, the fuselage outside surface 722 is identical to the inside surface 718 of channel 703, and channel 703 only passes through the center of the fuselage. This can reduce the wetted area and the viscous drag compared to configurations similar to the embodiment shown in FIG. 22. For some embodiments, the first compartment 730 can be considered to be joined to the second compartment 732 by an annular fuselage segment embedded within duct apparatus 700 in a similar manner as first compartment 730. In some embodiments, the first compartment 730 and the second compartment 732 can be considered to be coincident. Note that the angle subtended by the cross-section of the fuselage relative to the central axis of duct apparatus 700 when viewed along the X-direction need not be 360 degrees as in the circumferential case exemplified by annular fist compartment 730, but can be 200 degrees, or 100 degrees, or 60 degrees, for example. In other embodiments, the fuselage apparatus 719 can be elliptical or rectangular in cross-section when viewed along the X-direction.

A disturbance moving through a fluid at a speed greater than the wave speed in the fluid will typically induce wave drag. The wave drag is a measure of the energy of the waves produced by the disturbance. There are several ways to quantify the wave drag. For example, the wave drag can be calculated from the wave power produced by a specified disturbance divided by the average free stream flow velocity magnitude.

A disturbance can be caused by a volume which is configured to displace fluid. The volume can be the hull of a ship, which produces gravity waves, or the fuselage or wing of a supersonic aircraft, which produces shock waves. A disturbance can also be caused by a device configured to modify fluid flow properties at a specified location, where the modification can comprise a change in the flow direction, or a change in the flow velocity magnitude in an inertial space, or a change in the temperature of the fluid, for example. Such a device can be an electric or magnetic field generating apparatus, or a laser, for instance. Discontinuities in a surface can also cause a disturbance to adjacent flow field. The disturbance can displace fluid flow, which in turn can give rise to shock waves in air, or surface gravity waves in water.

In accordance with some embodiments of the invention, a duct apparatus can be employed to manipulate the fluid flow in the vicinity of the disturbance in a manner in which the wave drag associated with the disturbance is reduced.

For example, for embodiments traveling through an incompressible fluid such as water, the drag due to surface waves can be reduced by a duct apparatus configured as follows. After entering the duct apparatus through an inlet, the fluid is accelerated by a first contraction, where the first contraction can be configured in a similar manner as first contraction 705 in some embodiments, and the inlet can be configured in a similar manner as first opening 704. Note that the acceleration of the fluid in the first contraction in this case is in contrast to the deceleration of the fluid in the embodiment shown in FIG. 22. After having been accelerated in a first contraction, the fluid flows through a section of substantially constant cross-sectional area in some embodiments. For example, the fluid can flow through a pipe or a channel with a circular cross-sectional area. In other embodiments the pipe has an annular cross-sectional area, such as the annular portion of channel 703 at station 737 in FIG. 22. With a reduced wetted area for a given cross-sectional area, a circular cross-section can be favorable to an annular cross-section. In some embodiments, said pipe is substantially straight. In some embodiments, this pipe comprises curves or bends. For instance, the pipe can guide the fluid flow around a cargo-hold of a container ship. Following the section with a substantially constant cross-sectional area, the fluid flow subsequently enters a first expansion, where the fluid is decelerated before exiting through an outlet or second opening. In some embodiments, the velocity of the fluid exiting the outlet is substantially equal to the free stream flow velocity. In some embodiments, the exit velocity can be larger or smaller than the free stream flow velocity. In the case in which the duct apparatus is employed on ships, the leading edge of the duct apparatus forms the bow of the ship, and the outside surface of the duct apparatus, such as outside surface 717 of duct apparatus 700, forms the outside hull of the ship, and the trailing edge of the duct apparatus forms the stern of the ship. The volume within the outside surface of the duct apparatus which is not occupied by the fluid flowing through the channel (comprising the first contraction, the pipe of substantially constant streamwise cross-sectional area, and the first expansion) can be considered to be the useful volume of the ship, which can comprise the cargo or the passenger compartments, for example. The duct apparatus can have a circular cross-section when viewed in the streamwise direction. In other embodiments, the duct apparatus can have a semi-circular cross-section, similar to the hull of a conventional ship. To reduce the wave drag associated with gravity waves in water, only the portion of a ship which is in contact with water can be encompassed by, embedded within, or configured as said duct apparatus.

During nominal operations, the duct apparatus can be configured to reduce the wave drag associated with moving a useful volume or other disturbance through a fluid. The fluid with which the duct apparatus interacts can be distinguished in terms of the fluid which flows through the interior channel of the duct apparatus, denoted the "interior flow", and the fluid which doesn't flow through the interior channel and instead flows around the duct apparatus, on the side of the outside surface of the duct apparatus, denoted the "exterior flow". The duct apparatus is configured to reduce the disturbance imparted on the exterior flow. In this embodiment this is accomplished by an outside surface which is parallel to the free stream flow. The outside surface of duct apparatus 700 is cylindrical in shape and parallel to the free stream flow, for example. The disturbance imparted by the outside surface is thus reduced. In some embodiments, the circular streamwise cross-section of the outside surface of a duct apparatus can decrease in diameter in a downstream direction, for example. This can reduce the disturbance of the boundary layer on the portion of the exterior flow which lies outside the boundary layer of the outside surface. In some embodiments, when ignoring friction, the wave drag associated with the outside surface of the duct apparatus is negligible.

The duct apparatus can also be configured to reduce the wave drag associated with the interior flow. In some embodiments, during nominal operations, the cross-sectional area and shape of the steamtube associated with the interior flow upstream of the inlet is substantially equal to the cross-sectional area and shape of the inlet. In other embodiments, the cross-sectional area of the former can be larger or smaller of the cross-sectional area of the latter. In other embodiments, the shape of the cross-sectional area of the former can be larger than the cross-sectional area of the latter, for example. Since the objective can be to minimize the total drag as opposed to just the wave drag, some embodiments can have a reduced, but non-zero wave drag compared to embodiments in the prior art. In some embodiments, during nominal operations, the cross-sectional area and shape of the steamtube associated with the interior flow downstream of the outlet is substantially equal to the cross-sectional area and shape of the outlet. In other embodiments, the cross-sectional area of the former can be larger than the cross-sectional area of the latter, for example. In other embodiments, the shape of the cross-sectional area of the former can be larger or smaller than the cross-sectional area of the latter. In some embodiments, the disturbances imparted on the interior flow impart a negligible disturbance or a negligible wave drag on the exterior flow. In some embodiments, the wave drag imparted by disturbances on the interior flow to the exterior flow is reduced compared to embodiments in the prior art. Generally speaking, the magnitude of disturbance imparted to a fluid due to an initial deflection around a finite volume, such as the disturbance applied within a first contraction, can be reduced by containing the disturbance within the interior of a duct apparatus until it can be cancelled or mitigated by a second disturbance, such as the disturbance applied by a first expansion prior to the second opening of the duct apparatus.

In some embodiments, a propulsion unit is located within the channel of the duct apparatus, where the propulsion unit can comprise at least one propeller configured to accelerate the fluid, similar to maritime pump jet propulsion. For instance, a propeller can be located in the first contraction section, where the thrust of the propeller is directed in the upstream direction. In some embodiments, the propeller can be employed to reduce or avoid a localized pressure increase near the interior walls of the first contraction and ensure a uniform flow within the first contraction. The first contraction is configured to accelerate the fluid within the first contraction in a manner in which the wave drag of the duct apparatus is reduced compared to other configurations. To that end, the variance of the fluid flow velocity magnitude for a given cross-sectional area of the first contraction when viewed in a direction parallel to the free stream, i.e. in a streamwise direction, can be reduced. This can be accomplished by a propulsion unit, or annular foils located within the first contraction, for example. Such fluid flow manipulation apparatuses can ensure that the reduction in the cross-sectional area of the first contraction is accompanied by a corresponding increase in the fluid flow velocity magnitude in the first contraction, and a corresponding reduction in pressure of the fluid in the first contraction. The first expansion can be configured in a similar manner.

In some embodiments, a propeller can be located in the first expansion section, where the thrust of the propeller is directed in the downstream direction, and where at least a portion of the energy extracted from the fluid is recovered mechanically or electrically and stored for later use or used to do useful work, such as powering an upstream propeller in the first contraction. A propeller in the expansion section can be used to regulate the flow rate of fluid through the channel. Such a propeller can also be used to avoid or reduce flow separation in the first expansion section, which can reduce the streamwise length of the expansion section. In other embodiments, annular foils or ducts can be placed within the expansion section to avoid or reduce drag due to flow separation. In some embodiments, the propulsion unit can be placed between the first expansion and the first contraction. Such a propulsion unit can be employed to at least offset the reduction in the fluid flow velocity through the duct apparatus due to friction, for instance.

In another example, for disturbances traveling through a compressible fluid at a speed greater than the wave speed in the fluid, the wave drag associated with a disturbance can be reduced by a duct apparatus configured as shown in FIG. 22. The waves in question can be sound waves or shock waves, for instance, although the principles of the invention can be applied to other types of waves. In such embodiments, the duct apparatus can be configured to artificially reduce the fluid flow velocity in the vicinity of the disturbance. In FIG. 22, the disturbance in question can be considered to be fuselage 719, although the duct apparatus per se also imparts a disturbance to the fluid flow. In the case of the duct apparatus, at least a portion of the disturbances, such as the disturbances associated with deflecting or decelerating or accelerating the fluid, are configured to cancel each other or to be cancelled in the vicinity of the duct apparatus. In this particular embodiments, a portion of the disturbances associated with the fuselage apparatus 719, such as the disturbances associated with deflecting or decelerating or accelerating the fluid, are also configured to cancel each other or be cancelled in the vicinity of the duct apparatus. In other embodiments, at least one type of disturbance imparted to the fluid by the fuselage apparatus need not be cancelled, but can manifest itself in the far wake, downstream of the duct apparatus and the fuselage apparatus, as will be discussed in the context of the embodiment shown in FIG. 23.

In FIG. 22, the flow located outside of streamtube 715 does not experience any disturbances when viscous drag is assumed to be zero. This is due to the cylindrical outside surface 717 which is parallel to the free stream flow. Thus the flow in the vicinity of the outside surface 717 is deflected by only a minimal amount. The deflection can be due to the boundary layer associated with outside surface 717, for example. In other embodiments, the exterior flow can experience localized disturbances. The outside surface of the duct apparatus need not be parallel to the free stream flow velocity. For instance, the streamwise cross-sectional area of the outside surface can increase or decrease in a downstream direction. For example, the exterior flow can be deflected by a small amount in a radially outward direction. In some embodiments, the deflection can be in a radially inward direction. The duct apparatus can be configured in a manner in which the total drag associated with the motion of the embodiment relative to the fluid is minimized. In addition to an outside surface of duct apparatus being configured to reduce the disturbance imparted on the exterior flow by said surface, the size and shape of the upstream streamtube 715 and downstream streamtube 716 of the duct apparatus is configured to not change in this idealized frictionless scenario. In other words, any disturbances caused by the duct apparatus are not communicated to the exterior flow in the form of a change in the shape or size of the streamtube, resulting in a negligible wave drag associated with the duct apparatus in the exterior flow. The uniform, cylindrical shape of the streamtube 715 upstream of the duct apparatus is a consequence of the duct apparatus traveling faster than the wave speed in the fluid and the geometry of the duct apparatus, which is configured to prevent a bow shock from forming during nominal operations.

As discussed in the previous example, at least a portion of the disturbances imparted on the interior flow at the entrance of duct apparatus 700, i.e. the compression of the fluid in the first contraction 705 and the first expansion 706, are configured to be contained within the duct apparatus 700, such as the region of substantially constant cross-sectional area 707 or the second expansion 708, until they are cancelled at the exit, i.e. the expansion of the fluid in second contraction 710 and the third expansion 711. The compression inside the first contraction 705 is configured to be isentropic and adiabatic when assuming inviscid flow for simplicity. This can be accomplished by a gradual compression of the fluid flowing through first contraction 705. The individual compression characteristics produced by elements of the interior surface 718 within first contraction 705 merge with the corresponding characteristics of circumferentially adjacent elements before the compression characteristics produced by streamwise downstream adjacent elements can merge and coalesce with, or catch up to, upstream characteristics to form a shock wave. In such embodiments, the first contraction 705 can be considered to comprise a fan of infinitesimally weak compressive shock waves. In other embodiments, shock waves of finite size can be formed within the first contraction 705. This can be a consequence of a more practical finite leading edge angle of first inside surface 718 at first opening 704, for example. The expansion through second contraction 710 and third expansion 711 can also be assumed to be isentropic and adiabatic when ignoring wall friction and heat transfer effects. The fluid velocity at second opening 712 and first opening 704 is spatially uniform in magnitude and direction, and equal to the free stream flow velocity vector in the simplified, ideal scenario depicted in FIG. 22.

Due to the reduction of the fluid flow velocity to subsonic speeds prior to the fluid encountering the fuselage apparatus 719, there are no shock waves produced by the fuselage apparatus 719 within duct apparatus 700 in the simplified, depicted embodiment. In other embodiments, shock waves can form within channel 703. These can be due to localized transonic flow, for example. For example, the fluid flow around an IMSA, such as IMSA 817 in FIG. 23, can reach supersonic velocities locally. IMSA 817 can be a transonic airfoil, for example. In another example, shock waves can also be located within the first expansion 706, as mentioned. This can avoid an unstarting of the flow through the channel 703 due to free stream flow variations, resulting in a bow shock. Such variations can be caused by wind in the atmosphere, for instance. In another example, the flow velocity within a channel can be supersonic throughout the channel, or in the vicinity of a disturbance generating apparatus. In such embodiments, shock waves will form within the channel. At least a portion of these shock waves can be configured to cancel, similar to the shock waves in Busemann's biplane. In configurations in which these shock waves do not cancel, the wave drag associated with disturbance generating apparatuses within the channel of a duct apparatus, or in the vicinity of a fluid manipulation apparatus configured in accordance with the invention, the combined wave drag associated with the disturbance generating apparatuses and the fluid manipulation apparatus can nevertheless be lower than the wave drag associated with an equivalent disturbance generating apparatus for which the fluid flow is not modified by a fluid manipulation apparatus configured in accordance with the invention. The reduction in the local free stream flow of said disturbance generating apparatus relative to the free stream flow by a fluid manipulation apparatus can reduce the wave drag of the disturbance generating apparatus, even when the local free stream flow is still supersonic.

Figure 23:
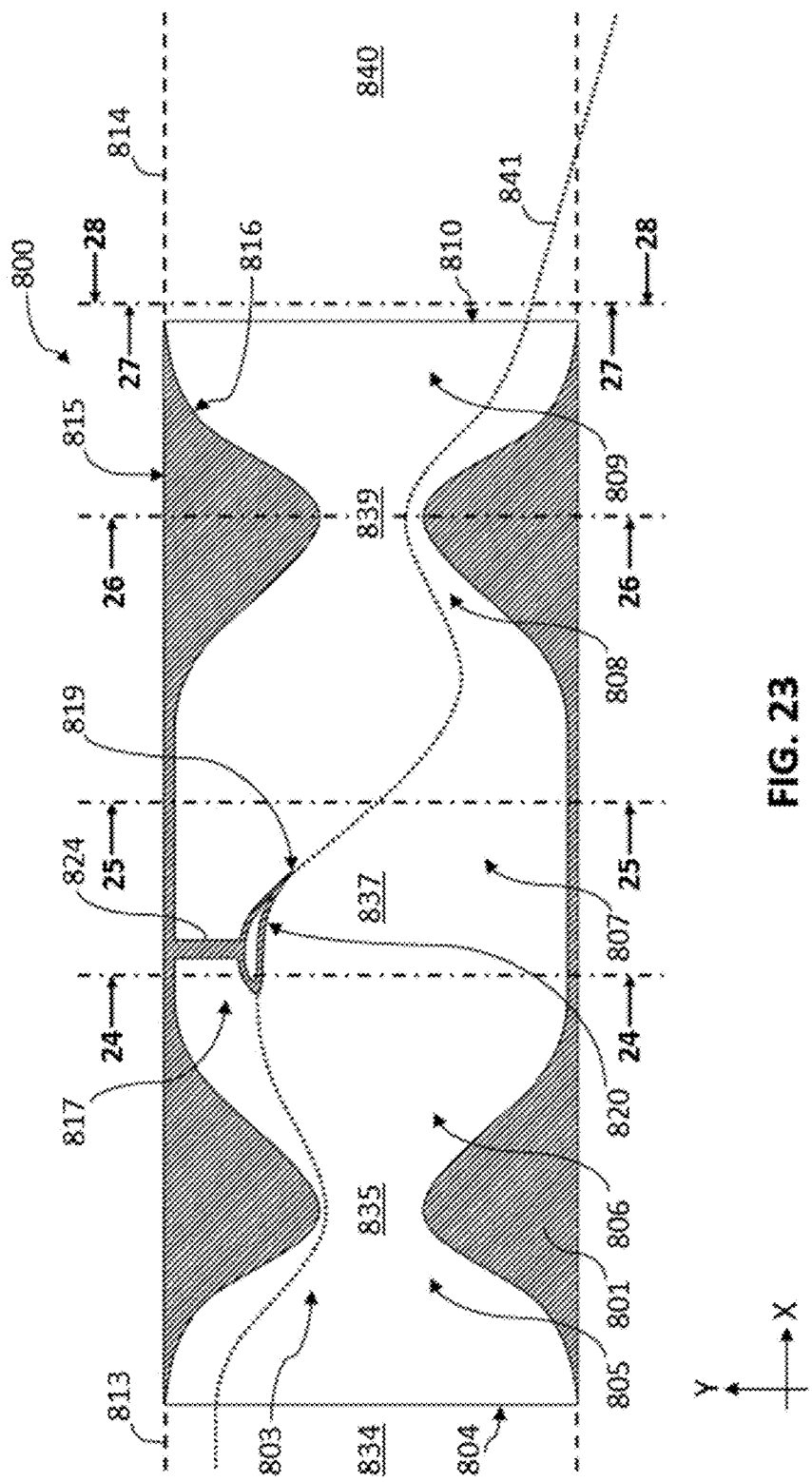
FIG. 23 is a cross-sectional view a duct apparatus, according to some embodiments.

Note that a body such as fuselage 719 traveling at supersonic speeds through a fluid such as air will produce shock waves. Due to the manipulation of the fluid flow by duct apparatus 700, however, the wave drag associated with fuselage 719 can be reduced. The combined wave drag of duct apparatus 700 and fuselage apparatus 719 can be lower than the theoretical wave drag of the fuselage 719 alone, i.e. in the "reference scenario" without being encompassed or embedded within a fluid manipulation apparatus, such as duct apparatus 700, configured in accordance with the invention. In other embodiments, a different type of disturbance generating apparatus can be positioned at the location of, i.e. in place of, fuselage apparatus 719, as shown in FIG. 23. In some embodiments, the total drag of said combined apparatus can be lower than the theoretical total drag of the disturbance generating apparatus, or a suitable equivalent, traveling through the fluid alone, i.e. in the reference scenario. The reduction in wave drag can be larger in magnitude than any increase in viscous drag associated with the additional duct apparatus, for instance. In other embodiments, the total drag can be larger than the total drag in the reference scenario. This can be due to the increased viscous drag associated with added or increased wetted area of the duct apparatus combined with the fuselage apparatus, for instance. In some such embodiments, the benefit derived from the reduction in the noise associated with the waves produced by the disturbance generating apparatus can nevertheless offset any cost increase associated with an increase in the total drag. Note that the reduction in the fluid flow velocity within channel 703 can also help reduce the viscous drag of duct apparatus 700.

The purpose of the duct apparatus 700 can be considered to be in part the deceleration and increase in pressure of the compressible fluid in the vicinity of an arbitrary disturbance generating apparatus, which, in this case, is fuselage apparatus 719, in order to reduce the wave drag associated with the disturbance generating apparatus. The disturbance generating apparatus can also comprise a propeller, a fan of a turbofan engine, a wing, or horizontal or vertical control surfaces, or types of IMCA, or types of IMSA, for example.

In FIG. 22 the fuselage apparatus 719 is shown as a structure which is connected to, but easily distinguishable from, duct apparatus 700. In other embodiments, the fuselage can be embedded within the duct apparatus 700 in a manner in which the fuselage is contained within the interior surface 718 and the outside surface 717 of the duct apparatus 700. In some such embodiments, the fuselage is configured in an annular, cylindrical fashion, similar to first compartment 730 or second compartment 732. In other words, channel 703 can be configured to pass through the center of the fuselage, with the outside surface of the fuselage being identical to the outside surface 717 of duct apparatus 700. In other embodiments, the fuselage need not fully enclose channel 703, and channel 703 need not fully enclose the fuselage, as shown in FIG. 22. For example, the channel can have a circular streamwise cross-section, a portion of which is bounded by the fuselage portion of the duct apparatus, and another portion of which is bounded by the outside wall of the duct apparatus. Instead of being annular in cross-section, the fuselage can be semi-circular or semi-annular in streamwise cross-section. The circumferential extent of the fuselage, or the angle subtended by the fuselage about the central axis of the cylindrical duct apparatus need not be 360 degrees as in the annular or circular case, but can be 300 degrees, 200 degrees, 100 degrees, or 60 degrees, for example. In other words, the fuselage can be configured to be a continuous volume, i.e. a volume which does not fully enclose the channel 703, and the channel can be a circular or semi-circular shape. Note that a channel with a closed shape, such as a closed circular cross-sectional shape, can serve to reduce the wetted area of the duct apparatus compared to an annular channel, such as the annular channel shown in FIG. 22.

Figure 24:
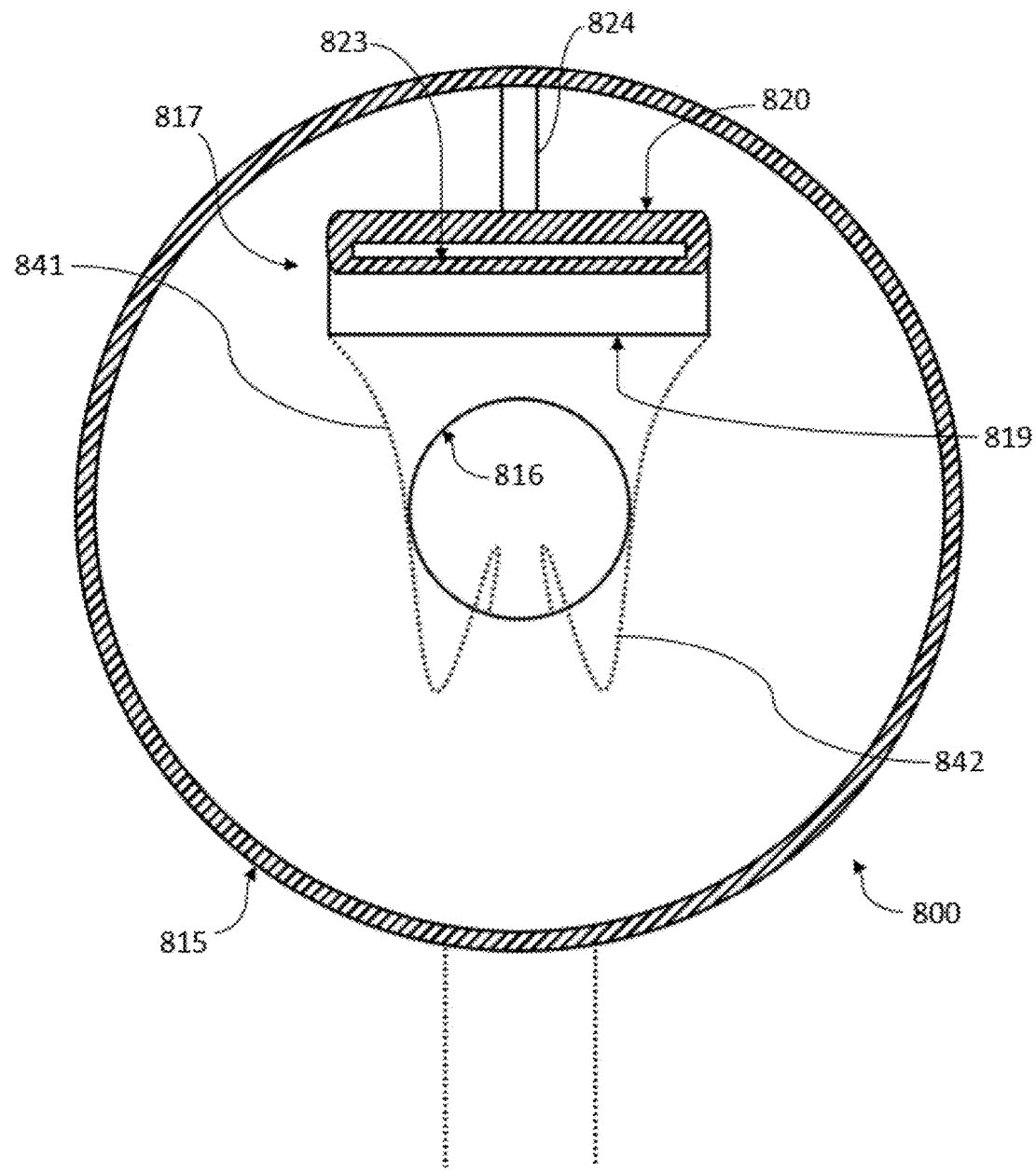
FIGS. 24-28 are cross-sectional views of the duct apparatus of FIG. 23.

FIG. 24 is a cross-sectional view of another embodiment of the invention. Some features of the embodiment shown in FIG. 24 as well as some of the principles of operation of the embodiment share similarities with features and principles of operation described by the other figures, and will therefore not be described in the same detail in the context of FIG. 24, and vice versa.

Note that the apparatus contained within inside surface 816 and outside surface 815 does not have to be a solid material, but can contain open spaces in order to not unnecessarily increase the mass or cost of duct apparatus 800. For example, the duct apparatus 800 can comprise compartments similar to first compartment 730 or second compartment 732 shown in FIG. 22.

Duct apparatus 800 encloses an IMSA 817. In the embodiment shown, duct apparatus 800 is circular in cross-section when viewed along the X-axis and axially symmetric about an axis parallel to the X-axis. Duct apparatus 800 can be considered to be an IMCA. Duct apparatus 800 includes an outside surface 815 and a channel 803 with an inside surface 816 located between first opening 804 and second opening 810, where the channel can include a first contraction 805, a first expansion 806, a region of substantially constant cross-sectional area 807 of channel 803 when viewed in the X-direction, a second contraction 808, and a second expansion 809. Note that the terms "contraction" and "expansion" refer to the magnitude of the radius of the axially symmetric channel.

In some embodiments, the cross-sectional area of channel 803 is elliptical or rectangular in shape. In some such embodiments, the long axis of the shape is parallel to the Z-axis during nominal operations. Such a duct apparatus can be configured to harbor or enclose, and manipulate the local free stream flow for, a wing with a long axis which is also parallel to the Z-axis.

Duct apparatus 800 can be constructed from bulk material 801, which can include a metal alloy such as aluminum, steel, or titanium. In some embodiments, bulk material 801 comprises composites, such as carbon fiber or fiberglass.

IMSA 817 can be formed in the shape of a wing. The cross-sectional view in FIG. 24 shows the airfoil profile of IMSA 817 with trailing edge 819 and outside surface 820. IMSA 817 can be rigidly connected to the duct apparatus by support strut 824. The stagnation streamline of IMSA 817, i.e. the streamline incident on the leading edge stagnation point of the right wingtip of IMSA 817 and the streamline originating at the trailing edge stagnation point of the right wingtip of IMSA 817, is indicated by dotted line 841. The lift vector of IMSA 817 has a substantial component parallel to the Y-axis. Note that the shape and size of wing 817 is shown in an exaggerated from for clarity, and is not a scale representation or a practical wing.

Embodiments of the invention are at least partially enveloped by a fluid, as defined earlier. In FIG. 23, the fluid is compressible. For example, the fluid can be a gas such as air.

An operating condition depicted in FIG. 23 can include as nominal, level cruise operating condition. In the depicted, simplified scenario, the free stream flow relative to the center of mass of duct apparatus 800 is constant in time and spatially uniform in magnitude and direction, where the direction is parallel to the X-axis. In the depicted operating condition, the free stream flow velocity magnitude relative to the duct apparatus 800 is larger than the speed of sound in the fluid. Since the wind velocity is assumed to be negligible in this scenario, this is equivalent to duct apparatus 800 moving relative to the fluid at a speed faster than the speed of sound in the fluid which is at rest in an inertial reference frame. In FIG. 23, the free stream flow velocity relative to duct apparatus 800 is aligned with and parallel to the X-axis, i.e. from the left of the page to the right of the page.

Dashed lines 813 and 814 indicate stagnation streamlines which are incident on the leading edge or originate at the trailing edge of duct apparatus 800. Streamlines 813 and 814 are therefore part of a streamsurface, or streamtube, which separate fluid flowing around duct apparatus 800 from fluid flowing through channel 803 of duct apparatus 800. In this embodiment, the steamtube is circular when viewed along the X-direction.

The fluid upstream of duct apparatus 800, such as at station 834, is moving faster relative to duct apparatus 800 than the speed of sound in the fluid in the configuration shown in FIG. 23. The first contraction 805, and the first expansion 806 of channel 803 are configured to compress the fluid flowing through channel 803 in the positive X-direction. The first throat is defined to be the portion of channel 803 with the smallest cross-sectional area of channel 803 between first contraction 805 and first expansion 806 when viewed along the X-direction. The average speed of the fluid relative to duct apparatus 800 at the first throat, i.e. station 835, is approximately equal to the speed of sound within fluid at that location. Upstream, such as at station 834, the average relative speed is larger than the speed of sound, and further downstream, such as at station 837, the average relative speed is smaller than the speed of sound within the fluid in this embodiment. In the depicted embodiment, the flow through channel 803 is substantially adiabatic and isentropic when neglecting friction. In other embodiments, there can be a shock wave located between the first throat and station 837. In other words, the relative flow speed of the fluid downstream of the first throat can be faster than the speed of sound within the fluid, where the relative flow speed is reduced to a speed slower than the speed of sound throughout the shock wave, resulting in a relative flow speed at station 837 which is slower than the speed of sound, as in the ideal scenario in which there is an infinitely weak shock at the first throat.

Both the second contraction 808 and the second expansion 809 of channel 803 are configured to expand the fluid flowing through channel 803 in the positive X-direction. The second throat is defined to be the portion of channel 803 with the smallest cross-sectional area of channel 803 between second contraction 808 and second expansion 809 when viewed along the X-direction. The average speed of the fluid relative to duct apparatus 800 at the second throat, i.e. station 839, is approximately equal to the speed of sound within fluid at that location. Upstream, such as at station 837, the average relative speed is smaller than the speed of sound, and downstream, such as at station 840, the average relative speed is larger than the speed of sound within the fluid in this embodiment.

Duct apparatus 800 is configured to decelerate the fluid flow in the vicinity of a disturbance generating apparatus, which in this case can be considered to be the IMSA 817, such that the local free stream flow of IMSA 817 is smaller than the free stream flow velocity magnitude. As a result of the duct apparatus, the wave drag associated with IMSA 817 is reduced compared to the reference scenario in which the local free stream flow of IMSA 817, or an equivalent IMSA or lifting apparatus, is substantially equal to the free stream flow. Note that the local free stream flow can still be faster than the wave speed within said fluid. In such embodiments, the resulting wave drag is greater than zero, but reduced by a small amount. In the depicted embodiment, the reduction in the local free stream flow compared to the free stream flow is sufficiently large, that the magnitude of the local free stream flow of IMSA 817 by virtue of the fluid manipulation of an appropriately configured duct apparatus is lower than the speed of sound of the fluid at IMSA 817. In such embodiments, the resulting wave drag can be reduced substantially. In the reference scenario IMSA 817, or an equivalent IMSA, is traveling faster than the speed of sound relative to a surrounding fluid during nominal operations, since the local free stream flow is larger than the speed of sound at the location of IMSA 817. Therefore, IMSA 817 or an equivalent IMSA would be associated with a wave drag in the reference scenario. An equivalent IMSA in a reference scenario can be configured to produce the same amount of lift as IMSA 817 with the same planform area and/or geometry, for example. It is this wave drag associated with a disturbance generating apparatus which can be reduced by a fluid manipulation apparatus configured in accordance with the invention.

Note that the principles of the invention can also be applied to reduce the wave drag associated with transonic flow. In other words, the free stream flow velocity magnitude can be smaller than the speed of sound in the free stream, and a fluid manipulation apparatus can be configured in accordance with the invention to reduce the local free stream flow velocity of an IMSA, IMCA, or other disturbance generating apparatus to a magnitude which is smaller than the free stream flow velocity magnitude, such that the combined wave drag associated with the disturbance generating apparatus and the fluid manipulation apparatus can be lower than the wave drag associated with an equivalent disturbance generating apparatus of the prior art. The latter wave drag can be the wave drag associated with an equivalent disturbance generating apparatus in the reference scenario in which the local free stream flow velocity magnitude is substantially equal to the free stream flow velocity magnitude, for example.

As mentioned, for the embodiment shown in FIG. 22, the reference scenario can be that of fuselage apparatus 719 alone traveling at the same free stream velocity as duct apparatus 700. For the embodiment shown in FIG. 23, the reference scenario can be that of IMSA 817 alone traveling at the same free stream velocity as duct apparatus 800. Another reference scenario for duct apparatus 800 can be that of a theoretical supersonic aircraft traveling at the same free stream velocity as duct apparatus 800, where the weight of the aircraft is equal to the lift of IMSA 817, and the geometry of the aircraft, such as the length of the aircraft or the volume of the fuselage, shares common features with the geometry of duct apparatus 800, such as the length or the volume of the internal compartments.

Duct apparatus 800 is configured to reduce the local free stream flow in the vicinity of a disturbance generating apparatus, such as IMSA 817, in a manner in which the wave drag associated with duct apparatus 800 is reduced compared to fluid manipulation apparatuses in the prior at. This can be accomplished by configuring the fluid manipulation apparatus in a manner in which only a negligible or small disturbance is imparted on the exterior flow, outside of duct apparatus 800, as mentioned, as well as a gradual compression and deceleration of the interior flow entering duct apparatus 800, a containment of the pressure increase by outside walls of the duct apparatus, and a gradual expansion and acceleration of the interior flow exiting duct apparatus 800. Note that the containment of the pressure increase associate with the deceleration of the interior flow serves to prevent or mitigate the disturbance imparted by the duct apparatus on the interior flow from being communicated or transferred to the exterior flow. The disturbances imparted on the interior flow during the compression are configured to be at least partially cancelled during the expansion or prior to exiting the channel.

Note that, in general, embodiments of the invention need not comprise a duct apparatus. Other embodiments can comprise a fluid manipulation apparatus configured to perform at least a portion of the aforementioned function of the duct apparatus 800. Embodiments of the invention comprise a fluid manipulation apparatus configured to reduce the local free stream flow of a specified disturbance generating apparatus, where the resulting local free stream flow can be larger or smaller than the speed of sound, and where the disturbance generating apparatus can be an IMSA, or IMCA, such as a wing, propeller, control surface, or fuselage. The fluid manipulation apparatus is furthermore configured to artificially contain the pressure increase in the vicinity of the disturbance generating apparatus. This can reduce the wave drag of the disturbance generating apparatus as well as mitigate the wave drag associated with the fluid manipulation apparatus.

For example, a fluid manipulation apparatus can be configured to impart a body force per unit mass on the fluid in the vicinity of the specified disturbance generating apparatus. The magnitude and the direction of this body force per unit mass can be configured to decelerate the fluid upstream of the disturbance generating apparatus, to contain or confine the resulting pressure increase in the vicinity of the disturbance generating apparatus, and to accelerate the fluid downstream of the disturbance generating apparatus. Recall that, in the case in which the fluid is a liquid such as water, the flow can instead be accelerated upstream and decelerated downstream of a disturbance generating apparatus by said fluid manipulation apparatus. In the vicinity of the disturbance generating apparatus, the flow can be considered to be protected from the higher pressure "exterior" flow, i.e. the exterior flow can be considered to be confined or contained. Note that in such embodiments there need not be a channel through a fluid manipulation apparatus. Instead, a body force per unit mass generating field can be generated exterior to a fluid manipulation apparatus, where the streamlines which pass in the vicinity of the disturbance generating apparatus being referred to the "interior flow" and the remaining flow being denoted the "exterior flow", although both flows can be exterior to the fluid manipulation apparatus.

There are a wide variety of body force per unit mass generating apparatuses and methods known in the art. For example, the fluid upstream of the disturbance generating apparatus can be ionized in the upstream portion of the fluid manipulation apparatus and subsequently subjected to an electric field which is configured to decelerate, confine, and accelerate the ionized fluid in the vicinity of a disturbance generating apparatus, prior to being deionized or neutralized once more in the downstream portion of the fluid manipulation apparatus. Alternatively, or concurrently, magnetic fields can be used. The fluid can also be electrically or magnetically polarized in some embodiments.

A body force can arise from the existence of a potential field gradient. One such example is the force which arises from the gradient of an electric potential. For example, the elements of a fluid can be configured to be electrically charged. In the context of a fluid, the term "elements" refers to the constituent parts of the fluid, such as molecules, for example. In the case of a gas, the molecules could be positively or negatively ionized, for instance. By applying an electric field, body forces per unit mass can be applied to the electrically charged elements of the fluid by a fluid manipulation apparatus.

For other embodiments it can be impossible or inconvenient to use, procure, or create a fluid with mobile electrical charges. In this case, elements of the fluid can be polarized by applying an electric field, or these elements can already have an intrinsic polarization, as in the case of polar molecules, such as water. When placed in an electric field gradient, these polarized elements can experience a body force. Note that the magnitude of said force depends on the orientation of the polarization axis relative to the electric field, amongst other parameters. Thus an electric field can be configured to generate body forces per unit mass on the polar elements in the fluid, as well as polarize elements in the fluid, if necessary. The electric field can be applied in a myriad of ways known in the art.

Magnetism can also be employed to generate body forces. The fluid can comprise diamagnetic, paramagnetic, or ferromagnetic elements. When magnetized, the individual elements in the fluid can form magnetic dipoles, or these elements can already have an intrinsic magnetic dipole, such as an electron. When these magnetic dipoles are placed in a magnetic field with a non-zero curl or gradient, they can experience a body force. Note that the magnitude of the body force is a function of the orientation of the magnetic dipole relative to the local magnetic field, amongst other parameters. Thus an external magnetic field can be configured to generate body forces per unit mass on the magnetized elements in the fluid, as well as magnetize the elements in the fluid, if necessary. The magnetic field can be generated by ferromagnets other at least instantaneously magnetized elements, or by an electrical current flowing through the wires of an electromagnet, amongst other methods known in the art.

In FIG. 23, the duct apparatus is configured in a manner in which only a small amount of vorticity is shed by duct apparatus 800 compared to the vorticity shed by IMSA 817. This is accomplished in part by ensuring IMSA 817 is located sufficiently far from the inside surface 816, such that the induced flow velocity of IMSA 817 and the associated wake at the inside surface 816 is sufficiently small. Note that the vorticity shed by duct apparatus 800, or any induced flow velocity within the supersonic exterior flow can incur a wave drag on the exterior flow. Thus, it can be advantageous for the duct apparatus 800 to be sufficiently large that the bound vortex of IMSA 817 as well as any vorticity shed by IMSA 817 does not impart a theoretical induced flow velocity, i.e. an induced local free stream flow velocity, at inside surface 816. Such a theoretical induced velocity can give rise to a theoretical bound vortex associated with duct apparatus 800, or vortex shedding by duct apparatus 800, due to the theoretical constraint preventing fluid from passing through inside surface 816. These shed vortices at the tailing edge of duct apparatus 800, i.e. at second opening 810, can give rise to shock waves and wave drag. The magnitude of this wave drag can be reduced by reducing the interference of IMSA 817 as well as the interference of the wake of IMSA 817 on duct apparatus 800. This can be accomplished by appropriately configuring parameters such as the size of duct apparatus 800, which can be measured in terms of the diameter or cross-sectional area at station 837 or the length of the duct apparatus 800 downstream of IMSA 817, for example, the location and size of IMSA 817 within duct apparatus 800, where the size can be measured in terms of wingspan chord length or reference area, the magnitude of the lift produced by IMSA 817, as well as the properties of the fluid at station 837, where the properties can refer to the local free stream flow velocity or density. Note that duct apparatus 800 can and does impart a substantial amount of interference on IMSA 817 and the wake of IMSA 817 by changing the local free stream flow of IMSA 817 and its wake.

In the second contraction 808 and the second expansion 809 the vortex sheet of IMSA 817, as indicated by streamline 841, is accelerated together with the interior flow, i.e. the bulk flow within channel 803, in the positive X-direction. In the depicted embodiment, at second opening 810, the velocity of the vortices in vortex sheet of IMSA 817 are moving in the positive X-direction at a speed which is greater than the speed of sound, as is the case for the interior flow at that location. Downstream of second opening 810, the vortex sheet of IMSA 817 does not move at a speed faster than the speed of sound relative to the bulk flow. Therefore, the vortex sheet can traverse from the interior flow to the exterior flow without incurring a shock wave at the interface. Note that this is true even when there is a slip velocity or a velocity difference or velocity gradient between the interior flow and the exterior flow.

In some embodiments, the wave drag associated with the acceleration of the vortex sheet of IMSA 817 from a speed which smaller than the speed of sound relative to the duct apparatus 800 within the region of substantially constant cross-sectional area within duct apparatus 800, to a speed which is greater than the speed of sound relative to the duct apparatus 800 at station 840 can be small or negligible in some embodiments when compared to the wave drag associated with an equivalent IMSA in the prior art. This is due to the acceleration of the free vortices of the vortex sheet together with the acceleration of the bulk of the interior flow, such that the vortices don't move faster than the surrounding fluid. By virtue of a fluid manipulation apparatus such as duct apparatus 800, a given vortex of IMSA 817, bound or free, is prevented from or hindered in, incurring a significant induced velocity to, or imparting a disturbance on, flow which is moving supersonically relative to said vortex source. The gradual acceleration of the fluid in the second contraction 808 and the second expansion 809 can serve to reduce the strength of any shock waves associated with the vortex sheet of IMSA 817.

FIG. 24 is a cross-sectional view of the embodiment shown in FIG. 23 viewed in the positive X-direction at the location indicated in FIG. 23.

Streamline 841 is shown. The stagnation streamline of IMSA 817, i.e. the streamline incident on the leading edge stagnation point of the left wingtip of IMSA 817 and the streamline originating at the trailing edge stagnation point of the left wingtip of IMSA 817, is indicated by dotted line 842. The interior surface 823 of IMSA 817 is shown.

Figure 25:
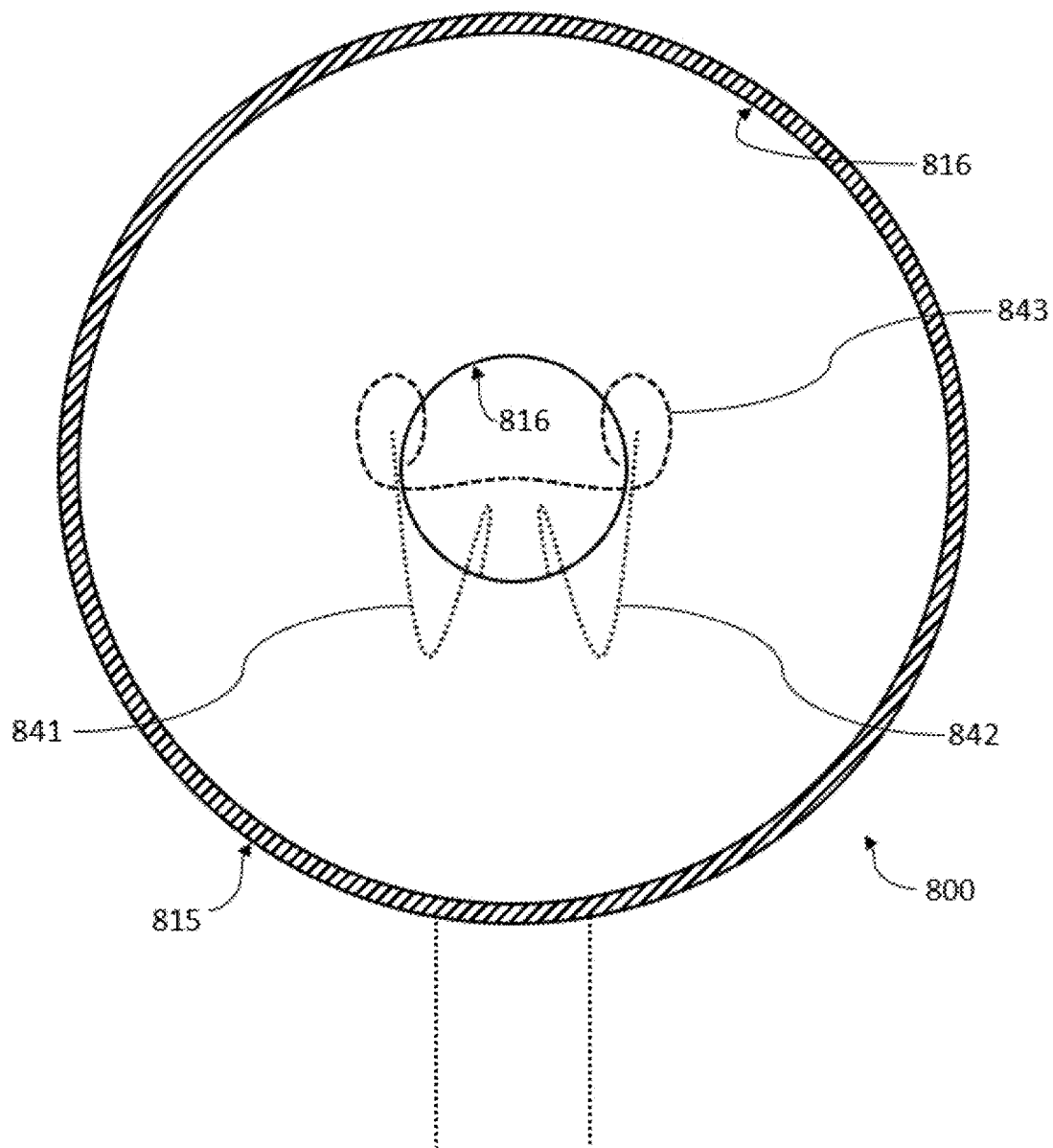

FIG. 25 is a cross-sectional view of the embodiment shown in FIG. 23 viewed in the positive X-direction at the location indicated in FIG. 23.

The cross-section of the theoretical shed vortex sheet of IMSA 817 at this location is indicated by dashed line 843. The roll-up of the vortex sheet is represented schematically.

Figure 26:
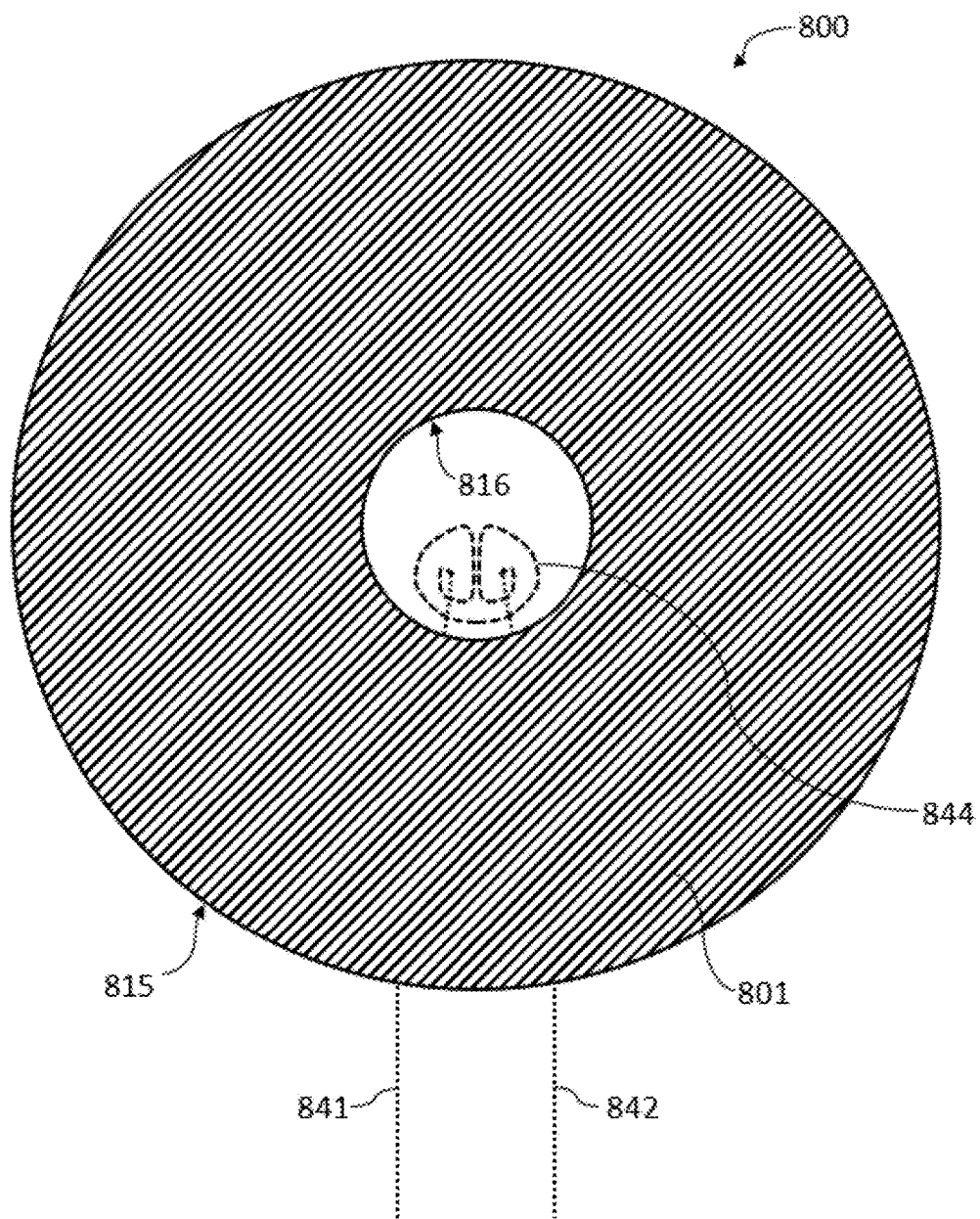

FIG. 26 is a cross-sectional view of the embodiment shown in FIG. 23 viewed in the positive X-direction at the location indicated in FIG. 23.

The cross-section of the theoretical shed vortex sheet of IMSA 817 at station 839 is indicated by dashed line 844. The roll-up of the vortex sheet has progressed further.

Figure 27:
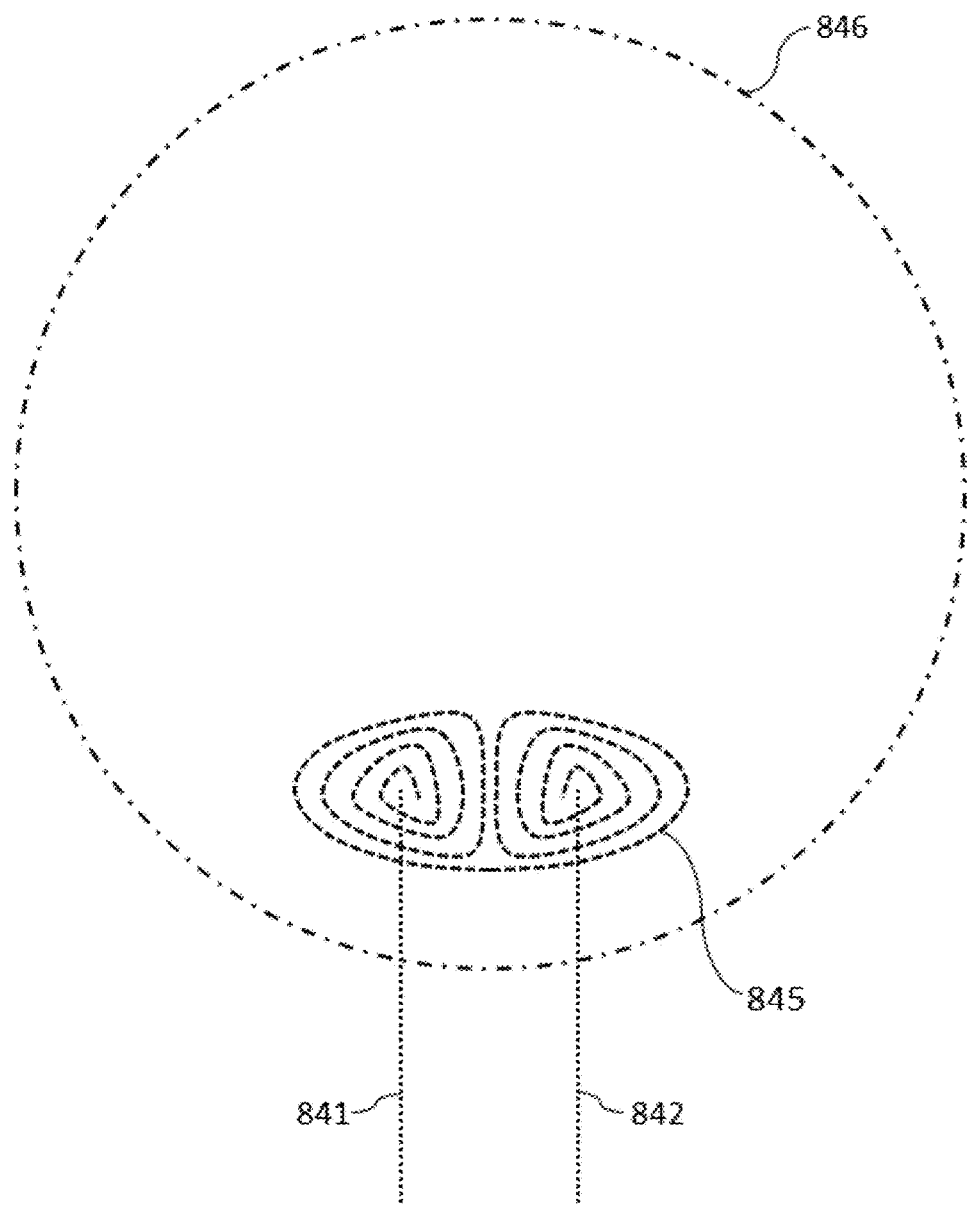

FIG. 27 is a cross-sectional view of the embodiment shown in FIG. 23 viewed in the positive X-direction at the location indicated in FIG. 23.

The cross-section of the theoretical shed vortex sheet of IMSA 817 at that location is indicated by dashed line 845. The roll-up of the vortex sheet has progressed further.

Dashed dotted line 846 illustrates the projection of the outside surface 815 on a plane parallel to the YZ-plane downstream of said cross-sectional view.

Figure 28:
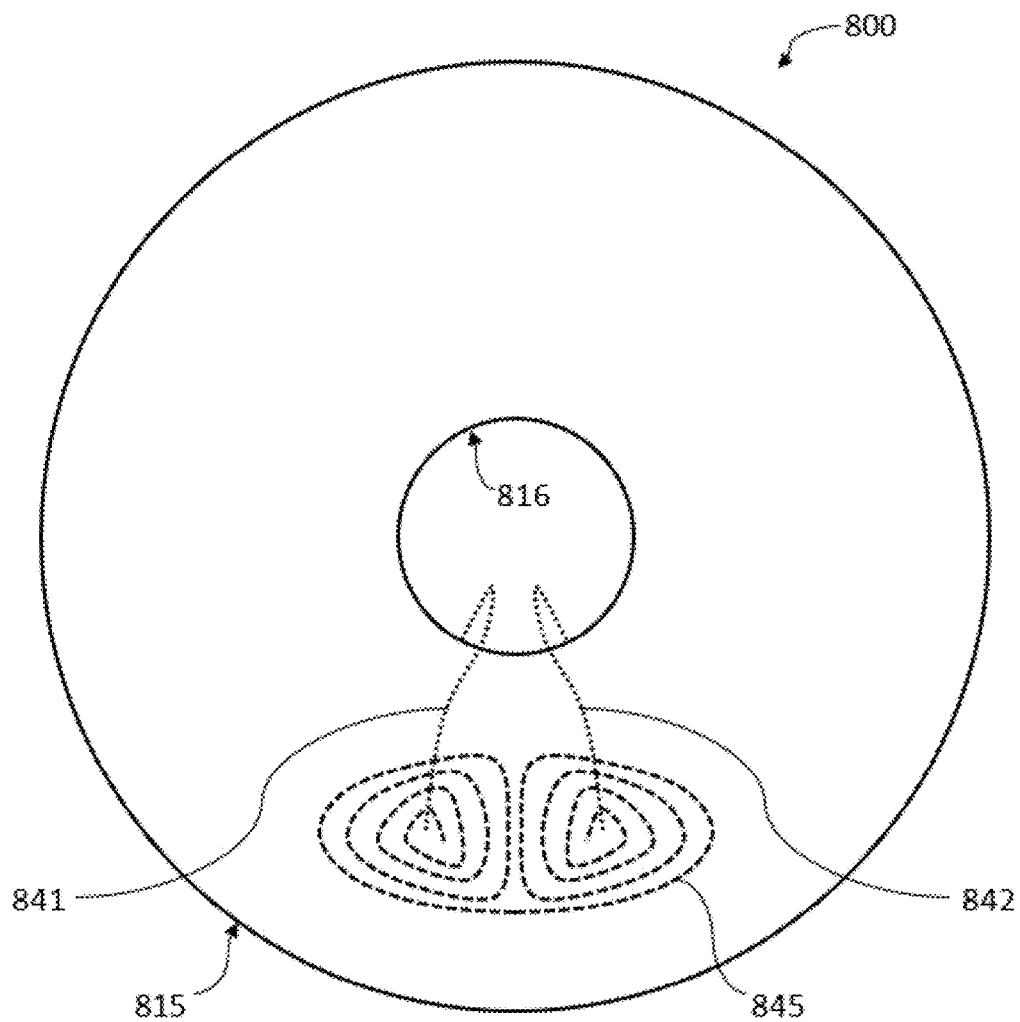

FIG. 28 is a cross-sectional view of the embodiment shown in FIG. 23 viewed in the negative X-direction at the location indicated in FIG. 23.

Figure 29:
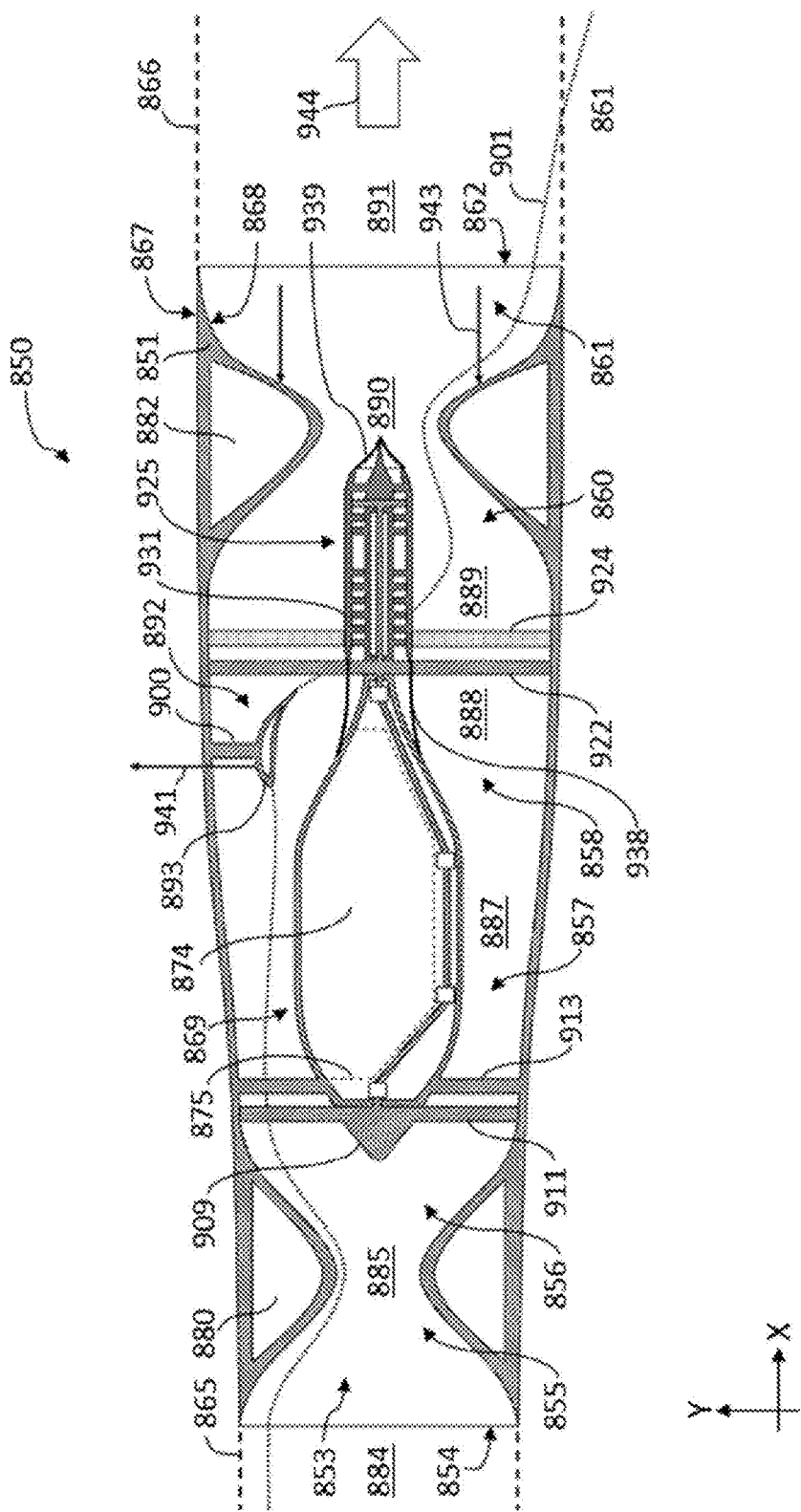
FIG. 29 is a cross-sectional view of a duct apparatus, according to some embodiments.

FIG. 29 is a cross-sectional view of another embodiment of the invention. Some features of the embodiment shown in FIG. 30 as well as some of the principles of operation of the embodiment share similarities with features and principles of operation described by the other figures, and will therefore not be described in the same detail in the context of FIG. 30, and vice versa.

Duct apparatus 850 encloses an IMSA 892 which in some embodiments can be a wing, an upstream IMSA 908, a fuselage apparatus 869, a downstream IMSA 919, and an engine 925.

In the depicted embodiment, engine 925 can be described as a turbofan engine. In some embodiments, a driveshaft of engine 925 can be coupled to a gearbox. In some such embodiments, engine 925 can be described as a turboshaft engine.

In the embodiment shown, duct apparatus 850 is circular in cross-section when viewed along the X-axis and axially symmetric about an axis parallel to the X-axis. Duct apparatus 850 can be considered to be an IMCA. Duct apparatus 850 comprises an outside surface 867 and a channel 853 with an inside surface 868 located between first opening 854 and second opening 862, where the channel comprises a first contraction 855, a first expansion 856, a region of gradually increasing cross-sectional area 857 of channel 853 when viewed in the X-direction, a second expansion 858, a second contraction 860, and a third expansion 861. Note that the terms "contraction" and "expansion" refer to the magnitude of the radius of the axially symmetric channel.

Fuselage apparatus 869 comprises a leading point 870, a trailing point 871, an inside surface 873, an outside surface 872, and fuselage compartment 874 schematically separated from the remaining fuselage by dashed line 875. The fuselage apparatus 869 is rigidly connected to the duct apparatus by several support struts. In the embodiment shown, individual stator blades, such as stator blade 913, can also be considered to be support struts, and vice versa. In some embodiments, the fuselage can be configured to carry cargo, passengers, or fuel, for example.

The duct apparatus comprises a first compartment 880 within the upstream constriction, or duct element 951, and a second compartment 882 within the downstream constriction, or duct element 952. These compartments can fulfill a number of purposes. In some embodiments, they can be used to store landing gear, fuel, or cargo.

Note that the channel radius or geometry can change in a different manner as a function of position along the X-axis, or be configured differently, for other embodiments, or other operating conditions. In other embodiments the cross-sectional geometry of channel 853 or outside surface 867 can be square, rectangular, or elliptical when viewed along the X-direction. In some embodiments, the cross-sectional geometry of channel 853 can change from square to circular in the positive X-direction, for example.

For some embodiments, the cross-sectional area of the circular channel 853 can vary with time. For example, the radius of the channel at station 890 can be modified for different operating conditions. The radius can be increased or decreased depending on the free stream flow velocity. In this manner, the properties of the flow through duct 853 can be modified and controlled such that the principles of the invention can be applied at different free stream flow conditions. For example, the existence, or the location, of a shock wave within the first expansion 856 can be regulated by controlling the cross-sectional area of the channel 853 at station 890. A wide variety of methods for changing the cross-sectional area of a channel as a function of time are available. For example, a ramp connected to the duct apparatus 850 can be hydraulically extended into the channel, thus reducing the cross-sectional area of the channel. In another example, a spike located within channel 853 can be moved along the length of the channel, i.e. axially along the X-direction, towards or away from a contraction of the channel, thus decreasing or increasing the annular cross-sectional area of the channel, respectively.

Similarly, the cross-sectional area of the channel 853 at station 885 can be modified in order to ensure the desired flow profile within channel 853 as well as upstream and downstream of channel 853.

Duct apparatus 850 can be constructed from bulk material 851, which can include a metal alloy such as aluminium, steel, or titanium. In some embodiments, bulk material 851 comprises composites, such as carbon fiber or fiberglass.

In some embodiments, IMSA 892 can be a wing. The cross-sectional view in FIG. 29 shows the airfoil profile 893 of IMSA 892 with trailing edge 895, inside surface 899, and outside surface 896. IMSA 892 is rigidly connected to the duct apparatus by support strut 900. The stagnation streamline of IMSA 892, i.e. the streamline incident on the leading edge stagnation point of the right wingtip of IMSA 892 and the streamline originating at the trailing edge stagnation point of the right wingtip of IMSA 892, is indicated by dotted line 901. During the supersonic, nominal, constant velocity, level cruise configuration shown in FIG. 29, IMSA 892 is configured to generate lift, as indicated by lift vector 941, which has a substantial component parallel to the Y-axis.

There is an upstream IMSA 908 comprising a propeller or a fan disc with fan blades or propeller blades, such as blade 911, mounted to a central hub 909 with leading point 870. Stator blades, such as stator blade 913, are located downstream of the propeller. In other embodiments, there are no dedicated stator blades, with upstream IMSA 908 consisting only of a single fan disc or propeller. In another example, the upstream IMSA can consist of two coaxial and counter-rotating propellers. In the depicted embodiment, the propeller blades and the stator blades are configured to be able to be rotated about their long axis. In other words, the blade pitch angle can be regulated for the stator blades and the rotor blades of upstream IMSA 908. During the supersonic, nominal, level cruise configuration shown in FIG. 29, the fan blades and the stator blades of upstream IMSA 908 are feathered, i.e. in a low drag configuration. For some embodiments, the rotor of upstream IMSA 908 is stationary, i.e. does not rotate relative to the duct apparatus 850, in this configuration. In other embodiments, the rotor of upstream IMSA 908 can rotate in this configuration.

There is a downstream IMSA 919 comprising a propeller or a fan disc with fan blades or propeller blades, such as blade 922, mounted to a central shaft. Stator blades, such as stator blade 924, are located downstream of the propeller. In other embodiments, there are no dedicated stator blades, with downstream IMSA 919 consisting only of a single fan disc or propeller. In another example, the downstream IMSA can consist of two coaxial and counter-rotating propellers. In the depicted embodiment, the rotor of downstream IMSA 919 is rotating in the same direction as the rotor of upstream IMSA 908. In other embodiments, the direction of rotation of the downstream IMSA 919 can be opposite to the direction of rotation of the upstream IMSA 908. This can serve to reduce the torque acting on duct apparatus 850 about an axis parallel to the axis of rotation of the upstream and downstream IMSAs due to the drag acting on both As explained in the context of upstream IMSA 908, the propeller blades and the stator blades of downstream IMSA 919 are configured to be able to be rotated about their long axis. In other words, the blade pitch angle can be regulated for the stator blades and the rotor blades of downstream IMSA 919. During the supersonic, nominal, level cruise configuration shown in FIG. 29, the fan blades and the stator blades of downstream IMSA 919 are feathered, i.e. in a low drag configuration. For some embodiments, the rotor of downstream IMSA 919 is stationary, i.e. does not rotate relative to the duct apparatus 850, in this configuration. In other embodiments, the rotor of downstream IMSA 919 can rotate in this configuration.

In some embodiments, engine 925 can be a jet engine having a compressor 928, combustion chamber 940, and turbine 932 within nacelle 931. The first stage of turbine 932 consists of a rotor disc with rotor blades, such as rotor blade 934, and a stator with stator blades, such as stator blade 935. The second stage of turbine 932 consists of a rotor disc with rotor blades, such as rotor blade 936, and a stator with stator blades, such as stator blade 937. Engine 925 is of a twin spool architecture, with the rotor disc of the first stage of turbine 932 driving the first spool 926 which drives the rotor discs of the compressor 928. Compressor 928 can have three stages, each consisting of a rotor disc with rotor blades, such as rotor blade 929 of the third stage, and a stator with stator blades, such as stator blade 930 of the third stage. The rotor disc of the second stage of turbine 932 drives a second spool, which drives the rotors of both the upstream IMSA 908 and the downstream IMSA 919 via drive shaft 927, drive shaft 915, and drive shaft 916, for example. Fairing 933 is configured to reduce the drag of engine 925 by reducing or avoiding flow separation at the exit of turbine 932. The trailing point 871 of fairing 933 is indicated.

In the depicted embodiment, an inlet ramp or door 938 can be configured to prevent a large portion of the interior flow from entering engine 925. The inlet door 938 can be configured to close-off the inlet of engine 925. Exit door 939 can be configured to provide an aerodynamic or hydrodynamic fairing to nacelle 931. During the supersonic, nominal, level cruise configuration shown in FIG. 29, the inlet door 938 and exit door 939 are shown in a fully closed configuration. During this operating condition, the thrust is provided by the injection and combustion of fuel by the flame holders, such as flame holder 724, within channel 853. Engine 925 can be considered to be turned off, i.e. completely powered off or in a state that provides no substantial power, during this operating mode. In other embodiments, engine 925 can remain turned on during supersonic, nominal, level cruise. For example, engine 925 can drive an electric generator in order to provide electrical power for auxiliary systems on vehicle 850. The power can be used to charge batteries, or be consumed by electrical equipment such as flight computers or air-conditioning units. The inlet door 938 and exit door 939 are shown in a fully open configuration in FIG. 30 and FIG. 31. In this configuration, a portion of the fluid moving through channel 853 can be ingested by, or flow through, engine 925, which can produce power via the combustion of fuel, for example.

The power generated by engine 925 is transmitted to upstream IMSA 908 and to downstream IMSA 919 via a drive train, as mentioned. In some embodiments, the drive train can comprise clutches, drive shafts, gears, or gear boxes, for example. In other embodiments, the power generated by engine 925 can be transferred to upstream IMSA 908 and to downstream IMSA 919 electrically. Engine 925 can power an electric generator, at least a portion of the electricity produced by which can be transferred to an electric motor via electrical conductors, where the electric motor can be configured to power upstream IMSA 908 and/or downstream IMSA 919. A portion of said electricity can also be used to power auxiliary electrical systems of duct apparatus 850. In some embodiments, the rotor disc of downstream IMSA 919 can be connected to drive shaft 927, as shown in FIG. 29, which in turn can be configured to drive an electric generator, the electrical power of which can be transferred via electrical conductors around fuselage compartment 874 to an electric motor driving the rotor disc of upstream IMSA 908.

In the depicted embodiment, the drive train which mechanically transmits the power from drive shaft 927 to upstream IMSA 908, is directed around fuselage compartment 874 by universal joints. In duct apparatus 850 the universal joints are constant velocity joints, or CV joints, such as CV joint 907 connecting drive shaft 915 to drive shaft 916.

In the depicted embodiment, the stator blades of downstream IMSA 919 are configured to be able to inject fuel into the adjacent fluid flow, as well as hold the flame during combustion of said fuel. The stator of IMSA 919 can thus be considered to be a flame holder. During the supersonic, nominal, level cruise configuration shown in FIG. 29, the flame holder is configured to inject fuel into channel 853 and stabilize a flame during the combustion of said fuel. In such embodiments and during this mode of operation, channel 853 can be operated in the same manner as a ramjet. The thrust imparted by the fluid on the duct apparatus 850 is schematically represented by thrust vectors, such as thrust vector 943. Note that the thrust is the result of pressure of the fluid acting on duct apparatus 850. In other words, the thrust arises from the integration of the pressure acting on the wetted surfaces of duct apparatus 850. As a result, the flow velocity magnitude of the interior flow at station 891 is greater than the free stream flow velocity magnitude, i.e. the flow velocity magnitude of the interior flow at station 884.

Any surplus torque imparted by the combination of the upstream and downstream IMSAs on the remaining portion of duct apparatus 850 can be cancelled by adjusting the pitch angle or the orientation of the stator blades of the downstream and/or upstream IMSAs relative to the fluid. The stator blades can also be used for roll, pitch, and yaw control of duct apparatus 850 in some embodiments. In other embodiments, dedicated IMSAs, similar to IMSA 892, can be located within the region of channel 853 in which the fluid is flowing subsonically relative to the duct apparatus, where the dedicated IMSAs are configured to maintain roll, pitch, and/or yaw control. In yet other embodiments, control surfaces can be located in the regions within channel 853 in which the fluid is moving supersonically relative to the duct apparatus. In some such embodiments, the control surfaces can be located at the trailing edge of the duct apparatus, i.e. at the second opening 862. Pitch and yaw control can be accomplished by thrust vectoring, for example, where the thrust is produced by the acceleration of the interior flow. In some embodiments, tail surfaces, such as a vertical or horizontal tail, can be mounted on the outside surface 867 and be configured to interact with the exterior flow, i.e. the flow outside of cylindrical streamtube 865 or 866.

Embodiments of the invention are at least partially enveloped by a fluid, as defined earlier. In FIG. 29, the fluid is compressible. For example, the fluid can be a gas such as air.

In some embodiments, the operating condition depicted in FIG. 29 can be a nominal, level cruise operating condition. In the depicted, simplified scenario, the free stream flow relative to the center of mass of duct apparatus 850 is constant in time and spatially uniform in magnitude and direction, where the direction is parallel to the X-axis. In the depicted operating condition, the free stream flow velocity magnitude relative to the duct apparatus 850 is larger than the speed of sound in the fluid. Since the wind velocity is assumed to be negligible in this scenario, this is equivalent to duct apparatus 850 moving relative to the fluid at a speed faster than the speed of sound in the fluid which is at rest in an inertial reference frame. In FIG. 29, the free stream flow velocity relative to duct apparatus 850 is aligned with and parallel to the X-axis, i.e. from the left of the page to the right of the page, as indicated by arrow 944.

Dashed lines 865 and 866 indicate stagnation streamlines which are incident on the leading edge or originate at the trailing edge of duct apparatus 850. Streamlines 865 and 866 are therefore part of a streamsurface, or streamtube, which separate fluid flowing around duct apparatus 850 from fluid flowing through channel 853 of duct apparatus 850. In this embodiment, the steamtube is circular when viewed along the X-direction.

The fluid upstream of duct apparatus 850, such as at station 884, is moving faster relative to duct apparatus 850 than the speed of sound in the fluid in the configuration shown in FIG. 29. The first contraction 855, and the first expansion 856 of channel 853 are configured to compress the fluid flowing through channel 853 in the positive X-direction. The first throat is defined to be the portion of channel 853 with the smallest cross-sectional area of channel 853 between first contraction 855 and first expansion 856 when viewed along the X-direction. The average speed of the fluid relative to duct apparatus 850 at the first throat, i.e. station 885, is approximately equal to the speed of sound within fluid at that location. Upstream, such as at station 884, the average relative speed is larger than the speed of sound, and further downstream, such as at stations 887, 888 or 889, the average relative speed is smaller than the speed of sound within the fluid in this embodiment. In the depicted embodiment, the flow through channel 853 is substantially adiabatic and isentropic when neglecting friction. In other embodiments, there can be a shock wave located between the first throat and station 887. In other words, the relative flow speed of the fluid immediately downstream of the first throat can be faster than the speed of sound within the fluid, where the relative flow speed is reduced to a speed slower than the speed of sound throughout the shock wave, resulting in a relative flow speed at station 887 which is slower than the speed of sound, as in the ideal scenario in which there is an infinitely weak shock at the first throat. In the preferred embodiment, such a shock wave is configured to be located upstream of upstream IMSA 908.

Both the second contraction 860 and the third expansion 861 of channel 853 are configured to expand the fluid flowing through channel 853 in the positive X-direction. The second throat is defined to be the portion of channel 853 with the smallest cross-sectional area of channel 853 between second contraction 860 and third expansion 861 when viewed along the X-direction. The average speed of the fluid relative to duct apparatus 850 at the second throat, i.e. station 890, is approximately equal to the speed of sound within fluid at that location. Upstream, such as at station 887, the average relative speed is smaller than the speed of sound, and downstream, such as at station 891, the average relative speed is larger than the speed of sound within the fluid in this embodiment.

During the supersonic, nominal, level cruise configuration shown in FIG. 29, duct apparatus 850 is configured to reduce the local free stream flow of the disturbance generating apparatuses, such as upstream IMSA 908, fuselage apparatus 869, IMSA 892, downstream IMSA 919, the fuel injector and flame holder 924, or engine 925. Duct apparatus 850 is furthermore configured to accomplish said reduction in the local free stream flow without incurring an unnecessarily large wave drag of its own. This can be accomplished by configuring the duct apparatus as described previously. For instance, the change in the diameter of the circular outside surface 867 of duct apparatus 850 in the downstream direction can be configured to be small, and gradual. The disturbance imparted by the duct apparatus on the interior flow during the deceleration of the interior flow can be shielded from the exterior flow by the outside wall of the duct apparatus, and at least a portion of said disturbance on the interior flow can be cancelled prior to the interior flow exiting through the second opening 862. Any vortex shedding, such as the vortices shed by IMSA 892 or upstream IMSA 908, can be configured to occur within duct apparatus 850 at a reduced local free stream flow velocity compared to the free stream flow velocity, such that the wave drag associated with the shedding process is reduced or negligible compared to a reference scenario. The same principle can be applied to other disturbances, such as bound vortices or IMCAs, or engines, or the combustion of fuel, as mentioned. The interference, or local free stream flow velocity modification, imparted by the bound or free vortices within the duct apparatus, such as between stations 885 and 890, on the duct apparatus 850, such as the interior surface 868 of the duct apparatus 850, is low, such that duct apparatus 850 does not incur an unnecessarily large wave drag, where the associated waves can be in the interior flow or the exterior flow. This can be accomplished by ensuring the diameter of the channel 853 is large enough in relation to the strength and the location of the vortices. The strength of a bound or free vortex filament as well as the distance to the interior or outside surface of the duct apparatus are some of the parameters which determine the strength of said interference. Note that, while not all disturbances carry or shed vortices, such as the disturbances created by the combustion of fuel, the principles of the invention apply to such disturbances as well.

During supersonic, nominal, level cruise, the majority of the weight of the depicted duct apparatus 850 is carried by the lift force 941 produced by IMSA 892, and the majority of the thrust is produced by channel 853, which can be configured as a ramjet. Duct apparatus 850 can be described as a supersonic aircraft, for example. In FIG. 29, duct apparatus 850 is moving relative to the stationary free stream fluid in the negative X-direction, parallel to the X-axis, at a supersonic speed.

Figure 30:
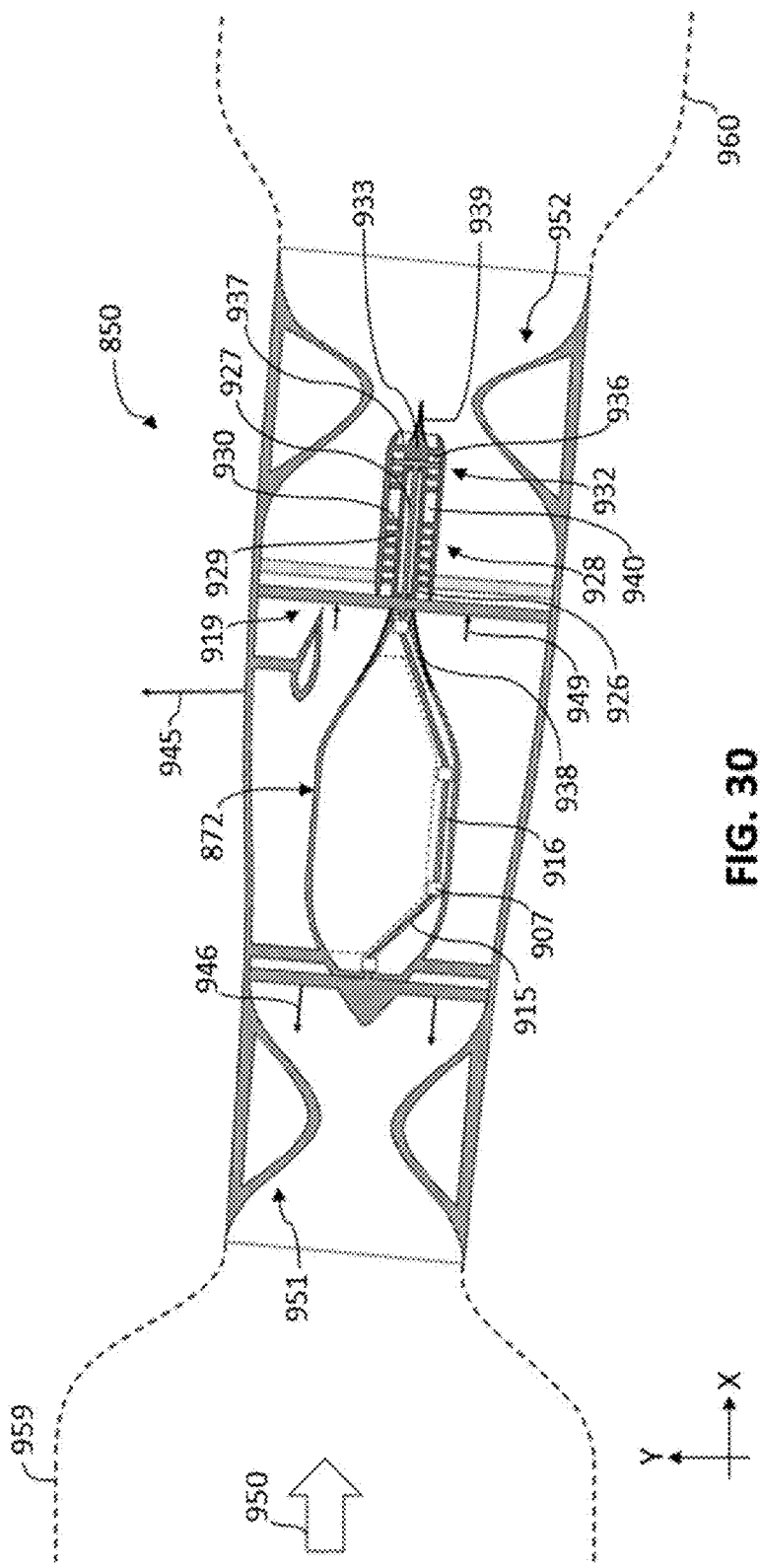
FIGS. 30 and 31 are cross-sectional views of the duct apparatus of FIG. 29 for various modes of operation, according to some embodiments.

FIG. 30 is a cross-sectional view of the embodiment shown in FIG. 29 for a different mode of operation. In FIG. 30, duct apparatus 850 is moving relative to the stationary free stream fluid in the negative X-direction, parallel to the X-axis, at a subsonic speed. The direction of the free stream flow relative to duct apparatus 850 is indicated by arrow 950. In this configuration, a portion of the weight of duct apparatus 850 is carried by the lift force 945 acting on duct apparatus 850. The longitudinal symmetry axis of duct apparatus 850 is rotated in a negative direction about the Z-axis. The resulting angle of attack of duct apparatus 850 results in the deflection of interior flow and exterior flow in the negative Y-direction, which gives rise to a lift force and drag force acting on duct apparatus 850. Duct apparatus 850 can be considered to be a closed wing, or an annular wing, during this mode of operation.

In order to reduce the interference between IMSA 892 and the downstream IMSA 919, IMSA 892 is feathered during this mode of operation. Interference can lead to a distortion of the flow field at downstream IMSA 919, which can lead to unnecessary drag, noise, and vibrations. To that end, the shape of IMSA 892 is changed in a manner in which no vortices are shed by IMSA 892 in a simplified, frictionless scenario. In some embodiments, the IMSA 892 can be morphed such that the camber and angle of attack of each airfoil section of IMSA 892 is zero. In other embodiments, IMSA 892 can be retracted into a fairing or mounted flush against an inside surface, such as interior surface 868 or fuselage outside surface 872. This can reduce the wetted area of duct apparatus 850 while also minimizing or reducing any interference between IMSA 892 and downstream IMSA 919.

Upstream IMSA 908 is configured to produce thrust directed in the upstream direction, as indicated by thrust vector 946, and downstream IMSA 919 is configured to produce thrust directed in the downstream direction, as indicated by thrust vector 949. This can increase the mass flow rate through the channel 853 and reduce the induced drag associated with the production of lift and thrust. Note that upstream IMSA 908 and downstream IMSA 919 produce a net thrust directed in the upstream direction, which cancels the drag acting on duct apparatus 850 and contributes to the net lift of duct apparatus 850.

The power consumed by the upstream IMSA 908 is provided by the power extracted by the downstream IMSA 919 from the interior flow, as well as engine 925.

In FIG. 30, there is no fuel flow via the flame holder into the interior flow and no combustion of fuel in the interior flow apart from within the combustion chamber 940 engine 925 during subsonic, nominal, level cruise. In other modes of operation, flame holder can inject and combust fuel in channel 853, similar to the operation of an afterburner. Similarly, fuel can also be injected and combusted immediately downstream of turbine 932 in engine 925.

Dashed lines 959 and 960 indicate stagnation streamlines which are incident on the leading edge or originate at the trailing edge of duct apparatus 850. Streamlines 959 and 960 are therefore part of a streamsurface, or streamtube, which separate the exterior flow, i.e. the fluid flowing around duct apparatus 850, from the interior flow, i.e. fluid flowing through channel 853. In this embodiment, the steamtube is circular when viewed along the X-direction.

Figure 31:
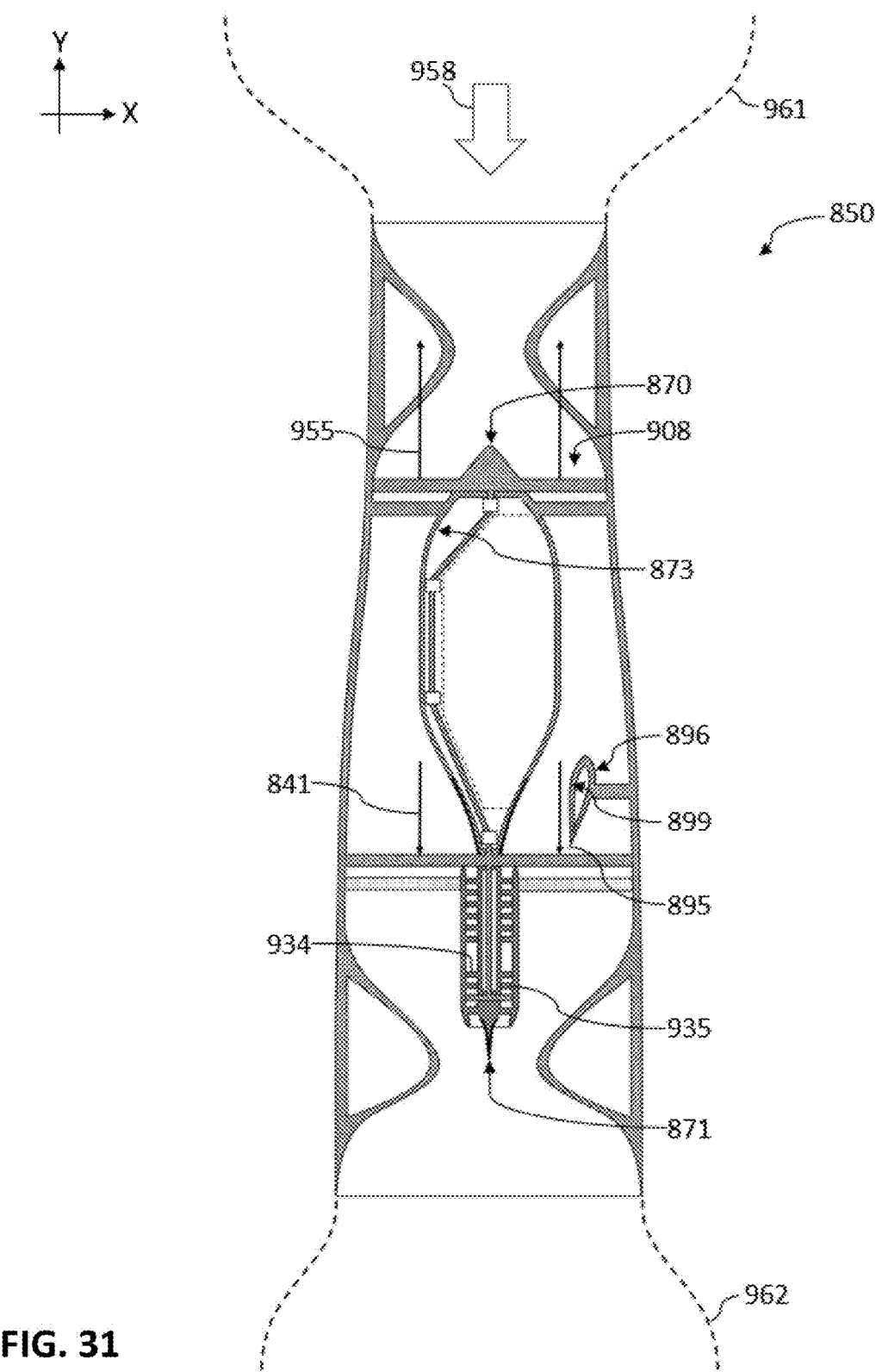

As the free stream velocity is increased for the operating mode shown in FIG. 30, the magnitude of the thrust of downstream IMSA 919 can be reduced. The purpose of the downstream IMSA 919 during the operating modes shown in FIG. 30 and FIG. 31 is the increase of the mass flow rate through channel 853. As the free stream velocity magnitude is increased, the services of the downstream IMSA 919 are only required to a lesser extent. Thus, the magnitude of the thrust of downstream IMSA 919 can be reduced. Depending on the net thrust requirement, the thrust of upstream IMSA 908 can be reduced or increased as the free stream velocity increases. At low free stream flow velocities, the thrust produced by upstream IMSA 908 can be limited by structural constraints or power limits of engine 925. As the free stream flow velocity is increased, or at the aforementioned low free stream flow velocities, the thrust produced by upstream 908 can also be limited by an increase in the wave drag, compressibility drag, or noise of the rotor blades of upstream IMSA 908. The wave drag can arise from the tip velocity of the rotor or fan of upstream IMSA 908 relative to the fluid exceeding the speed of sound at that location. Portions of the rotor blades of upstream 908 can also encounter compressibility drag at large speeds relative to the surrounding fluid. As the thrust of upstream IMSA 908 is reduced, the magnitude of the thrust of downstream IMSA 919 is reduced in order to meet a given net thrust requirement. At sufficiently large free stream flow velocities, the magnitude of the thrust of the downstream IMSA 919 is so small, that it is more advantageous to feather downstream IMSA 919. To that end, downstream IMSA 919 can be uncoupled from the drive train via a clutch and feathered, while upstream IMSA 908 continues to provide thrust. In this configuration, upstream IMSA 908 and engine 925 can be considered to operate as a conventional turbofan engine, with the fan being represented by upstream IMSA 908 and the core being represented by engine 925.

As the speed is increased further, the thrust and the rate of rotation of the rotor of upstream IMSA 919 can be reduced to avoid or reduce the wave drag and/or compressibility drag associated with the rotor blades of upstream IMSA 919. As before, upstream IMSA 908 and engine 925 can be considered to operate as a conventional turbofan engine, albeit with a reduced percentage of thrust produced by the fan, i.e. upstream IMSA 919. The remaining portion of the required thrust can be provided by the acceleration of fluid through engine 925, which per se can be considered to operate as a turbojet engine.

As the free stream flow velocity approaches and exceeds Mach 1, an afterburner of engine 925 can be optionally engaged to compensate for the reduction of the thrust and rate of rotation of upstream IMSA 908 in the vicinity of Mach 1 and aid engine 925 in meeting the net thrust requirement. Alternatively, or concurrently, fuel can be injected and combusted within channel 853 at station 889 by the flame holder and fuel injector. As the speed is increased beyond Mach 1, the local free stream flow velocity of upstream IMSA 908 reduces, allowing the rate of rotation, and the thrust produced by upstream IMSA 908 to increase once more. At a sufficiently large speed, any fuel flow into the afterburner of engine 925 or into the interior flow at station 889 can be reduced, or stopped completely, in order to improve fuel efficiency. At such speeds, upstream IMSA 908 and engine 925 can be considered to be a turbofan engine at supercruise. During some modes of operation, this reduction of fuel flow need not occur in order to aid in the acceleration of duct apparatus 850. As the speed is increased further, any fuel flow into the afterburner of engine 925 or into the interior flow at station 889 can be increased. Fuel can be injected into the channel 853 by the flame holder and injector, such as flame holder 924, and combusted. The portion of channel 853 within which the interior flow remains exterior to engine 925 can thus be considered to be operated as a ramjet in this mode of operation. As the speed is increased further, the thrust produced by upstream IMSA 908 can be reduced, and upstream IMSA 908 can be feathered as well, corresponding to the configuration shown in FIG. 29.

In the aforementioned description, the acceleration from low subsonic speeds to supersonic speeds is described. Note that the wave drag associated with duct apparatus 850 during this acceleration is comparatively low. Not that there are other ways in which this acceleration can be carried out. For example, a shock can be allowed to form upstream of first opening 854. This shock wave can be produced by a separate, dedicated shock body such as a separate fuselage, for example. The shock wave can also be produced by appropriately reducing the cross-sectional area of channel 853 at station 890 or station 885, for example. This can reduce the mass flow rate through channel 853 and increase the thrust and rate of rotation of the rotor of upstream IMSA 919 in the vicinity of Mach 1 and at supersonic speeds compared to the scenario described above. This can incur wave drag and can contribute to noise pollution, however. The reduction in the mass flow rate through channel 853 can also increase the induced drag or induced power of duct apparatus 850.

FIG. 31 is a cross-sectional view of the embodiment shown in FIG. 29 for a different mode of operation. This mode of operation can be described as constant velocity climb. Note that the configuration of duct apparatus 850 during hovering flight is similar to the configuration shown in FIG. 31. Duct apparatus 850 can be described as a vertical takeoff and landing (VTOL) vehicle capable of supersonic flight.

In FIG. 31, duct apparatus 850 is moving relative to the stationary free stream fluid in the positive Y-direction, parallel to the Y-axis, at a subsonic speed. The direction of the free stream flow relative to duct apparatus 850 is indicated by arrow 958.

Dashed lines 961 and 962 indicate stagnation streamlines which are incident on the leading edge or originate at the trailing edge of duct apparatus 850. Streamlines 961 and 962 are therefore part of a streamsurface, or streamtube, which separate the exterior flow, i.e. the fluid flowing around duct apparatus 850, from the interior flow, i.e. fluid flowing through channel 853. In this embodiment, the steamtube is circular when viewed along the X-direction.

Upstream IMSA 908 is configured to produce thrust directed in the upstream direction, as indicated by thrust vector 955, and downstream IMSA 919 is configured to produce thrust directed in the downstream direction, as indicated by thrust vector 841. As mentioned, this can increase the mass flow rate through the channel 853 and reduce the induced drag associated with the production of thrust. Note that upstream IMSA 908 and downstream IMSA 919 produce a net thrust directed in the upstream direction, which cancels the drag force and the weight force acting on duct apparatus 850 during constant velocity climb.

The power consumed by the upstream IMSA 908 is provided by the power extracted by the downstream IMSA 919 from the interior flow, as well as engine 925. Said power is in this embodiment mechanically transferred to upstream IMSA 908 via the drive train comprising the drive shafts, such as drive shaft 915.

In FIG. 31, there is no fuel flow via the flame holder into the interior flow and no combustion of fuel in the interior flow apart from within the combustion chamber 940 engine 925 during subsonic, nominal, constant velocity, vertical climb. In other modes of operation, flame holder can inject and combust fuel in channel 853, similar to the operation of an afterburner. Similarly, fuel can also be injected and combusted immediately downstream of turbine 932 in engine 925.

For the mode of operation shown in FIG. 31, IMSA 892 is feathered, as described in the context of FIG. 30. Note that the IMSA 892 can be used as a control surface, or the control surface of IMSA 892 can remain active during configurations in which IMSA 892 is feathered.

During landing, duct apparatus 850 can deploy landing gear, and approach the ground vertically in a configuration similar to the configuration shown in FIG. 31. Takeoff and hovering flight can follow the same principles. Following takeoff, duct apparatus 850 can transition from the operating mode shown in FIG. 31 to the operating mode shown in FIG. 30, and subsequently to the operating mode shown in FIG. 29. The transition can be accomplished by the same mechanism used for pitch control, for instance. As mentioned, this can be carried out by control surfaces or thrust vectoring, for instance.

In some embodiments, duct apparatus 850 can comprise slots which allow flow to pass through outside surface 867 and through interior surface 868. These slots can be located downstream of constriction 951, i.e. downstream of first contraction 855 and downstream of first expansion 856, and upstream of upstream IMSA 908. In some embodiments, the slots can also pass through constriction 951, i.e. through a portion of the first compartment 880. Slots can be located upstream of constriction 952, i.e. upstream of second contraction 860 and downstream of downstream IMSA 919. In some embodiments, the slots can also pass through constriction 952, i.e. through a portion of the second compartment 882. The slots can be arranged circumferentially around the cylindrical or circular duct apparatus 850. Doors or ramps can be configured to close the slots or open the slots. These slots can be similar to the slots at the inlet of the jet engine of a Hawker Siddeley Harrier, for example. During operations at subsonic speeds, such as subsonic cruise or climb, the slots can be in an open position, allowing fluid to flow into channel 853 upstream of upstream IMSA 908, and out of channel 853 downstream of downstream IMSA 919. This can increase the mass flow rate of fluid through the upstream and downstream IMSAs. The slots can also serve to reduce flow separation at the first opening 854 and/or the second opening 862 or the first constriction 951 or the second constriction 952 by allowing flow to bypass first constriction 951 or the second constriction 952. This reduces the strength of the bound vortices associated with first constriction 951 or second constriction 952 and can reduce the amount of flow separation. At larger free stream flow velocities, such as at supersonic speeds, the slots can be closed, resulting in a configuration similar to the configuration shown in FIG. 29.

In other embodiments, other types of disturbance generating apparatuses, or a different arrangement of disturbance generating apparatuses, such as IMCAs, IMSAs, or apparatuses configured to increase or decrease the temperature of the fluid, within channel 853 can be used or employed.

For example, in other embodiments, the fuselage of duct apparatus 850 can be replaced by engine 925, the bulk of which can be located upstream of downstream IMSA 919 instead of downstream. Such embodiments need not comprise a wing, such as IMSA 892 of duct apparatus 850, and the drive train can comprise a single, straight shaft, as opposed to a series of shafts connected by universal joints, or constant velocity joints. Such embodiments can be considered to be, and operated as, a turbofan jet engines, for example.

Engine 925 can also be embedded within fuselage apparatus 869 in other variations of duct apparatus 850. In other words, engine 925 can be located within or enclosed by the outside surface 872 of fuselage apparatus 869, and upstream of downstream IMSA 919 and downstream of upstream IMSA 908. Engine 925 can be supplied with air via ducts which enter fuselage apparatus 869 from channel 853. Other variations of duct apparatus 850 don't feature a downstream IMSA similar to downstream IMSA 919. In some embodiments, the rotors of upstream IMSA 919 can be powered by at least one electric motor, which in turn can be powered by batteries, for example.

In other embodiments, the vehicle can be configured to be able to remain substantially horizontal during takeoff, hover, or landing. In other words, the long axis can be substantially parallel to the X-axis, as shown in FIG. 29, during VTOL operations. To that end, an embodiment configured in a similar manner as duct apparatus 850 can feature the following modifications compared to duct apparatus 850.

The outside wall of the duct apparatus can feature slots which run circumferentially around duct apparatus, as described previously. The slots can be located between IMSA 908 and IMSA 919, i.e. in the vicinity of station 887. Note that the slots need to be sufficiently large to allow a sufficient fluid flow through the duct apparatus to support the weight of the duct apparatus. In other embodiments, the slots can also be described as doors to the interior or the channel 853 of the duct apparatus. In some embodiments, the slots are only located on the top portion of the duct apparatus, i.e. the portion located in the positive Y-direction, in order to prevent or reduce vortex ring state and the re-ingestion of engine exhaust by engine 925.

The direction of rotation of IMSAs 908 and 919 can be reversed compared to nominal, subsonic cruise shown in FIG. 30. This can be accomplished by a gearbox and a clutch, which are configured to be able to change the direction of rotation of the drive shafts driving IMSAs 908 and 919. If IMSA 908 or 919 is driven by an electric motor, the direction of rotation of the motor can be reversed. Furthermore, the individual blades of IMSA 908 and IMSA 919 are configured to be able to rotate about their long axis, i.e. the radially outward axis, by approximately 180 degrees. In other embodiments, the direction of rotation of the rotors of IMSA 908 and IMSA 919 does not need to be reversed during VTOL operations compared to subsonic, nominal, level cruise. For example, the airfoils of the rotors of IMSA 908 and IMSA 919 can be symmetric, or they can feature a sufficiently small camber or twist, such that the direction of the thrust vector can be reversed without changing the direction of rotation of the rotors of IMSA 908 and IMSA 919. Note that the stator vanes of each IMSA can be used to mitigate any loss of efficiency associated with operating the rotors in a manner in which the thrust is reversed compared to subsonic, nominal, level cruise.

In addition, the portion of the duct prior to the second opening 862 can be curved, and, in some cases, extended, on the order of 90 degrees. Similarly, the portion of the duct in the vicinity of the first opening 654 can be curved, and, in some cases, extended, by approximately 90 degrees. The portion of the duct in the vicinity of the first opening 854 and the portion of the duct in the vicinity of the second opening 862 can be swiveled about the roll axis of the vehicle, as well as the pitch axis of the vehicle. These swiveling portions of the duct apparatus can be configured in a similar manner as the swiveling duct downstream of the main engine of the Lockheed F-35, for example. In a different embodiment, the curving or turning portion of the wall of the nominally straight duct can be provided by the extension of ramps or buckets into the flow in order to turn or redirect the flow, similar to the buckets being used in conventional thrust reversers of jet engines. Alternatively, or concurrently, flow deflecting vanes can be used to deflect the flow in the downward direction, i.e. the negative Y-direction, during nominal VTOL operations. These vanes can be reconfigured to redirect the flow in the desired direction, where the direction can have two degrees of freedom, or "DOF", relative to the bulk of the duct apparatus, for example. These DOF can comprise a rotation of the flow exiting the duct apparatus about the pitch or roll axis of the vehicle.

During nominal hover, i.e. in the absence of disturbances, the flow enters the duct apparatus through the slots in the vicinity of station 887. The flow subsequently bifurcates and moves either towards IMSA 908 or IMSA 919. The thrust produced by IMSA 908 is directed in the positive X-direction in a scenario similar to the scene shown in FIG. 29, i.e. in an upstream direction for this hovering scenario, and the thrust produced by IMSA 919 is directed in the negative X-direction, i.e. also in an upstream direction for this hovering scenario. Subsequently to being accelerated by IMSA 919 or IMSA 908, the flow is deflected by 90 degrees from a direction substantially parallel to the X-axis to a direction substantially parallel to the Y-axis, and directed in the negative Y-direction. The plane of the second opening 862 and the first opening 854 is now no longer parallel to the YZ-plane, but parallel to the XZ-plane during nominal hover.

The power consumed during hovering is provided by engine 925 in the aforementioned embodiment. Note that such an embodiment of the invention can be capable of both vertical and horizontal VTOL operations, as described.

During hover, roll control can be provided by the stator blades of IMSA 908 or IMSA 919. Roll control can also be provided by thrust vectoring when the line of action of the net thrust vector does not pass through the center of mass. Pitch and yaw control can be provided by the swiveling of the planes of the first or second opening of the duct apparatus, i.e. by thrust vectoring, as well as the regulation of the magnitude of the thrust of IMSA 908 or IMSA 919. Position control can be provided by the net thrust of IMSA 908 and IMSA 919 as well as the thrust vectoring. Recall that the individual rotor blades of IMSA 908 and IMSA 919 can be rotated about their long axis in order to facilitate thrust control at sufficient amplitude within a sufficient time.

In other embodiments capable of horizontal VTOL operations, the flow direction compared to the aforementioned scenario can be reversed. Instead of ingesting fluid through the central slots, i.e. the slots in the vicinity of station 887, the fluid can be expelled through a series of central slots. The direction of thrust of IMSA 908 is in the negative X-direction, and the thrust of IMSA 919 is directed in the positive X-direction, which is identical to the direction of thrust during subsonic, nominal, level cruise shown in FIG. 30. This simplifies the design of IMSA 908 and IMSA 919. The slots can comprise thrust vectoring apparatuses, which can be employed to ensure stability and control of the vehicle. For example, the slots can comprise guide vanes, which a configured to control the direction of the fluid exiting the slots. The slots can be located sufficiently far apart from each other along the wall of the duct apparatus, such that sufficient pitch and yaw control authority can be facilitated. Note that such an embodiment ingests the fluid through the first opening 854 and the second opening 862, which do not require the aforementioned bends of, nominally, 90 degrees. Such bends can improve the controllability of the vehicle, however. IMSA 908 and IMSA 919 serve to increase the pressure or energize the flow at station 887, where the flow enters the inlets to the slots before exiting through the outlet of the slots in the direction determined by the guide vanes in the proximity of the outlets, where the guide vanes are controlled by the flight control computer, for example.

In some of these other embodiments, the inlet of engine 925 is located downstream of IMSA 908, but upstream of the inlets to the slots on inside surface 868. In this manner the engine does not re-ingest its own exhaust during horizontal VTOL operations.

In some of these other embodiments, the inlet of a slot is one of several openings located circumferentially on the inside surface 868 of channel 853 between IMSA 908 and IMSA 919, while the outlet of the same slot is located at one of four locations on the exterior surface 867 of the duct apparatus. The outlet of a slot is connected to the corresponding inlet via a pipe, channel, or duct which passes through the wall of the duct apparatus. Two outlets can be located at the location of the first compartment 880, and two can be located at the location of the second compartment 882. The outlets can be offset from one another in the Z-direction, and facing in the negative Y-direction in general, for the scene shown in FIG. 29. Guide vanes can be located immediately upstream of the outlets, where the guide vanes can be configured to control the flow direction of the flow exiting through the outlet. Valves within the pipes can regulate the mass flow rate of fluid through a given outlet. The inlet and the outlet of a slot can be closed by a door to ensure a smooth outside surface 867 and inside surface 868 during non-VTOL operations.

The benefit of horizontal VTOL operations can be, amongst others, the comfortable transportation of patients as well as the reduction of the wind disturbances in proximity of the ground. Such wind disturbances are often directed parallel to the ground, and the amount of drag the vehicle is subjected to due to a disturbance can be reduced by turning the vehicle into the primary direction of such wind disturbances.

In some embodiments a combustion chamber or flame holder can be located upstream of downstream IMSA 919 and downstream of upstream IMSA 908. The combustion chamber can be located at station 887, for example. In some modes of operation, channel 853 can thus be considered to be, and operated as, a turbojet engine. An additional flame holder can be located downstream of IMSA 919 and operated as an afterburner to said turbojet engine.

In some embodiments, a portion of engine 925 can be located in the section of channel 853 corresponding to the third expansion 861. This can reduce the overall length of duct apparatus 850, i.e. the extent of duct apparatus 850 along the central axis, which can reduce the overall wetted area and viscous drag. In some embodiments, this can increase the wave drag, however.

Unless specified or clear from context, the term "or" is equivalent to "and/or" throughout this paper.

The embodiments and methods described in this paper are only meant to exemplify and illustrate the principles of the invention. This invention can be carried out in several different ways and is not limited to the examples, embodiments, arrangements, configurations, or methods of operation described in this paper or depicted in the drawings. This also applies to cases where just one embodiments is described or depicted. Those skilled in the art will be able to devise numerous alternative examples, embodiments, arrangements, configurations, or methods of operation, that, while not shown or described herein, embody the principles of the invention and thus are within its spirit and scope.

ASPECTS

The invention is furthermore described by the following aspects.

Aspect 1. A system for reducing wave drag, the system comprising: an outer surface configured for receiving exterior fluid flow of a fluid; a channel coupled to the outer surface and configured for receiving an interior fluid flow of the fluid, the channel including a fluid inlet and a fluid outlet, the channel being configured to manipulate the interior fluid flow to reduce wave drag; wherein the channel comprises: a first fluid manipulation apparatus ("FMA") configured to receive the interior fluid flow downstream of the fluid inlet and further configured to change speed and pressure of the fluid flow within the channel; a pressure containment apparatus ("PCA") configured to receive the interior fluid flow downstream of the first FMA; and a second FMA configured to receive the interior fluid flow downstream of the PCA and upstream of the fluid outlet, the second FMA being configured to further change the speed and pressure of the interior fluid flow, wherein the free stream has a free stream velocity that is greater than a wave velocity of a wave within the free stream.

Aspect 2. The system of aspect 1, wherein the first FMA and/or second FMA comprises a converging duct.

Aspect 3. The system of aspect 1, wherein the first FMA and/or second FMA comprises a converging diverging duct.

Aspect 4. The system of aspect 1, wherein the first FMA and/or second FMA comprises a diverging duct.

Aspect 5. The system of aspect 1, wherein the first FMA and/or second FMA comprises a propeller or thrust generating apparatus.

Aspect 6. The system of aspect 1, wherein the first FMA and/or second FMA comprises a body force generating apparatus.

Aspect 7. The system of aspect 1, wherein the fluid is compressible.

Aspect 8. The system of aspect 7, wherein the fluid is a gas comprising air, nitrogen, or carbon dioxide.

Aspect 9. The system of aspect 7, wherein the first FMA is configured to decelerate the interior fluid flow and increase the pressure relative to the free stream.

Aspect 10. The system of aspect 9, wherein the first FMA is configured to decelerate the interior fluid flow to a subsonic fluid velocity.

Aspect 11. The system of aspect 9, wherein the first FMA is configured to decelerate the interior fluid flow to a transonic velocity.

Aspect 12. The system of aspect 9, wherein the first FMA is configured to decelerate the interior fluid flow to a lower supersonic velocity.

Aspect 13. The system of aspect 7, wherein the second FMA is configured to accelerate the interior fluid flow and decrease the pressure relative to the free stream.

Aspect 14. The system of aspect 13, wherein the second FMA is configured to accelerate the interior fluid flow a velocity to be substantially equal to the free stream velocity.

Aspect 15. The system of aspect 13, wherein the second FMA is configured to accelerate the interior fluid flow a velocity to be greater than the free stream velocity.

Aspect 16. The system of aspect 13, wherein the second FMA is configured to accelerate the interior fluid flow to be less than the free stream velocity.

Aspect 17. The system of aspect 1, wherein the fluid is substantially incompressible.

Aspect 18. The system of aspect 17, wherein the fluid comprises water.

Aspect 19. The system of aspect 17, wherein the first FMA is configured to accelerate the interior fluid flow and decrease pressure of the interior fluid flow relative to the free stream, and thereby reduce the cross-sectional area of the interior fluid flow exiting the first FMA and entering the PCA compared to an equivalent free stream cross-sectional area.

Aspect 20. The system of aspect 19, wherein the first FMA is configured to accelerate the interior fluid flow such that a total drag, which includes the wave drag, on a vehicle containing the system is reduced.

Aspect 21. The system of aspect 17, wherein the second FMA is configured to decelerate the interior fluid flow and increase the pressure of the interior fluid flow relative to a free stream, and thereby increase the cross-sectional area of the interior fluid flow exiting the second FMA.

Aspect 22. The system of aspect 21, wherein the second FMA is configured to decelerate the interior fluid flow to a velocity substantially equal to a speed of the free stream velocity.

Aspect 23. The system of aspect 21, wherein the second FMA is configured to decelerate the interior fluid flow to a velocity greater than the free stream velocity.

Aspect 24. The system of aspect 21, wherein the second FMA is configured to decelerate the interior fluid flow to a velocity less than the free stream velocity.

Aspect 25. The system of aspect 1, wherein the PCA is configured to maintain a pressure difference between the interior fluid flow within the PCA and the free stream exterior to the outer surface.

Aspect 26. The system of aspect 25, wherein the PCA comprises a channel with circular, rectangular, elliptical, or polygonal cross-section, and/or a straight section, a bend, an elbow joints, or a turn.

Aspect 27. The system of aspect 1, wherein the PCA comprises a wing configured to generate lift and transfer a net momentum into the fluid within the PCA.

Aspect 28. The system of aspect 1, wherein the PCA comprises a fuselage.

Aspect 29. The system of aspect 1, wherein the PCA comprises an intentional momentum carrying apparatus, intentional momentum shedding apparatus, a turboshaft engine, a turbofan engine, a turboprop engine, a turbojet engine, a ramjet, a thrust apparatus, a drag apparatus, a pump jet, a propeller, or an afterburner.

Aspect 30. The system of aspect 1, wherein the PCA comprises: a first thrust apparatus, wherein the first thrust apparatus is configured to impart a first induced velocity to the local free stream during a nominal operating requirement, the first thrust apparatus creating a streamtube, a second thrust apparatus, the second thrust apparatus being located in a downstream portion of the streamtube, with the second thrust apparatus being configured to impart a second induced velocity to the local free stream, wherein the second induced velocity at the location of the second thrust apparatus has a component in a direction opposite to the direction of the first induced velocity at the location of the second thrust apparatus.

Aspect 31. The system of aspect 30, wherein the first or second thrust apparatus comprise a propeller.

Aspect 32. The system of aspect 30, wherein at least a portion of the power extracted by one thrust apparatus is directed to power the other thrust apparatus.

Aspect 33. The system of aspect 1, wherein the volume between the outer surface and the inner surface comprises at least part of a vehicle, wherein the outer and inner surfaces are configured to reduce the effect of wave drag in a free stream flow.

Aspect 34. A system of aspect 33, wherein the outer surface is substantially parallel to free stream flow lines.

Aspect 35. A system of aspect 33, wherein the outer surface comprises an annular cylinder, wherein the first FMA is located at an upstream end of the cylinder, and the second FMA located at a downstream end of the cylinder.

Aspect 36. The system of aspect 35, wherein the outer surface of the vehicle is in the shape of a tapered cylinder, wherein the radius of the cylinder decreases in the downstream direction.

Aspect 37. The system of aspect 33, wherein the cross-sectional area of the outer surface is circular, elliptical, rectangular, or polygonal when viewed in a free stream direction.

Aspect 38. The system of aspect 33, wherein the vehicle is configured to take-off vertically and operate nominally without inducing a substantial amount of wave drag.

Aspect 39. The system of aspect 33, wherein the vehicle is configured to fly subsonically and/or supersonically in level cruise without inducing a substantial amount of wave drag.

Aspect 40. The system of aspect 1, wherein the outer surface and interior surface form an intentional momentum carrying apparatus; wherein the system also comprises a boundary apparatus; and wherein a local free stream velocity of the boundary apparatus is reduced by the IMCA relative to the free stream velocity.

Aspect 41. The apparatus from aspect 40, wherein the reduction in the local free stream flow velocity of the boundary apparatus is a reduction to flow speeds above the wave speed within the local free stream fluid.

Aspect 42. The apparatus from aspect 40, wherein the local free stream velocity of the boundary apparatus is reduced to a velocity that is substantially equal to the wave speed within the local free stream.

Aspect 43. The apparatus from aspect 40, wherein the local free stream velocity of the boundary apparatus is reduced to a velocity that is less than the wave velocity within the local free stream.

Aspect 44. The apparatus from aspect 40, wherein the local free stream velocity of the boundary apparatus is reduced to a velocity that is supersonic within the local free stream of the boundary apparatus.

Aspect 45. The apparatus from aspect 40, wherein the local free stream velocity of the boundary apparatus is reduced to a velocity that is transonic within the local free stream of the boundary apparatus.

Aspect 46. The apparatus from aspect 40, wherein the local free stream velocity of the boundary apparatus is reduced to a velocity that is subsonic within the local free stream of the boundary apparatus.

Aspect 47. The apparatus from aspect 40, wherein the boundary apparatus comprises a fuselage or the hull of a ship.

Aspect 48. The apparatus from aspect 40, wherein the boundary apparatus comprises a wing.

Aspect 49. The system of aspect 40, wherein the boundary apparatus comprises a third FMA configured to deliver a net induced velocity into a far wake of the third FIA, wherein at least a portion of the far wake of the third FMA is located within the channel, and at a local free stream velocity that is less than the free stream velocity due to a velocity reduction of the local free stream by the channel upstream, downstream, and in the vicinity of the third FIA.

Aspect 50. The apparatus of aspect 49, wherein the induced velocity delivered by the third FMA into the far wake of the third FIA has a non-zero net component perpendicular to the local free stream flow within the PCA downstream of the third FMA.

Aspect 51. The apparatus of aspect 50, wherein the third FIA is a wing and configured to generate lift during nominal level cruise operation, and wherein at least a portion of the far wake of the wing is located within the region of reduced local free stream flow within the channel, and wherein the far wake of the wing extends into the free stream outside and downstream of the outlet of the channel.

Aspect 52. The system of aspect 51, where the wingspan is less than half the effective diameter of the channel at the location of the wing.

Aspect 53. The system of aspect 51, where the wingspan is less than one quarter the effective diameter of the channel at the location of the wing.

Aspect 54. The system of aspect 51, where the wingspan is less than one tenth the effective diameter of the channel at the location of the wing.

Aspect 55. The apparatus of aspect 49, wherein the induced velocity delivered by the third FIA into the far wake of the third FMA has a non-zero net component parallel to the local free stream flow.

Aspect 56. The apparatus of aspect 55, wherein the third FIA is a fuselage or a propeller, and is configured to generate thrust or drag during nominal level cruise operation.

Aspect 57. The apparatus of aspect 40, wherein the boundary apparatus is located within the streamtube formed by the leading and trailing edges of the IMCA.

Aspect 58. A method of reducing the wave drag of a vehicle, the method comprising: providing a first fluid manipulation apparatus ("FMA"); providing a second FMA at least partially within the downstream streamtube of the first FMA; and providing a pressure containment apparatus ("PCA") configured to at least partially enclose a streamtube passing through both the first and the second FMA.

Aspect 59. The method of aspect 58, wherein the fluid is compressible, and wherein the first FMA is configured to decelerate and increase the pressure of the fluid, and wherein the second FMA is configured to accelerate and decrease the pressure of the fluid, and wherein the method further comprises providing a wing within the PCA such that lift is generated in a lower speed, higher pressure flow regime compared to the free stream flow.

Aspect 60. The method of aspect 58, wherein the fluid is incompressible, and wherein the first FMA is configured to accelerate and decrease the pressure of the fluid, and wherein the second FMA is configured to decelerate and increase the pressure of the fluid, and wherein the method further comprises transporting the lower pressure and lower cross-sectional area flow via the PCA through a vehicle from the first FMA to the second FMA such that less wave drag is generated by the vehicle.

What is claimed is:

1. A system for reducing wave drag, the system comprising:
    a first fluid manipulation apparatus ("FMA") configured to manipulate an interior fluid flow within a steamtube during a normal operating condition, and configured to change the speed and pressure of the interior fluid flow in a streamwise direction;
    a second FMA configured to manipulate the interior fluid flow downstream of the first FMA, and configured to change the speed and pressure of the interior fluid flow in a streamwise direction;
    a pressure containment apparatus ("PCA") configured to act on the interior fluid flow downstream of at least a portion of the first FMA and upstream of at least a portion of the second FMA, and confugured to maintain a pressure difference between of the interior fluid flow and a free stream; and
    a third FMA configured to manipulate the interior fluid flow downstream of at least a portion the first FMA and upstream of a least a portion of the second FMA, and configured to deliver a net linear momentum into the far wake of the third FMA within the streamtube during the nominal operating condition, wherein the net linear momentum has a non-zero component perpendicular to the free stream flow velocity,
    wherein the free stream flow speed is greater than a wave speed within the free stream during the nominal operating condition, and wherein the fluid is compressible, the system being configured to manipulate the interior fluid flow to reduce the wave drag of the third FMA.

2. The system of claim 1, wherein the first FMA, and/or PCA, and/or second FMA comprises a intentional momentum carrying apparatus ("IMCA"), a converging duct, a converging diverging duct, or a diverging duct.

3. The system of claim 1, wherein the first FMA, and/or PCA, and/or second FMA comprises an IMSA, a propeller, a rotor, a body force generating apparatus, or a thrust generating apparatus.

4. The system of claim 1, wherein the fluid is a gas.

5. The system of claim 1, wherein the first FMA is configured to decelerate the interior fluid flow and increase the pressure relative to the local free stream flow of the first FMA.

6. The system of claim 5, wherein the first FMA is configured to decelerate the interior fluid flow relative to the local free stream flow of the first FMA to a subsonic fluid flow speed.

7. The system of claim 5, wherein the first FMA is configured to decelerate the interior fluid flow relative to the local free stream flow of the first FMA to a transonic fluid flow speed.

8. The system of claim 5, wherein the first FMA is configured to decelerate the interior fluid flow relative to the local free stream flow of the first FMA to a lower supersonic fluid flow speed.

9. The system of claim 1, wherein the second FMA is configured to accelerate the interior fluid flow and decrease the pressure relative to the local free stream flow of the second FMA.

10. The system of claim 9, wherein the second FMA is configured to accelerate the interior fluid flow relative to the local free stream flow of the second FMA to a speed equal to the free stream fluid flow speed.

11. The system of claim 9, wherein the second FMA is configured to accelerate the interior fluid flow relative to the local free stream flow of the second FMA to a speed greater than the free stream fluid flow speed.

12. The system of claim 9, wherein the second FMA is configured to accelerate the interior fluid flow relative to the local free stream flow of the second FMA to a speed less than the free stream fluid flow speed.

13. The system of claim 1, wherein the PCA is configured to maintain a pressure difference between the interior fluid flow within the streamtube and an exterior fluid flow exterior to the streamtube.

14. The system of claim 1, wherein the first FMA, PCA, or second FMA comprises a channel, wherein the streamtube passes through at least a portion of the channel, wherein the channel has a circular, rectangular, elliptical, or polygonal cross-section, and/or wherein the channel has a straight section, a bend, an elbow joints, or a turn.

15. The system of claim 1, wherein the third FMA comprises a wing configured to generate a net lift force with a non-zero component perpendicular to a local free stream flow velocity vector of the wind and to transfer a net linear momentum into the fluid during the nominal operating condition.

16. The system of claim 1, wherein the first FMA, PCA, second FMA, and/or third FMA comprises a fuselage.

17. The system of claim 1, wherein the interior fluid flow is manipulated downstream of at least a portion of the first FMA and upstream of a least a portion of the second FMA by an intentional momentum carrying apparatus, a fuselage, a hull of a ship, and intentional momentum shedding apparatus, a turboshaft engine, a turbofan engine, a turboprop engine, a turbojet engine, a ramjet, a thrust apparatus, a drag apparatus, a pump jet, a propeller, a compressor, a combustion chamber, a turbine, or an afterburner.

18. The system of claim 1, wherein the first FMA, PCA, and/or second FMA comprise an intentional momentum carrying apparatus ("IMCA"),
wherein a local free stream flow speed of the FMA is reduced by the IMCA relative to the free stream flow speed, and
wherein the IMCA comprises an outer surface and an inner surface.

19. The system of claim 18, wherein the volume between the outer surface and the inner surface comprises at least part of a vehicle, wherein the outer and inner surfaces are configured to reduce the effect of wave drag of the vehicle in a free stream flow.

20. A system of claim 18, wherein the outer surface is substantially parallel to a local free stream flow velocity vector of the IMCA during the nominal operating condition.

21. A system of claim 18, wherein the IMCA comprises an annular cylinder, wherein the first FMA is located at an upstream end of the cylinder, and the second FMA located at a downstream end of the cylinder.

22. The system of claim 18, wherein the outer surface is in the shape of a tapered cylinder, wherein the radius of the cylinder decreases in the downstream direction.

23. The system of claim 18, wherein the cross-sectional geometry of the outer surface is circular, elliptical, rectangular, or polygonal when viewed in a direction aligned with the free stream flow.

24. The system of claim 18, wherein the local free stream flow speed of the third FMA is reduced relative to the free stream flow speed by the action of the first FMA, PCA, and/or second FMA during the nominal operating condition.

25. The system of claim 18, wherein the IMCA comprises a fuselage.

26. The system of claim 18, wherein the third FMA comprises a wing.

27. The system of claim 18, wherein the third FMA is located within the streamtube enclosed by the leading and trailing edges of the IMCA.

28. The system of claim 1, wherein the third FMA is configured to deliver a net induced velocity into a far wake of the third FMA during the nominal operating condition, wherein at least a portion of the far wake of the third FMA is located within the interior fluid flow downstream of at least a portion of the first FMA and upstream of at least a portion of the second FMA, and wherein the induced velocity delivered by the third FMA into the far wake of the third FMA has a non-zero net component perpendicular to the local free stream flow in the far wake.

29. The system of claim 28, wherein the induced velocity delivered by the third FMA into the far wake of the third FMA has a non-zero net component parallel to the local free stream flow in the far wake.

30. The system of claim 28, wherein the third FMA comprises a wing configured to generate a net lift force with a non-zero component perpendicular to a local free stream flow velocity vector of the wing and to transfer a net linear momentum into the fluid during the nominal operating condition, and wherein at least a portion of the far wake of the wing is located within the interior fluid flow downstream of at least a portion the first FMA and upstream of at least a portion of the second FMA, and wherein the far wake of the wing extends into the free stream downstream of the second FMA.

31. The system of claim 30, wherein the IMCA comprises a channel, wherein the streamtube passes through at least a portion of the channel, wherein the wingspan is less than half the effective diameter of the channel at the location of the wing.

32. The system of claim 30, wherein the IMCA comprises a channel, wherein the streamtube passes through at least a portion of the channel, wherein the wingspan is less than one third and/or less than one quarter the effective diameter of the channel at the location of the wing.

33. The system of claim 30, wherein the IMCA comprises a channel, wherein the streamtube passes through at least a portion of the channel, wherein the wingspan is less than one tenth the effective diameter of the channel at the location of the wing.

34. The part system of claim 1, wherein the third FMA comprises a propeller or a rotor, a control surface, an intentional momentum carrying apparatus ("IMCA"), or an intentional momentum shedding apparatus ("IMSA").

35. The system of claim 1, wherein the first FMA, second FMA, and/or the PCA are configured to reduce the local free stream speed of the third FMA relative to the free stream flow speed.

36. The system of claim 35, wherein the local free stream flow speed of the third FMA is reduced to a flow speed smaller than a wave speed within the local free stream flow of the third FMA.

37. The system of claim 35, wherein the local free stream flow speed of the third FMA is reduced to a flow speed larger than a wave speed within the local free stream flow of the third FMA.

38. The system of claim 1, wherein the nominal operating condition comprises steady nominal level cruise.

39. The system of claim 1, wherein there is a net force in the downstream direction on at least a portion of the interior fluid flow during the nominal operating condition.

40. The system of claim 39, wherein the net force is delivered via an IMSA, a turboshaft engine, a turbofan engine, a turboprop engine, a turbojet engine, a ramjet, a thrust apparatus, a pump jet, a propeller, an afterburner, a compressor, the combustion of fuel in a combustion chamber, or an electric motor driving an IMSA.

41. The system of claim 1, wherein the first FMA, PCA, and/or second FMA comprises an outside surface having a leading edge and a trailing edge, wherein the cross-sectional area of the outside surface decreases in the downstream direction between the leading edge and the trailing edge.

42. The system of claim 1, wherein the system comprises a duct apparatus, wherein the duct apparatus comprises the first FMA, and/or the second FMA, and/or the PCA.

43. The system of claim 1, wherein the system comprises a channel, wherein the streamtube passes through at least a portion of the channel.

44. The system of claim 43, wherein the first FMA, the PCA, or the second FMA are configured to vary the cross-sectional area of the channel.

45. The system of claim 44, wherein the first FMA, the PCA, or the second FMA comprise a ramp or translating spike.

* * * * *